United States Patent
Fijolek et al.

(10) Patent No.: US 6,351,773 B1
(45) Date of Patent: Feb. 26, 2002

(54) METHODS FOR RESTRICTING ACCESS OF NETWORK DEVICES TO SUBSCRIPTION SERVICES IN A DATA-OVER-CABLE SYSTEM

(75) Inventors: John G. Fijolek, Naperville; Levent Gun, Lake Forest; Ronald B. Lee, Northbrook; Philip T. Robinson, Barrington, all of IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/217,534

(22) Filed: Dec. 21, 1998

(51) Int. Cl.[7] .............................................. G06F 11/00
(52) U.S. Cl. ....................... 709/228; 709/222; 370/19
(58) Field of Search ................................. 709/201, 220, 709/222, 224, 228, 227; 713/201; 370/19, 10

(56) References Cited

U.S. PATENT DOCUMENTS

| | | | |
|---|---|---|---|
| 4,644,533 A | 2/1987 | Braff et al. | 370/94 |
| 4,881,263 A | 11/1989 | Herbison et al. | 380/21 |
| 5,014,234 A | 5/1991 | Edwards, Jr. | 364/900 |
| 5,138,712 A | 8/1992 | Corbin | 395/700 |
| 5,442,749 A | 8/1995 | Northcutt et al. | 395/200.09 |
| 5,489,897 A | 2/1996 | Inoue | 340/870.39 |
| 5,598,410 A | 1/1997 | Stone | 370/469 |
| 5,610,910 A | 3/1997 | Focsaneanu et al. | 370/351 |
| 5,623,601 A | 4/1997 | Vu | 395/187.01 |
| 5,678,041 A | * 10/1997 | Baker et al. | 709/201 |
| 5,710,885 A | 1/1998 | Bondi | 709/224 |
| 5,761,602 A | 6/1998 | Wagner et al. | 455/3.1 |
| 5,778,181 A | 7/1998 | Hidary et al. | 395/200.48 |
| 5,922,049 A | 7/1998 | Radia et al. | 709/220 |
| 5,790,198 A | 8/1998 | Roop et al. | 348/460 |
| 5,790,548 A | 8/1998 | Sistanizadeh et al. | 370/401 |

(List continued on next page.)

OTHER PUBLICATIONS

"A Solution for the Priority Queue Problem of Deadline–Ordered Service Disciplines," N.R. Figueira, IEEE International Conference on Computer Communications and Networks, Sep. 22–25, 1997, pp. 320–325.

Kyees, P.J. et al., *ADSL: A New Twisted–Pair Access to the Information Highway*, IEEE Communications Magazine, vol. 33, Issue 4, Apr. 1995, pp. 52–60.

Huang, Yin–Hwa et al., *Design of an MPEG–Based Set–Top Box for Video on Demand Services*, Acoustics, Speech, and Signal Processing, 1995, ICASSP–95., 1995 International Conference, vol. 4, ISBN: 0–7803–2431–5, May 9–12, 1995, pp. 2655–2658.

*Primary Examiner*—Ayaz Sheikh
*Assistant Examiner*—Khanh Quang Dinh
(74) *Attorney, Agent, or Firm*—McDonnell Boehnen; Hulbert & Berghoff; Stephen Lesavich

(57) ABSTRACT

Methods for providing restricted access for a network device such as a cable modem or customer premise equipment on a data-over-cable system. An unknown or new network device is assigned a restricted network address such as a restricted Internet Protocol address. The restricted network address allows the network device to access less than all of the available features on the data-over-cable system. A connection timer is started on the data-over-cable system for a restricted connection to the network device. The connection timer restricts access to the data-over-cable system over a timed interval. A restricted connection is created between the data-over-cable system and the network device including the temporary restricted network address and the connection timer, thereby providing restricted access to the data-over-cable system over a timed interval. The methods may allow a data-over-cable system to provide restricted connections to unknown or new network devices without a long delay, yet provide security to the data-over-cable system.

19 Claims, 26 Drawing Sheets

U.S. PATENT DOCUMENTS

| | | | | |
|---|---|---|---|---|
| 5,790,677 | A | 8/1998 | Fox et al. | 380/24 |
| 5,790,806 | A | 8/1998 | Koperda | 709/252 |
| 5,799,086 | A | 8/1998 | Sudia | 380/23 |
| 5,805,804 | A | 9/1998 | Laursen et al. | 348/7 |
| 5,809,252 | A | 9/1998 | Beighe et al. | 709/227 |
| 5,812,819 | A | 9/1998 | Rodwin et al. | 395/500 |
| 5,818,845 | A | 10/1998 | Moura et al. | 370/449 |
| 5,819,028 | A | 10/1998 | Manghirmalani et al. | 395/185.1 |
| 5,819,042 | A | 10/1998 | Hansen | 714/756 |
| 5,828,655 | A | 10/1998 | Moura et al. | 370/326 |
| 5,828,666 | A | 10/1998 | Focsaneanu et al. | 370/389 |
| 5,835,720 | A | 11/1998 | Nelson et al. | 709/224 |
| 5,835,727 | A | 11/1998 | Wong et al. | 709/221 |
| 5,841,777 | A | 11/1998 | Cohen | 370/433 |
| 5,848,233 | A * | 12/1998 | Radia et al. | 713/201 |
| 5,852,721 | A | 12/1998 | Dillon et al. | 709/217 |
| 5,854,901 | A | 12/1998 | Cole et al. | 709/245 |
| 5,859,852 | A | 1/1999 | Moura et al. | 370/449 |
| 5,864,679 | A | 1/1999 | Kanai et al. | 709/238 |
| 5,870,134 | A | 2/1999 | Laubach et al. | 348/12 |
| 5,872,523 | A | 2/1999 | Dellaverson et al. | 340/825.52 |
| 5,884,024 | A | 3/1999 | Lim et al. | 395/187.01 |
| 5,903,558 | A | 5/1999 | Jones et al. | 370/351 |
| 5,913,037 | A | 6/1999 | Spofford et al. | 709/226 |
| 5,922,051 | A | 7/1999 | Sidey | 709/223 |
| 6,923,659 | | 7/1999 | Curry et al. | 370/401 |
| 5,943,604 | A | 8/1999 | Chen et al. | 455/5.1 |
| 5,954,797 | A | 9/1999 | Sidey | 709/223 |
| 5,958,007 | A | 9/1999 | Lee et al. | 709/219 |
| 5,974,453 | A | 10/1999 | Anderson et al. | 709/220 |
| 5,991,292 | A | 11/1999 | Focsaneanu et al. | 370/352 |
| 5,991,306 | A | 11/1999 | Burns et al. | 370/429 |
| 5,996,076 | A | 11/1999 | Rowney et al. | 713/201 |
| 6,003,077 | A | 12/1999 | Bawden et al. | 709/223 |
| 6,005,851 | A | 12/1999 | Craddock et al. | 370/329 |
| 6,006,264 | A | 12/1999 | Colby et al. | 709/226 |
| 6,009,103 | A | 12/1999 | Woundy | 370/401 |
| 6,012,088 | A | 1/2000 | Li et al. | 709/219 |
| 6,013,107 | A | 1/2000 | Blackshear et al. | 703/229 |
| 6,014,545 | A | 1/2000 | Wu et al. | 455/3.1 |
| 6,018,767 | A | 1/2000 | Fijolek et al. | 709/218 |
| 6,031,841 | A | 2/2000 | Woundy | 370/410 |
| 6,041,041 | A | 3/2000 | Ramanathan et al. | 370/241 |
| 6,049,546 | A | 4/2000 | Ramakrishnan | 370/412 |
| 6,049,826 | A | 4/2000 | Beser | 709/222 |
| 6,052,724 | A | 4/2000 | Willie et al. | 709/223 |
| 6,058,421 | A | 5/2000 | Fijolek et al. | 709/225 |
| 6,065,049 | A | 5/2000 | Beser | 709/218 |
| 6,070,242 | A | 5/2000 | Wong et al. | 713/201 |
| 6,070,246 | A | 5/2000 | Beser | 713/201 |
| 6,073,178 | A | 6/2000 | Wong et al. | 709/229 |
| 6,075,787 | A | 6/2000 | Bobeck et al. | 370/395 |
| 6,091,709 | A | 7/2000 | Harrison et al. | 370/235 |
| 6,094,431 | A | 7/2000 | Yamato et al. | 370/395 |
| 6,130,880 | A | 10/2000 | Naudus et al. | 370/235 |
| 6,137,793 | A | 10/2000 | Gorman et al. | 370/360 |
| 6,157,965 | A | 12/2000 | Mohammed et al. | 710/8 |
| 6,170,061 | B1 | 1/2001 | Beser | 713/201 |
| 6,185,624 | B1 | 2/2001 | Fijolek et al. | 709/239 |
| 6,189,102 | B1 | 2/2001 | Beser | 713/201 |
| 6,208,656 | B1 | 3/2001 | Hrastar et al. | 370/401 |
| 6,223,222 | B1 | 4/2001 | Fijolek et al. | 709/227 |
| 6,240,464 | B1 | 5/2001 | Fijolek et al. | 709/250 |
| 6,269,099 | B1 | 7/2001 | Borella et al. | 370/389 |

* cited by examiner

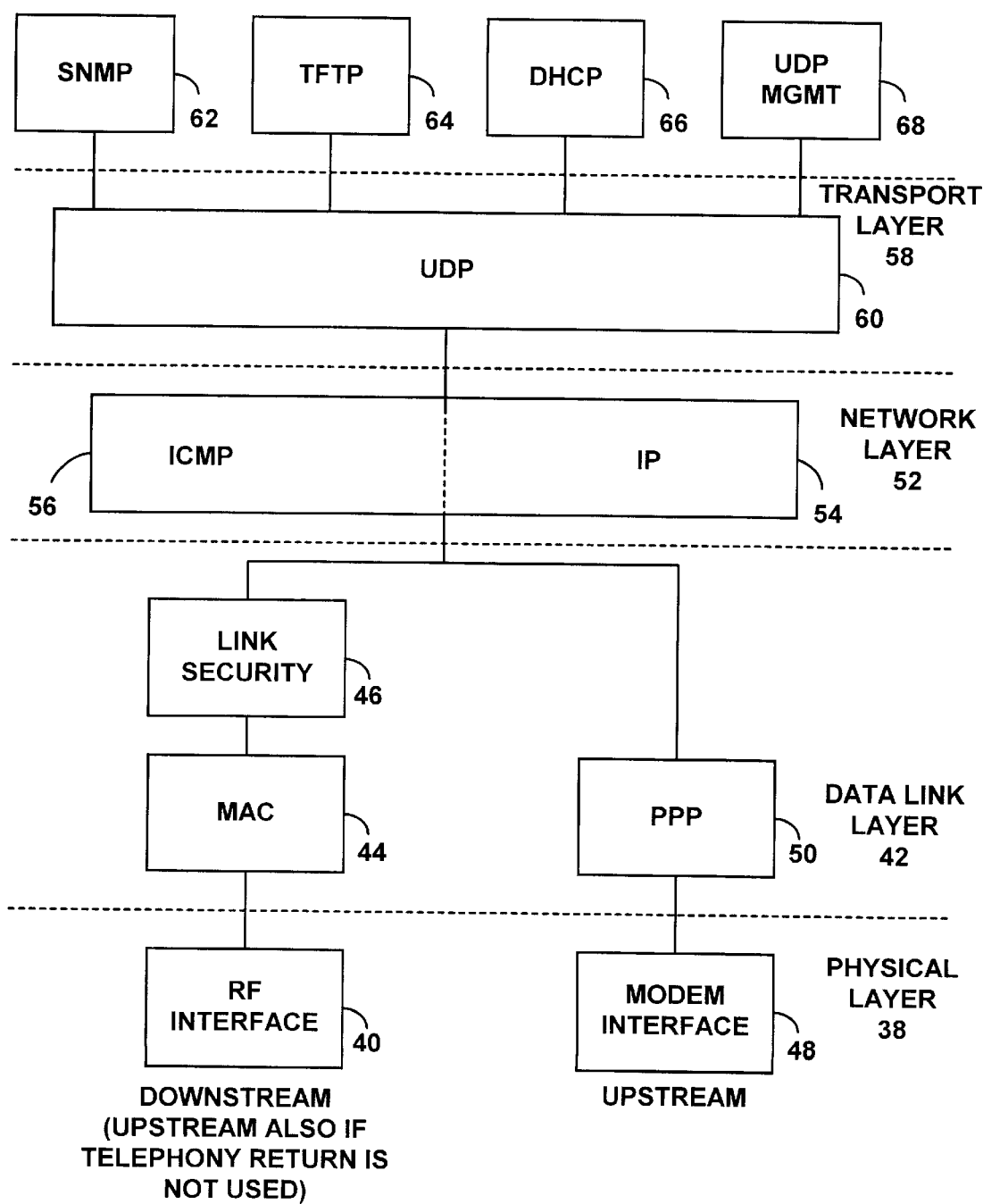

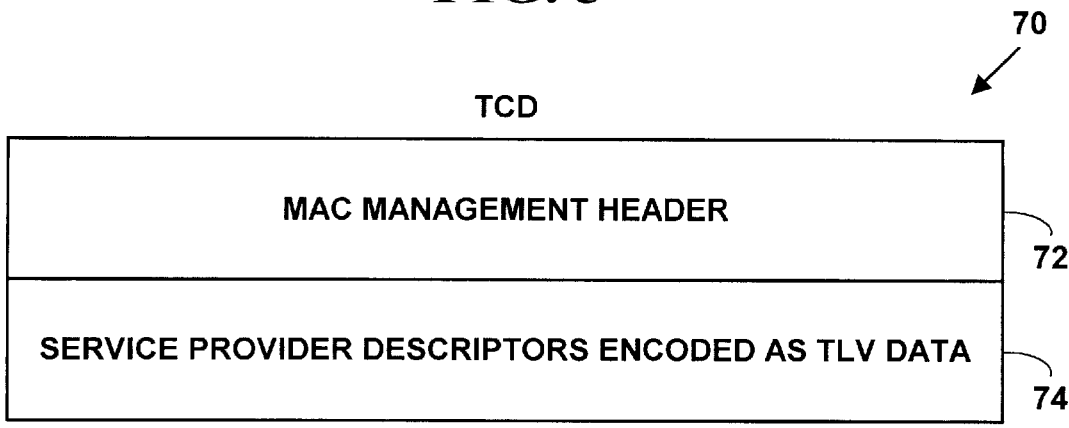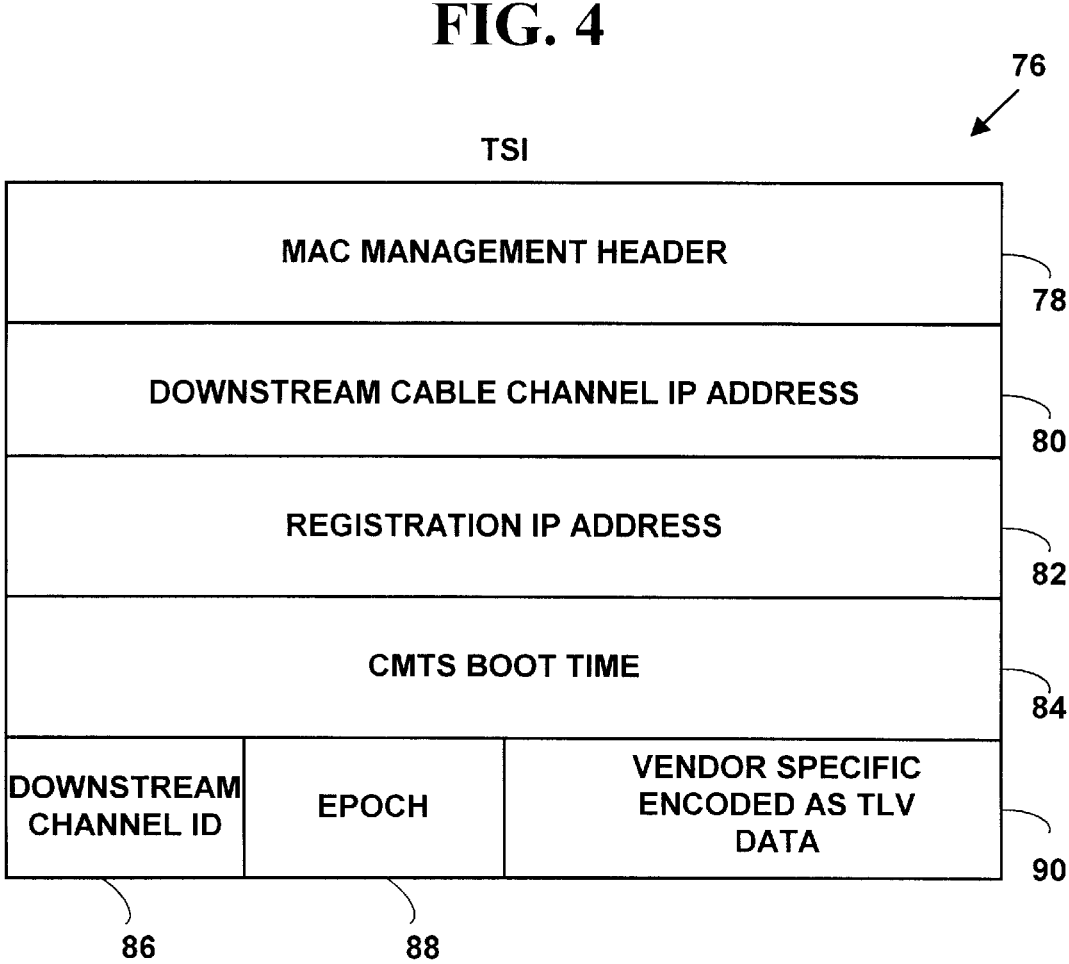

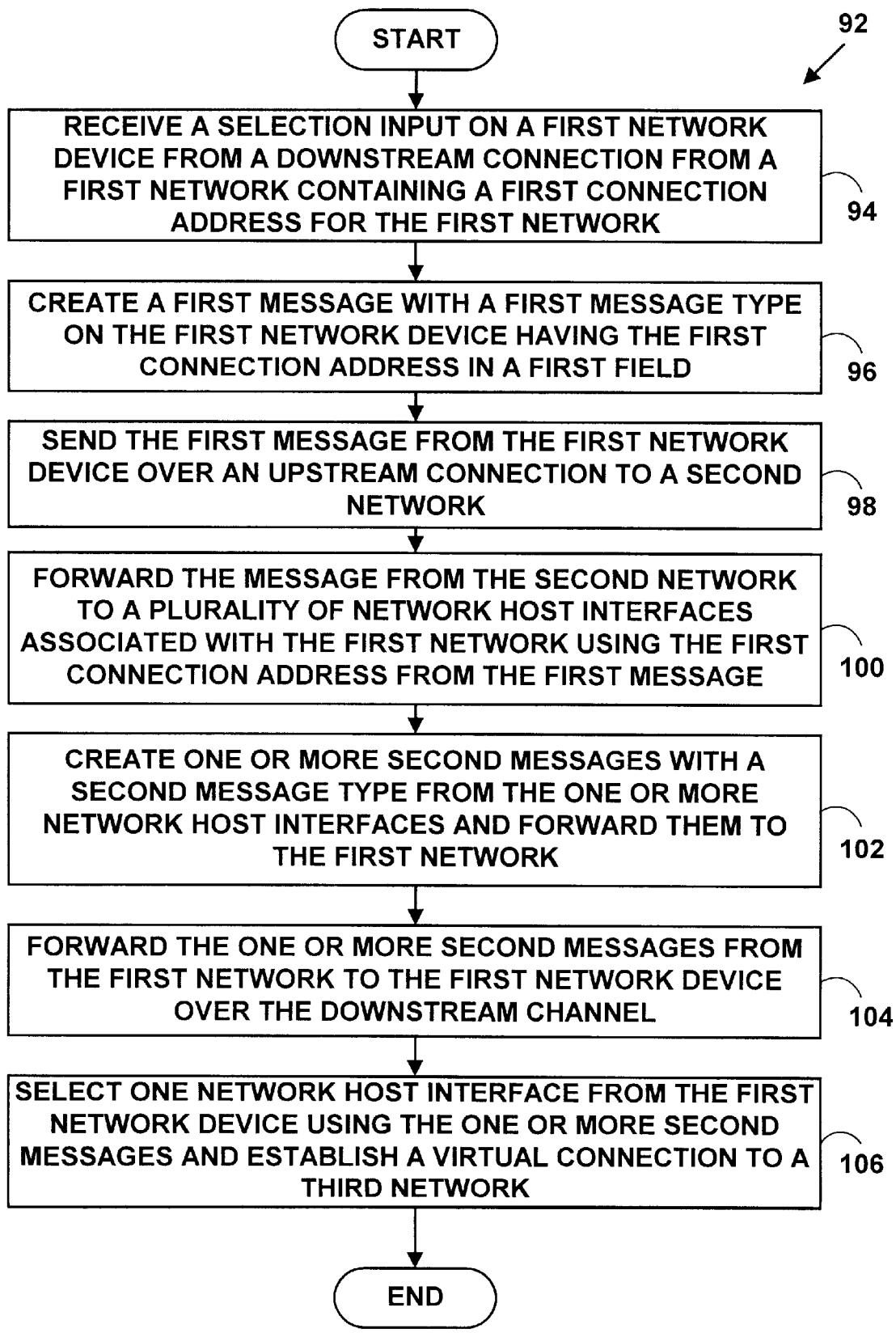

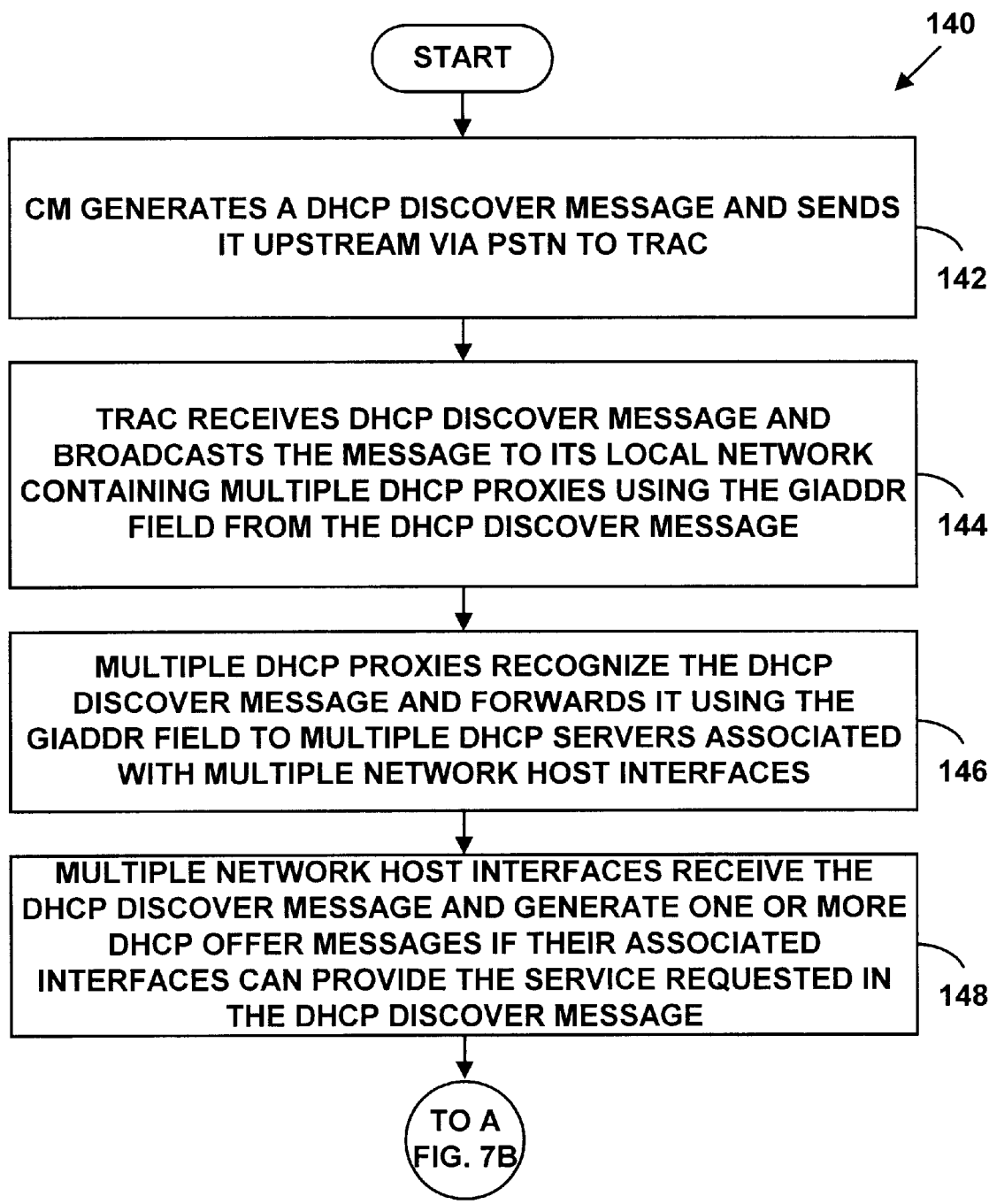

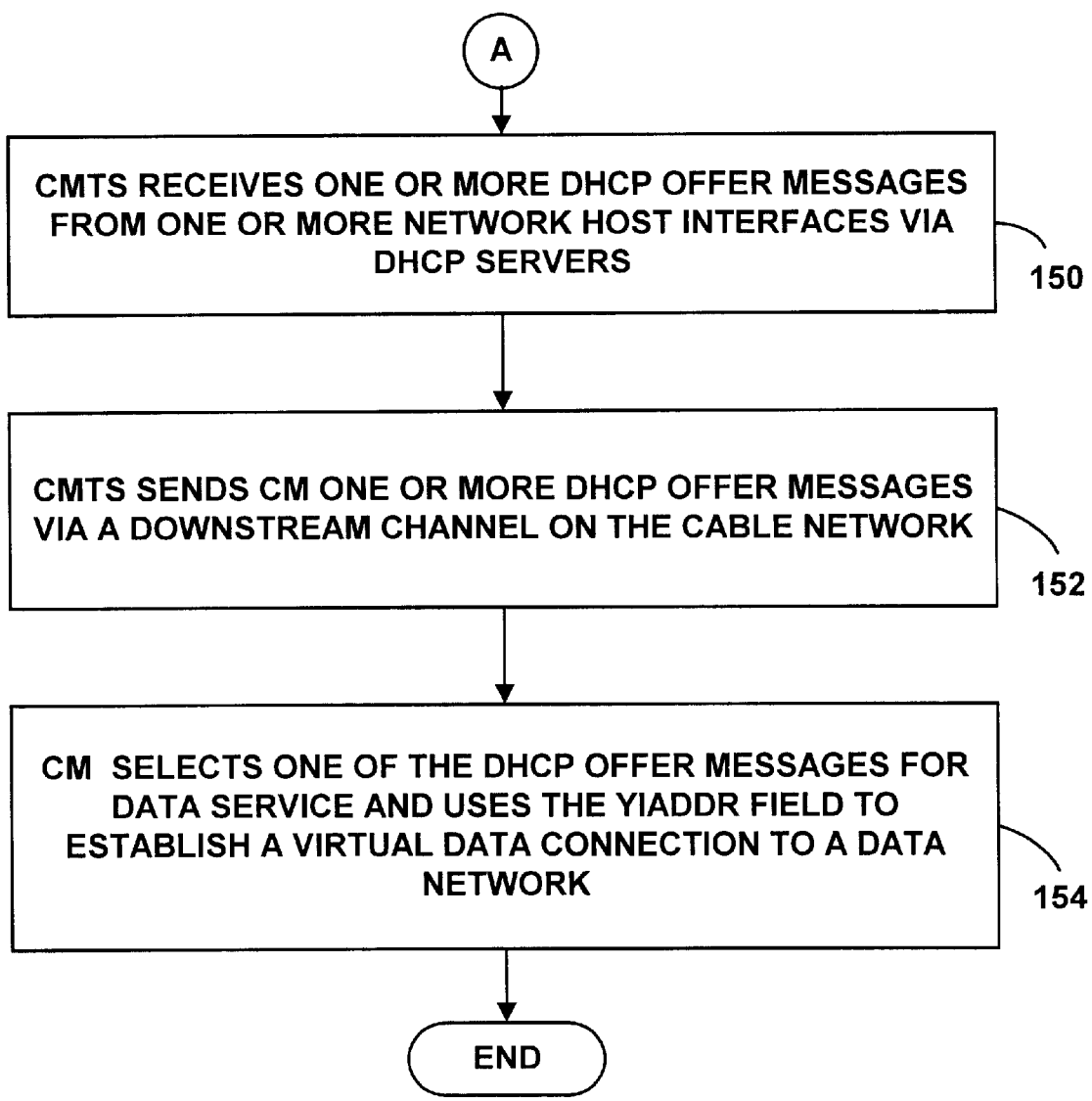

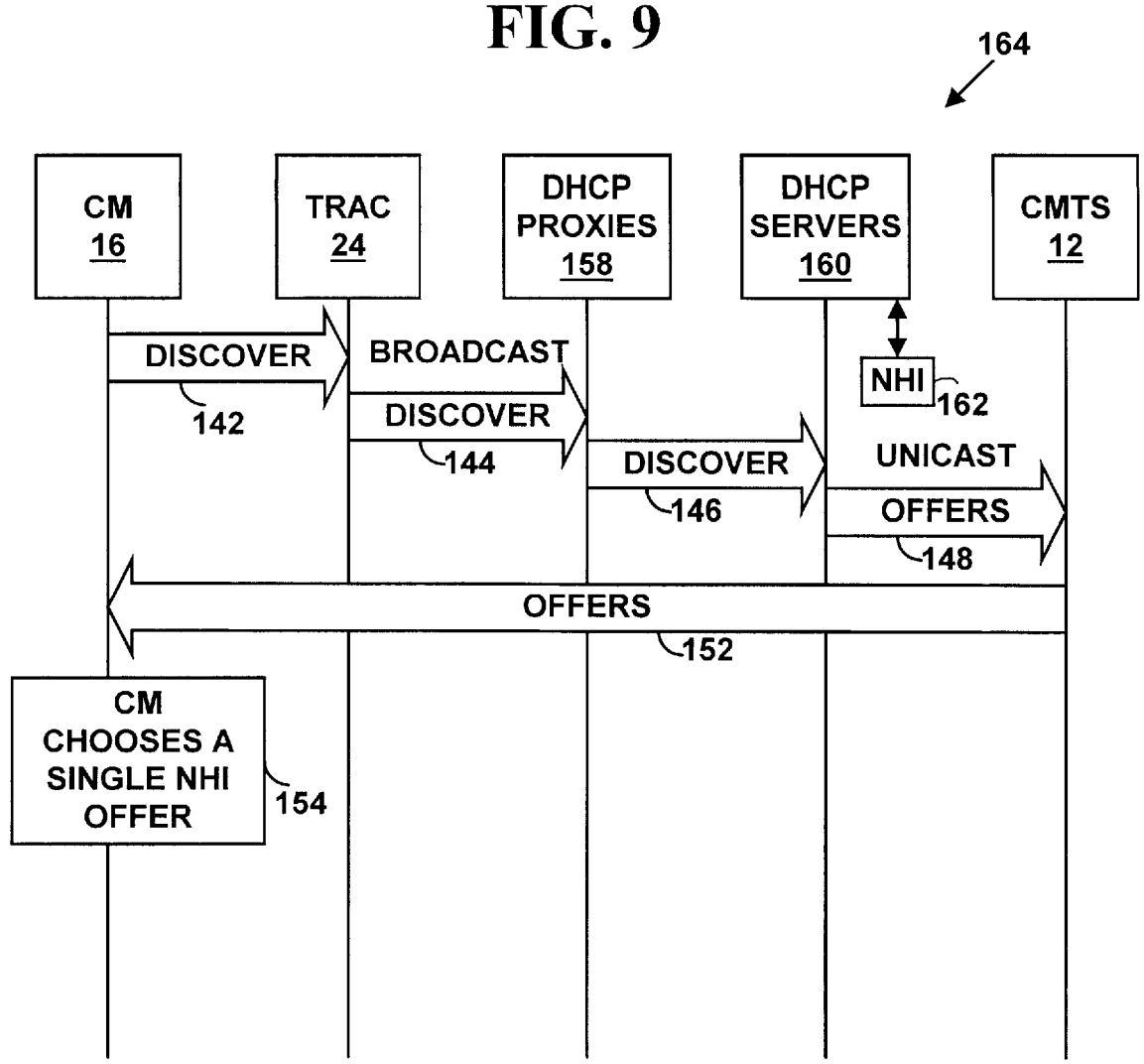

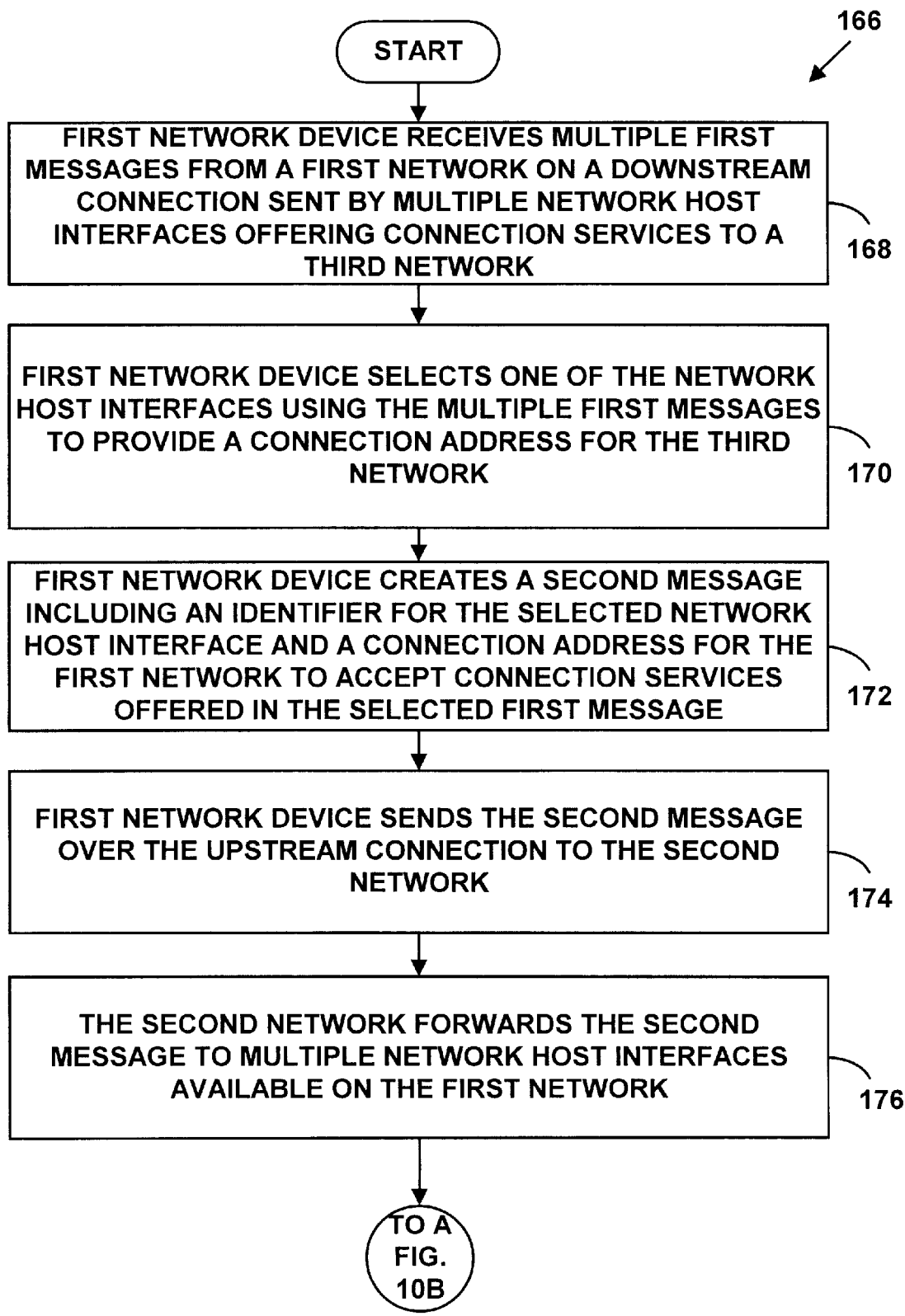

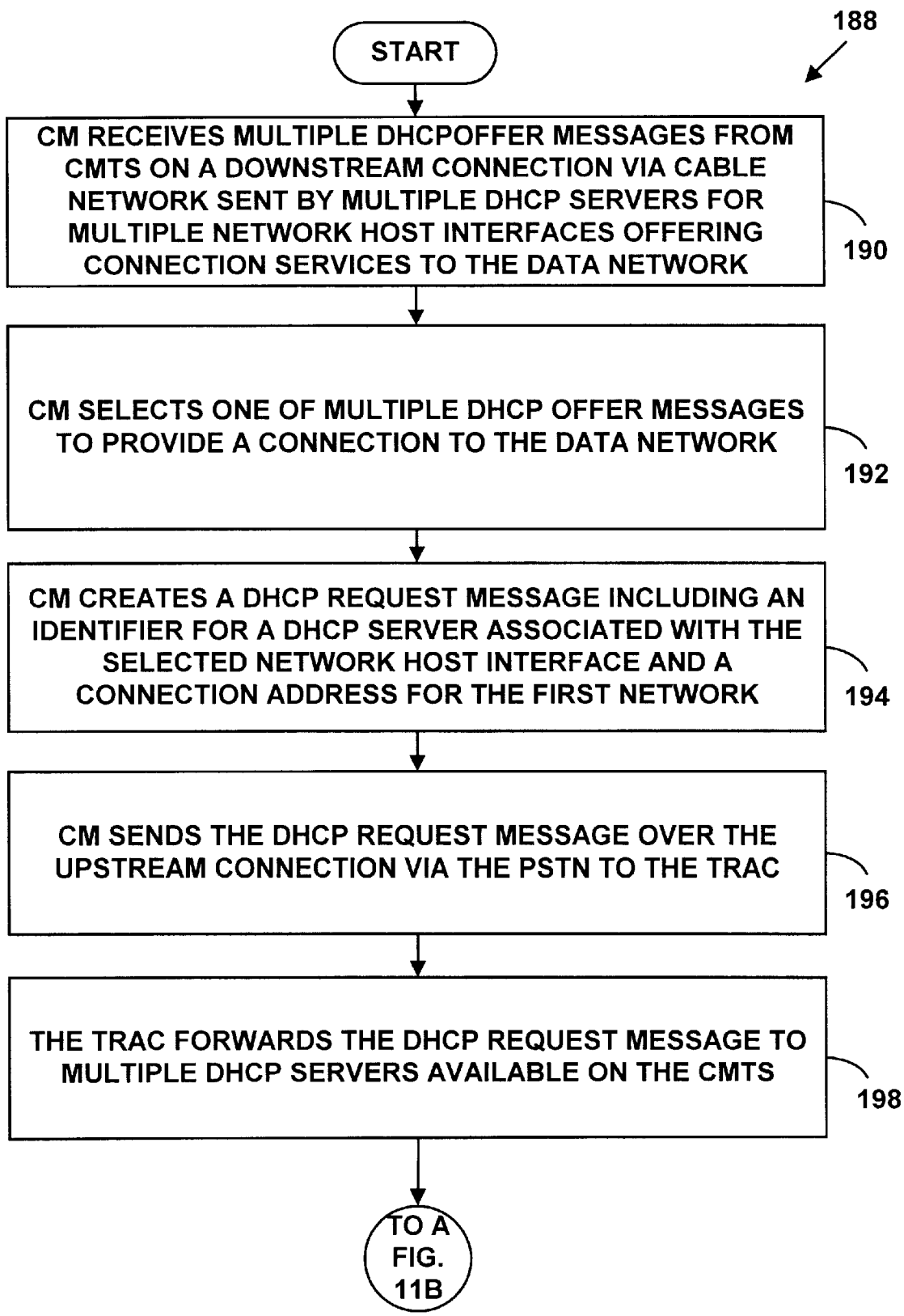

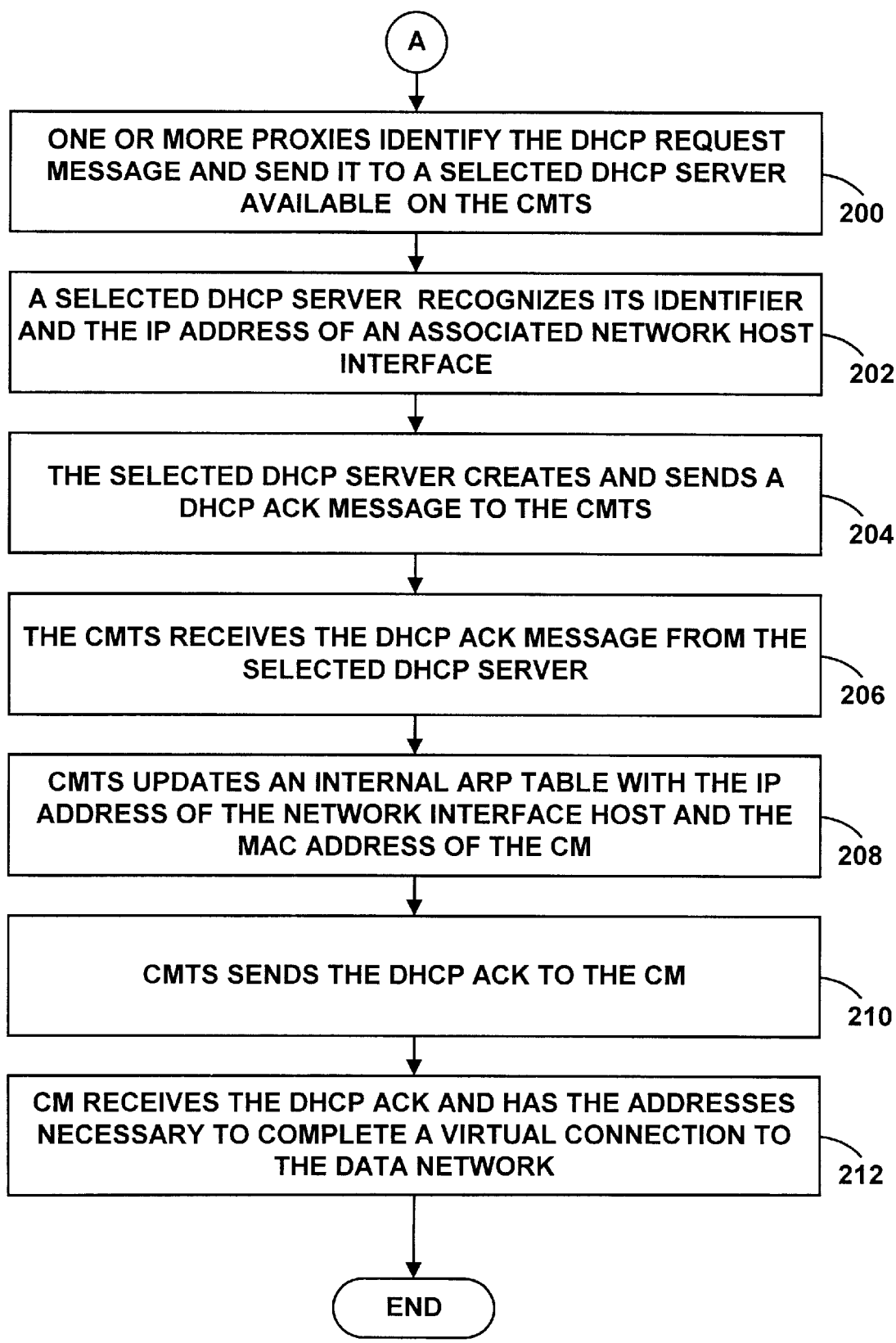

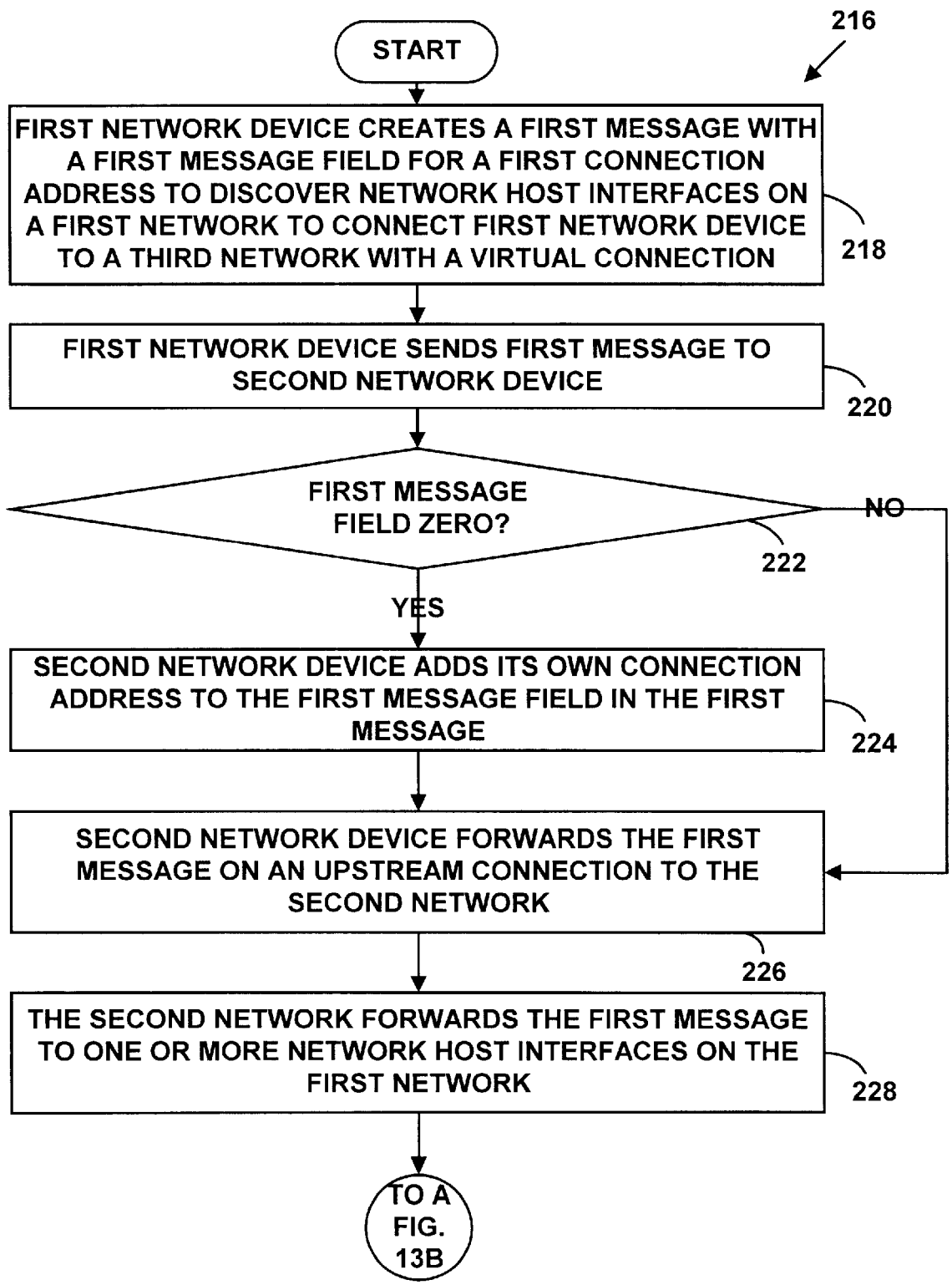

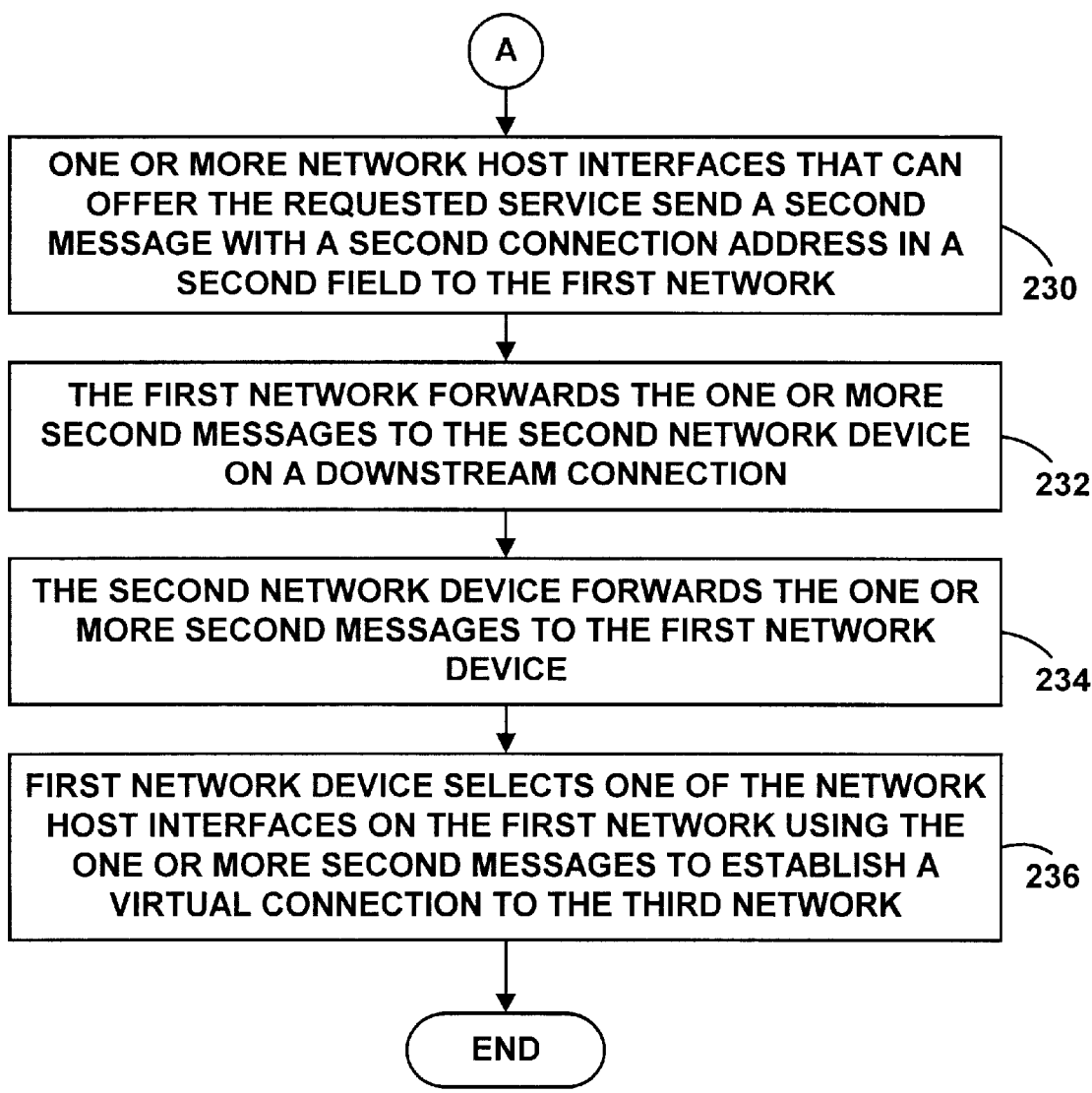

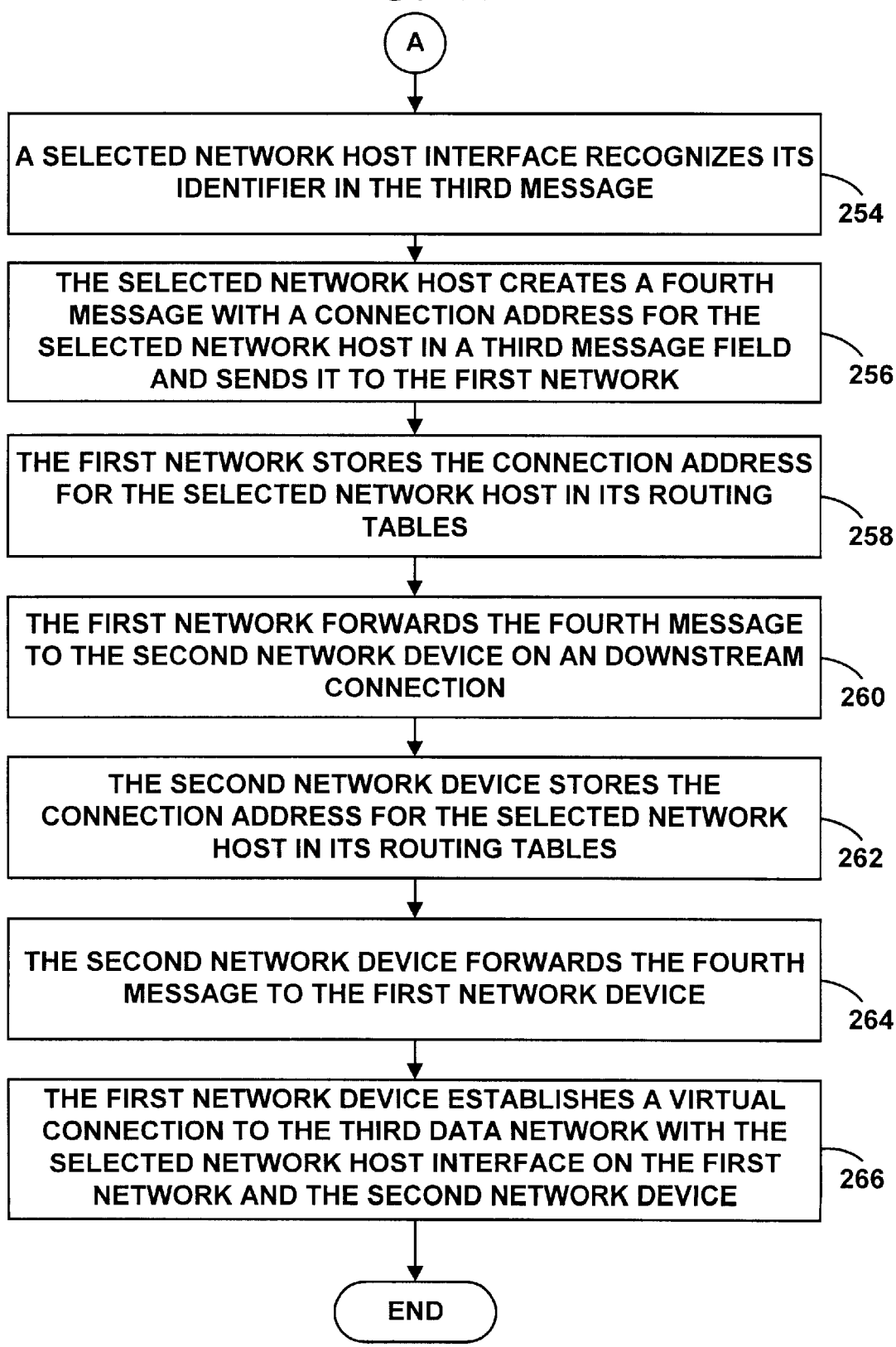

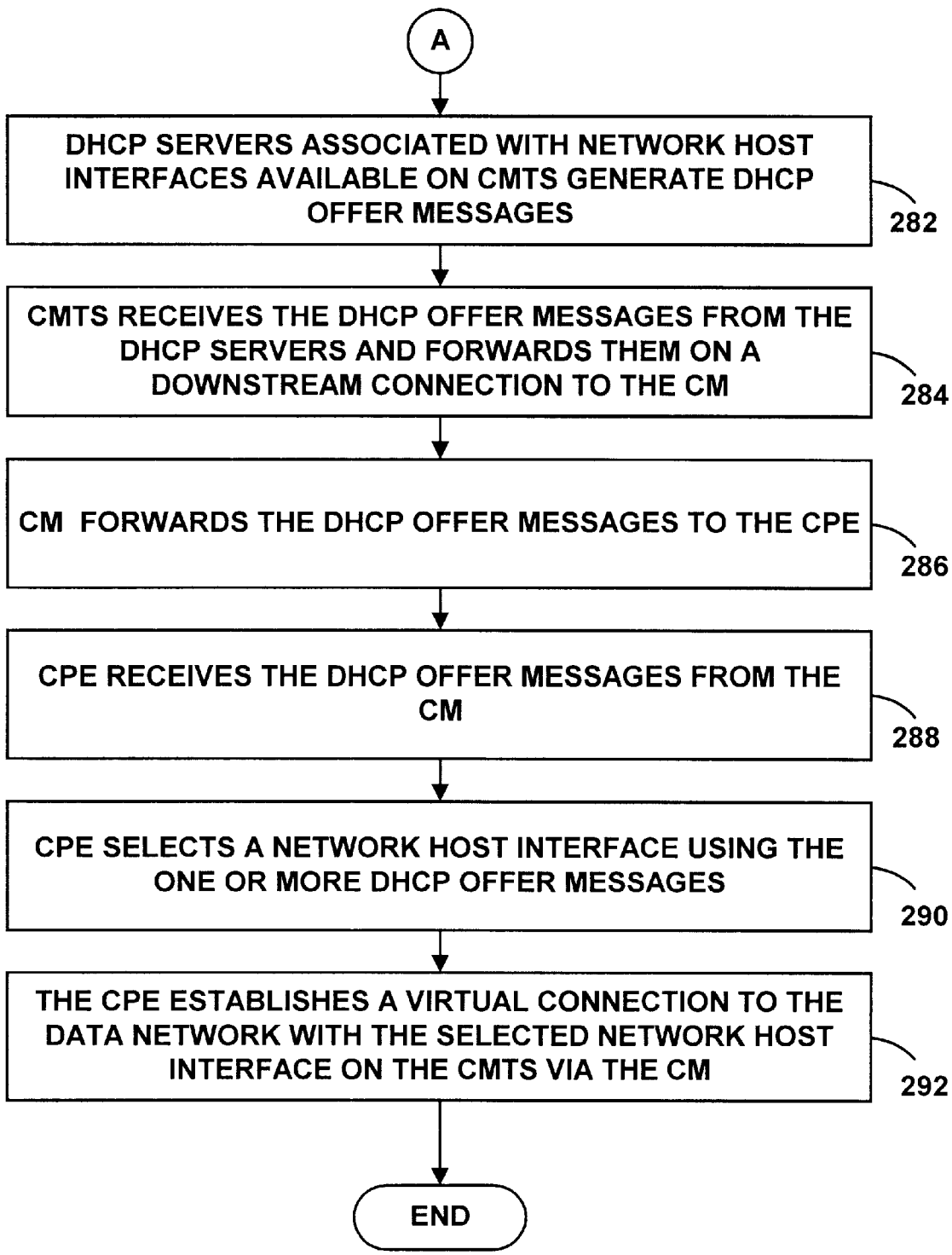

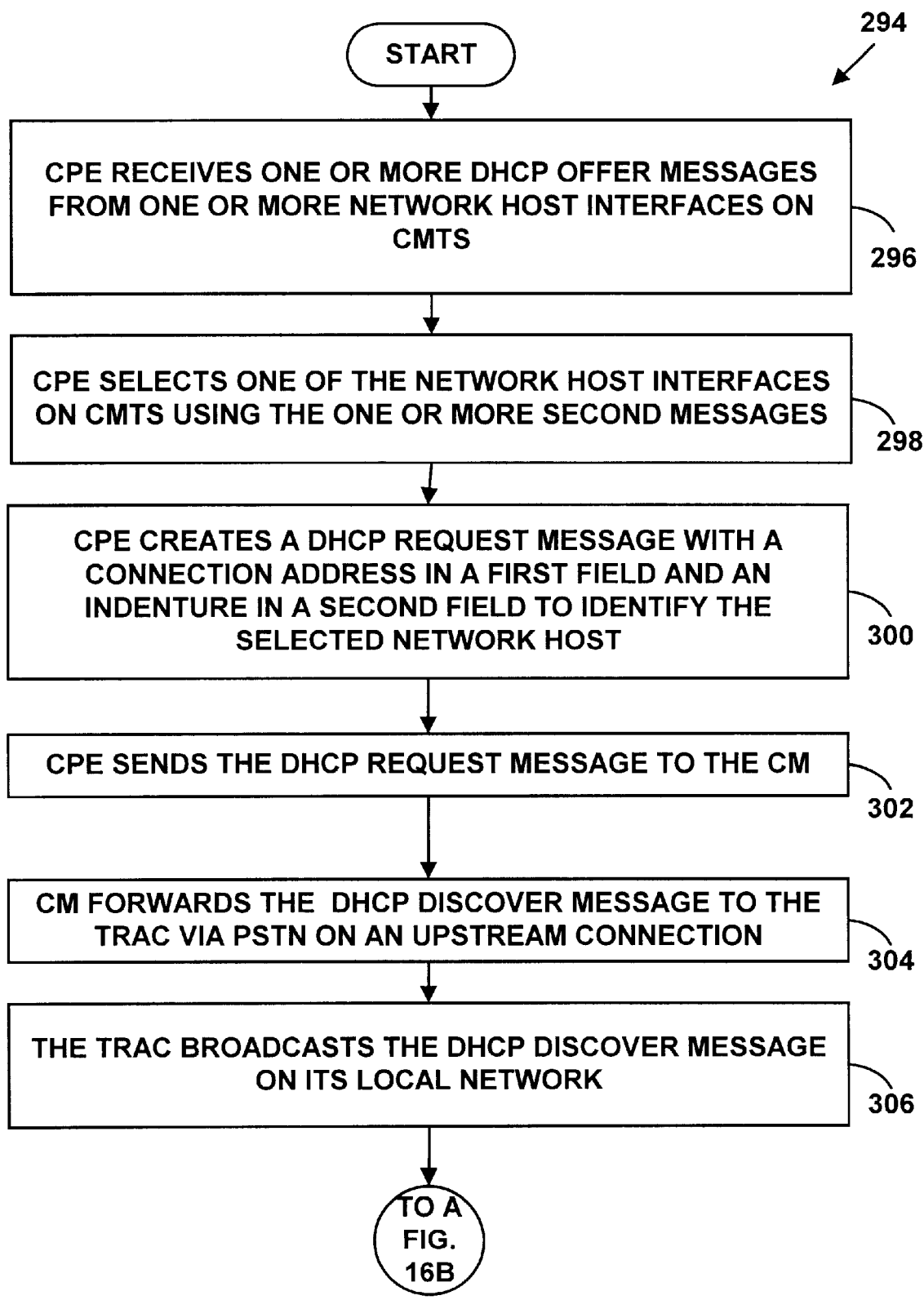

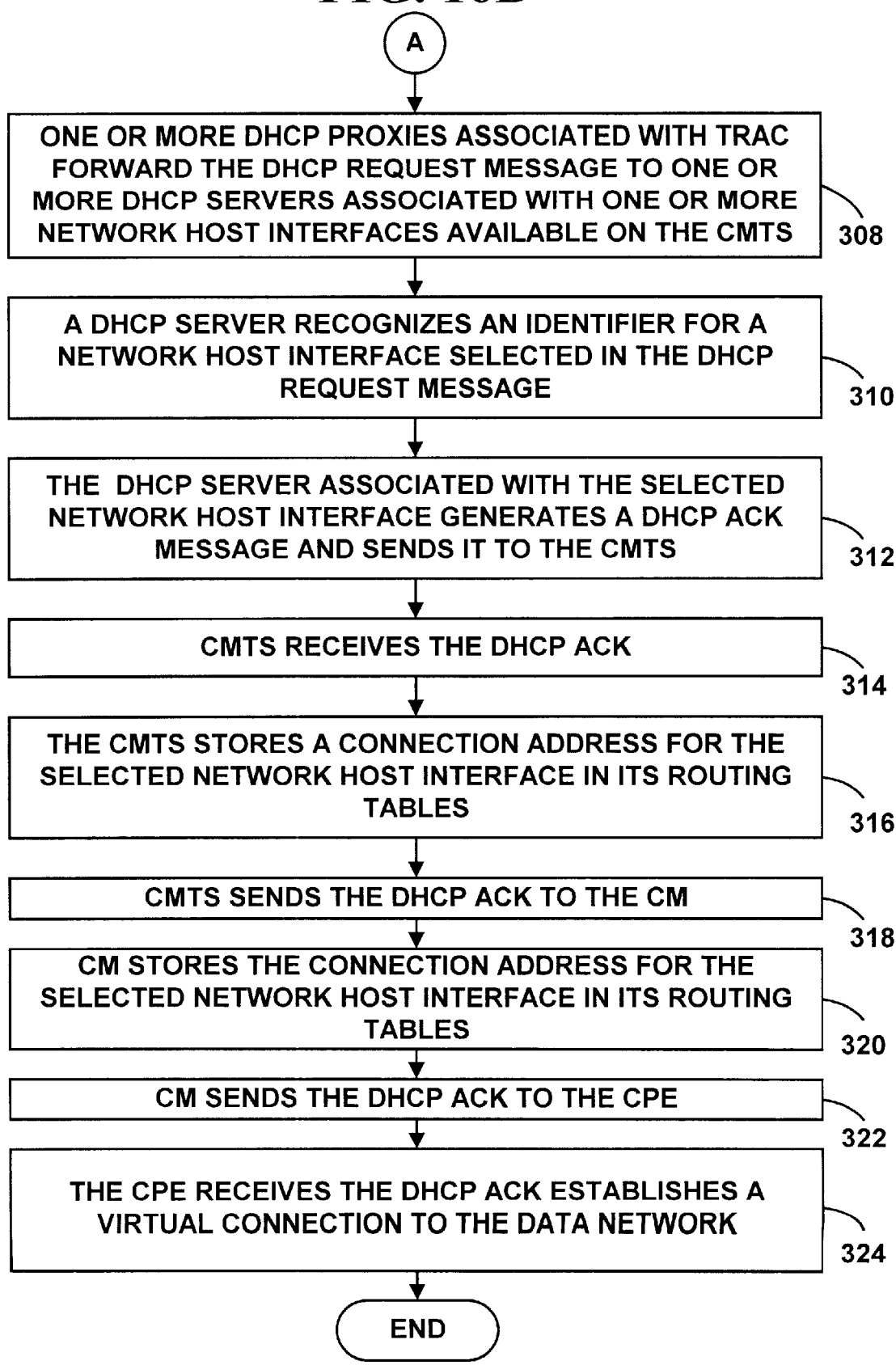

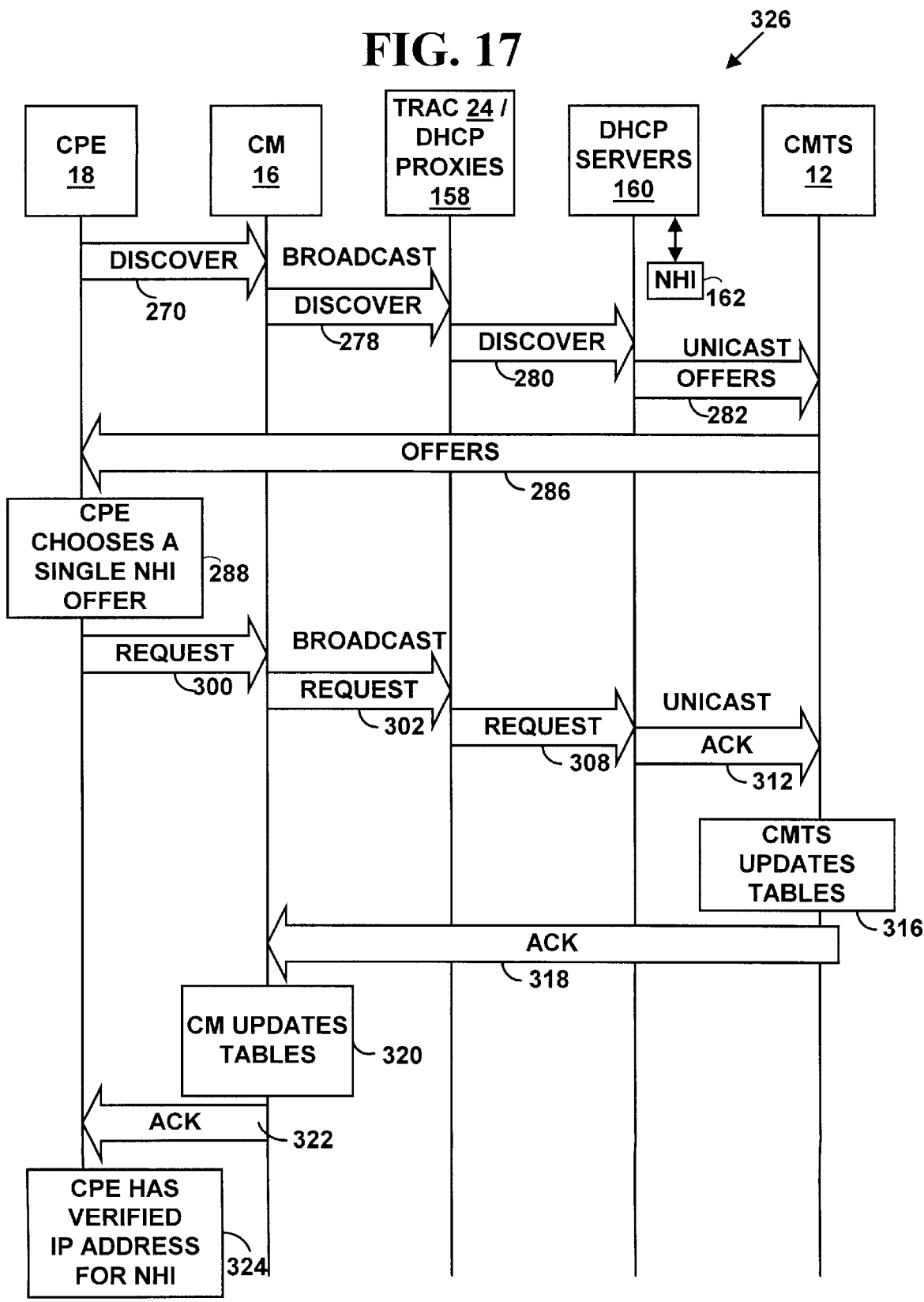

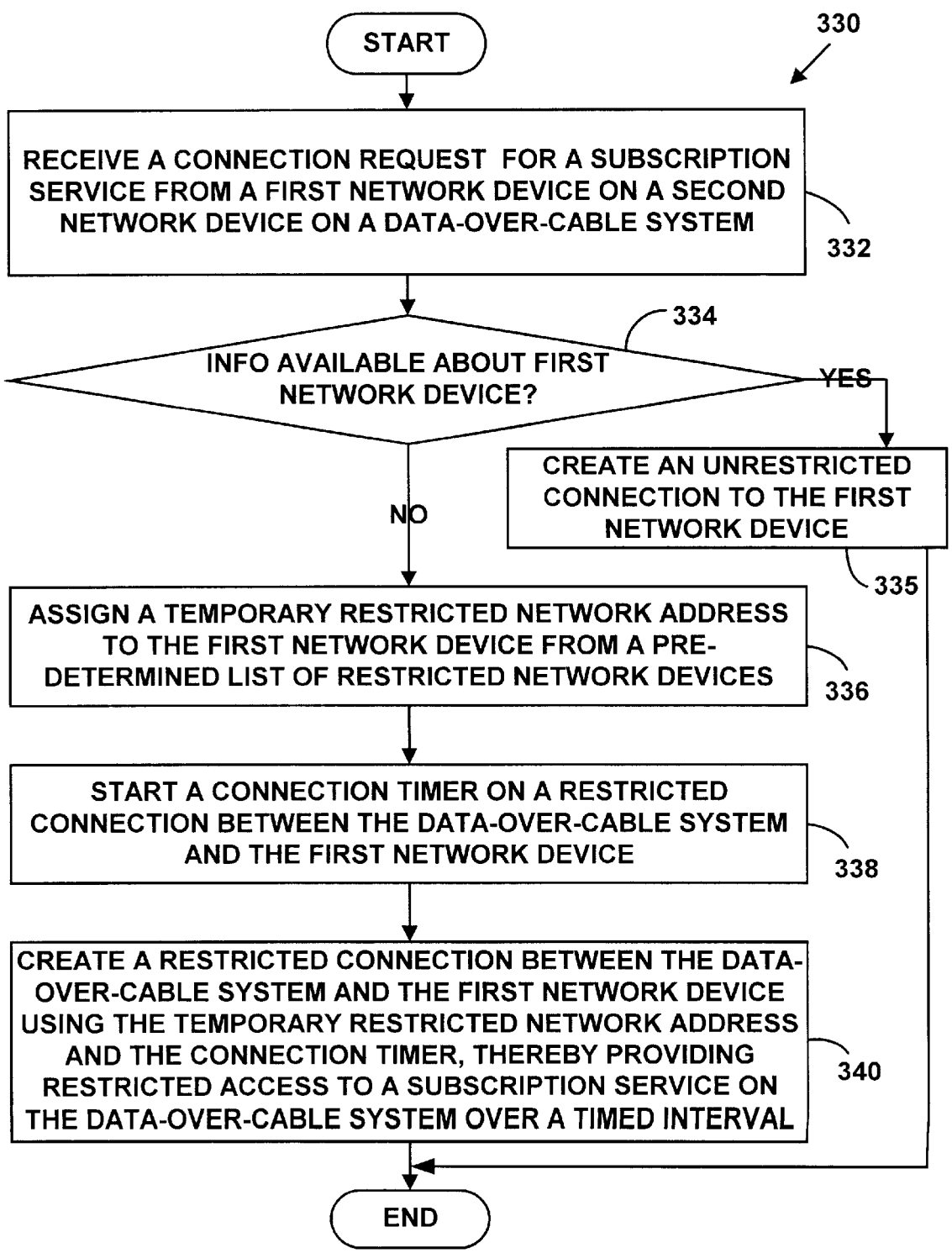

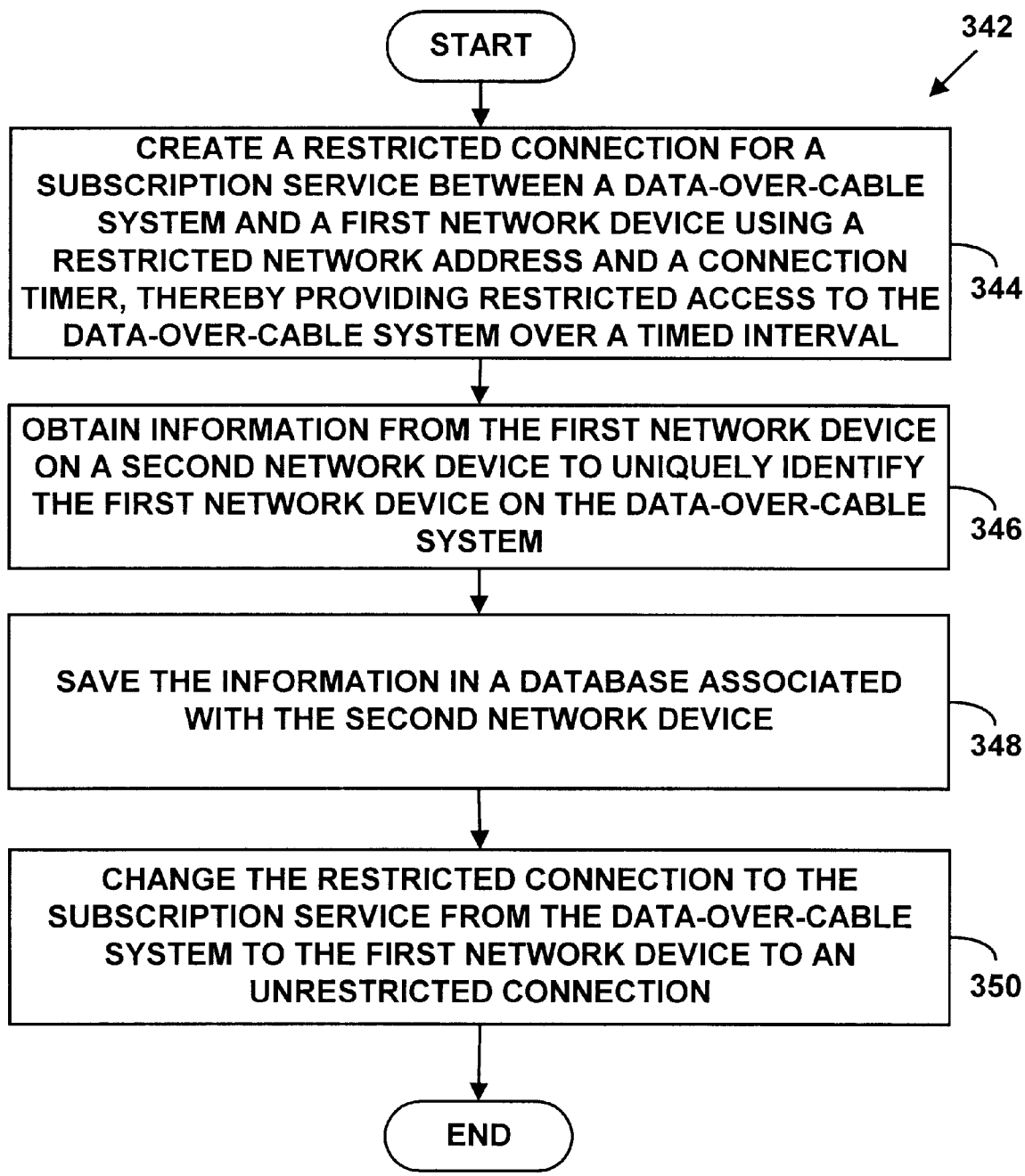

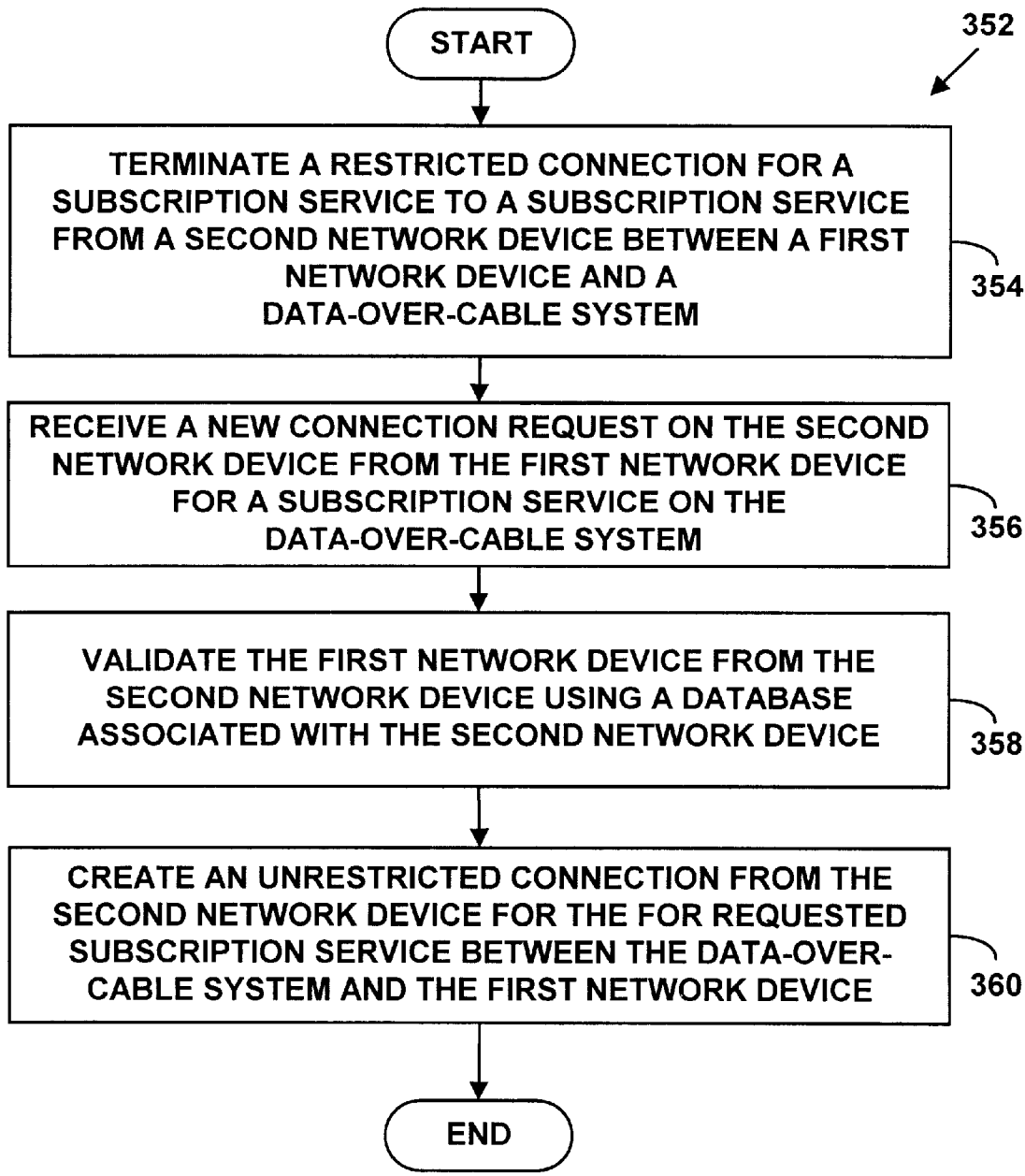

METHODS FOR RESTRICTING ACCESS OF NETWORK DEVICES TO SUBSCRIPTION SERVICES IN A DATA-OVER-CABLE SYSTEM

FIELD OF INVENTION

The present invention relates to communications in computer networks. More specifically, it relates to methods for restricting access of network devices to subscription services in a data-over-cable system.

BACKGROUND OF THE INVENTION

Cable television networks such as those provided by Comcast Cable Communications, Inc., of Philadelphia, Pa., Cox Communications of Atlanta, Ga., Tele-Communications, Inc., of Englewood Colo., Time-Warner Cable, of Marietta Ga., Continental Cablevision, Inc., of Boston Mass., and others provide cable television services to a large number of subscribers over a large geographical area. The cable television networks typically are interconnected by cables such as coaxial cables or a Hybrid Fiber/Coaxial ("HFC") cable system which have data rates of about 10 Mega-bits-per-second ("Mbps") to about 30+ Mbps.

The Internet, a world-wide-network of interconnected computers, provides multi-media content including audio, video, graphics and text that typically requires a large bandwidth for downloading and viewing. Most Internet Service Providers ("ISPs") allow customers to connect to the Internet via a serial telephone line from a Public Switched Telephone Network ("PSTN") at data rates including 14,400 bps, 28,800 bps, 33,600 bps, 56,000 bps and others that are much slower than the about 10 Mbps to about 30+ Mbps available on a coaxial cable or HFC cable system on a cable television network.

With the explosive growth of the Internet, many customers have desired to use the larger bandwidth of a cable television network to connect to the Internet and other computer networks.

Cable modems, such as those provided by 3Com Corporation, of Santa Clara, Calif., Motorola Corporation, of Arlington Heights, Ill., Hewlett-Packard Co., of Palo Alto, Calif., Bay Networks, of Santa Clara, Calif., Scientific-Atlanta, of Norcross, Ga. and others offer customers higher-speed connectivity to the Internet, an intranet, Local Area Networks ("LANs") and other computer networks via cable television networks. These cable modems currently support a data connection to the Internet and other computer networks via a cable television network with a data rate of up to about 30+ Mbps, which is a much larger data rate than can be supported by a modem used over a serial telephone line.

However, many cable television networks provide only unidirectional cable systems, supporting only a "downstream" cable data path. A downstream data path is the flow of data from a cable system "headend" to a customer. A cable system headend is a central location in the cable television network that is responsible for sending cable signals in the downstream direction. A return data path via a telephone network (i.e., a "telephony return"), such as a public switched telephone network provided by AT&T, GTE, Sprint, MCI and others, is typically used for an "upstream" data path. An upstream data path is the flow of data from the customer back to the cable system headend. A cable television system with an upstream connection to a telephony network is called a "data-over-cable system with telephony return."

An exemplary data-over-cable system with telephony return includes customer premise equipment (e.g., a customer computer), a cable modem, a cable modem termination system, a cable television network, a public switched telephone network, a telephony remote access concentrator and a data network (e.g., the Internet). The cable modem termination system and the telephony remote access concentrator together are called a "telephony return termination system."

The cable modem termination system receives data packets from the data network and transmits them downstream via the cable television network to a cable modem attached to the customer premise equipment. The customer premise equipment sends response data packets to the cable modem, which sends response data packets upstream via public switched telephone network to the telephony remote access concentrator, which sends the response data packets back to the appropriate host on the data network.

In a two-way cable system without telephony return, the customer premise equipment sends response data packets to the cable modem, which sends the data packets upstream via the cable television network to the cable modem termination system. The cable modem termination system sends the data packets to appropriate hosts on the data network. The cable modem termination system sends the response data packets back to the appropriate cable modem.

As a cable modem is initialized in a data-over-cable system, it registers with a cable modem termination system to allow the cable modem to receive data over a cable television connection and from a data network (e.g., the Internet or an Intranet). The cable modem forwards configuration information it receives in a configuration file during initialization to the cable modem termination system as part of a registration request message. A cable modem also helps initialize and register any attached customer premise equipment with the cable modem termination system.

A cable modem termination system in a data-over-cable system typically manages connections to tens of thousands of cable modems. Most of the cable modems are attached to host customer premise equipment such as a customer computer. To send and receive data to and from a computer network like the Internet or an intranet, a cable modem and customer premise equipment and other network devices have a network address dynamically assigned on the data-over-cable system. Many data-over-cable systems use a Dynamic Host Configuration Protocol ("DHCP") as a standard messaging protocol to dynamically allocate network addresses such as Internet Protocol ("IP") addresses. As is known in the art, the Dynamic Host Configuration Protocol is a protocol for passing configuration information to network devices on a network. The Internet Protocol is an addressing protocol designed to route traffic within a network or between networks.

Since the cable modem termination system typically manages connections to tens of thousands of cable modems and customer premise equipment, the cable modem termination system provides access to subscription services for the data-over-cable system as well as access to a subscription data network such as the Internet. The are several problems associated with providing access to subscription services in both the data-over-cable system and the data network for tens of thousand of cable modems and customer premise equipment. If the cable modem termination system does not provide security checks, a rogue cable modem could comprise the security of the cable plant and/or connections to the data network.

One solution is to store information about known cable modems that subscribe to a data-over-cable system in one or more cable modem termination system databases. When an individual cable modem requests a connection, the cable modem termination system is able to determine if the individual cable modem is authorized to access the data-over-cable system using the stored information from the databases. However, such a solution cannot be used for new subscribers, or existing subscribers who connect a new type of cable modem to the data-over-cable system, without updating the databases first. Requiring a database update for one or more databases associated with the cable modem termination system may prevent a new user from accessing the data-over-cable system without a delay, and may also prevent an existing subscriber from using a new cable modem without a delay. The delays may lead to user frustration.

Thus, it is desirable to allow a cable modem termination system to provide restricted access to subscription services for a data-over-cable system. The restricted access should not prevent new subscribers or existing subscribers with a new type of cable modem from accessing subscription services on the data-over-cable system without a long delay.

SUMMARY OF THE INVENTION

In accordance with preferred embodiments of the present invention, some of the problems associated with restricting access to subscription services a data-over-cable system are overcome. One aspect of the invention includes a method for restricting access to subscription services in a data-over-cable system. The method includes receiving a connection request from a first network device on a second network device on a data-over cable system for a subscription service on the data-over-cable system. It is determined from the second network device, whether information about the first network device is available on the data-over-cable system. If not, a temporary restricted network address is assigned for a restricted connection to the first network device on the data-over-cable system from pre-determined list of restricted network addresses. The temporary network address from the pre-determined list of restricted network addresses provides restricted access to subscription services the data-over-cable system. A connection timer on the data-over-cable system for a restricted connection to the first network device is started. The connection timer restricts access to subscription services the data-over-cable system over a timed interval. A restricted connection is created between the data-over-cable system and the first network device including the temporary restricted network address and connection timer, thereby providing restricted access to the data-over-cable system over a timed interval.

The method may allow a cable modem termination system to provide restricted access for new or unknown cable modems or customer premise equipment, to subscription services on a data-over-cable system. However, other network devices could also be used to provide and obtain restricted access on a data-over-cable system, and the present invention is not limited to cable modem termination systems, cable modems, or customer premise equipment. The restricted access to subscription services to subscription services is provided without a long delay, and limits a new or unknown cable modem to a temporary network address for a limited amount of time. Thus, restricted access may also be provided without compromising the security of the data-over-cable system or the connections to the data network (e.g., the Internet).

The foregoing and other features and advantages of a preferred embodiment of the present invention will be more readily apparent from the following detailed description, which proceeds with references to the accompanying drawings.

BRIEF DESCRIPTION OF THE DRAWINGS

Preferred embodiments of the present invention are described with reference to the following drawings, wherein:

FIG. 2 is a block diagram illustrating a protocol stack for a cable modem;

FIG. 3 is a block diagram illustrating a Telephony Channel Descriptor message structure;

FIG. 4 is a block diagram illustrating a Termination System Information message structure;

FIG. 5 is a flow diagram illustrating a method for addressing hosts in a cable modem system;

FIGS. 7A and 7B are a flow diagram illustrating a method for discovering hosts in a cable modem system;

FIG. 9 is a block diagram illustrating the message flow of the method illustrated in FIGS. 7A and 7B;

FIGS. 10A and 10B are a flow diagram illustrating a method for resolving host addresses in a data-over-cable system;

FIG. 11 is a flow diagram illustrating a method for resolving discovered host addresses.

FIGS. 13A and 13B are a flow diagram illustrating a method for obtaining addresses for customer premise equipment;

FIGS. 14A and 14B are a flow diagram illustrating a method for resolving addresses for customer premise equipment;

FIGS. 15A and 15B are a flow diagram illustrating a method for addressing network host interfaces from customer premise equipment;

FIGS. 16A and 16B are a flow diagram illustrating a method for resolving network host interfaces from customer premise equipment;

FIG. 17 is a block diagram illustrating a message flow for the methods in FIGS. 15A, 15B, and 16A and 16B;

FIG. 18 is a flow diagram illustrating a method for restricting access to network devices in a data-over-cable system;

FIG. 19 is a flow diagram illustrating a method for changing access for a network device in a data-over-cable system; and FIG. 20 is a flow diagram illustrating a method for changing access for a network device in a data-over-cable system.

DETAILED DESCRIPTION OF PREFERRED EMBODIMENTS

Exemplary Data-over-cable System

Figure 1:
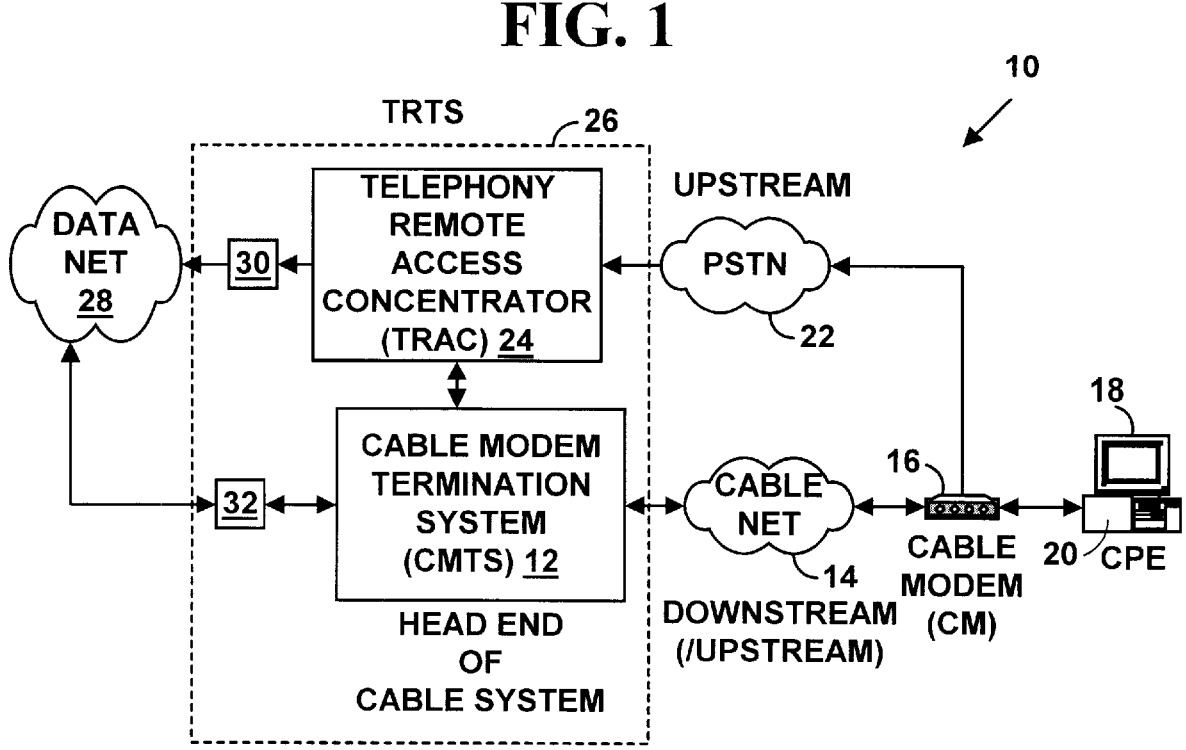
FIG. 1 is a block diagram illustrating a cable modem system with telephony return.

FIG. 1 is a block diagram illustrating an exemplary data-over-cable system 10. Most cable providers known in the art predominately provide uni-directional cable systems, supporting only a "downstream" data path. A downstream data path is the flow of data from a cable television network "headend" to customer premise equipment (e.g., a customer's personal computer). A cable television network headend is a central location that is responsible for sending cable signals in a downstream direction. A return path via a telephony network ("telephony return") is typically used for an "upstream" data path in uni-directional cable systems. An upstream data path is the flow of data from customer premise equipment back to the cable television network headend.

However, data-over-cable system 10 of the present invention may also provide a bi-directional data path (i.e., both downstream and upstream) without telephony return as is also illustrated in FIG. 1 and the present invention is not limited to a data-over-cable system with telephony return. In a data-over cable system without telephony return, customer premise equipment or a cable modem has an upstream connection to the cable modem termination system via a cable television connection, a wireless connection, a satellite connection, or a connection via other technologies to send data upstream to the cable modem termination system.

Data-over-cable system 10 includes a Cable Modem Termination System ("CMTS") 12 connected to a cable television network 14, hereinafter cable network 14. FIG. 1 illustrates one CMTS 12. However, data-over-cable system 10 can include multiple CMTS 12. Cable network 14 includes cable television networks such as those provided by Comcast Cable Communications, Inc., of Philadelphia, Pa., Cox Communications, or Atlanta, Ga., Tele-Communications, Inc., of Englewood Color., Time-Warner Cable, of Marietta, Ga., Continental Cablevision, Inc., of Boston, Mass., and others. The cable network 14 is connected to a Cable Modem ("CM") 16 with a downstream cable connection. The CM 16 is any cable modem such as those provided by 3Com Corporation of Santa Clara, Calif., Motorola Corporation of Arlington Heights, Ill., Hewlett-Packard Co. of Palo Alto, Calif., Bay Networks of Santa Clara, Calif., Scientific-Atlanta, of Norcross, Ga. and others. FIG. 1 illustrates one CM 16. However, in a typical data-over-cable system, tens or hundreds of thousands of the CM 16 are connected to the CMTS 12.

The CM 16 is connected to Customer Premise Equipment ("CPE") 18 such as a personal computer system via a Cable Modem-to-CPE Interface ("CMCI") 20. In one preferred embodiment of the present invention, the CM 16 is connected to a Public Switched Telephone Network ("PSTN") 22 with an upstream telephony connection. The PSTN 22 includes those public switched telephone networks provided by AT&T, Regional Bell Operating Companies (e.g., Ameritech, U.S. West, Bell Atlantic, Southern Bell Communications, Bell South, NYNEX, and Pacific Telesis Group), GTE, Sprint, MCI and others. The upstream telephony connection is any of a standard telephone line connection, Integrated Services Digital Network ("ISDN") connection, Asymmetric Digital Subscriber Line ("ADSL") connection, or other telephony connection. The PSTN 22 is connected to a Telephony Remote Access Concentrator ("TRAC")

In another preferred embodiment of the present invention, a data-over cable system without telephony return, the CM 16 has an upstream connection to the CMTS 12 via a cable television connection, a wireless connection, a satellite connection, or a connection via other technologies to send data upstream outside of the telephony return path. An upstream cable television connection via cable network 14 is illustrated in FIG. 1.

FIG. 1 illustrates a telephony modem integral to the CM 16. In another embodiment of the present invention, the telephony modem is a separate modem unit external to the CM 16 used specifically for connecting with the PSTN 22. A separate telephony modem includes a connection to the CM 16 for exchanging data. In yet another embodiment of the present invention, the CM 16 includes functionality to connect only to the cable network 14 and receives downstream signals from the cable network 14 and sends upstream signals to the cable network 14 without telephony return. The present invention is not limited to cable modems used with telephony return.

In one preferred embodiment of the present invention of the telephony return, the TRAC 26 is a Total Control Telephony Hub by 3Com Corporation of Santa Clara, Calif.. An exemplary TRAC 26 is described in U.S. Pat. No. 5,528,595, granted to Dale M. Walsh et al., and incorporated herein by reference. However, the TRAC 26 could also be used including those by Lucent Technologies of Murray Hill, N.J., Livingston Enterprises, Inc. of Pleasanton, Calif., Ascend Communications of Alameda, Calif. and others.

The CMTS 12 and the TRAC 24 may be at a "headend" of cable system 10, or the TRAC 24 may be located elsewhere and have routing associations to the CMTS 12. The CMTS 12 and the TRAC 24 together are called a "Telephony Return Termination System" ("TRTS") 26. The TRTS 26 is illustrated by a dashed box in FIG. 1. The CMTS 12 and the TRAC 24 make up the TRTS 26 whether or not they are located at the headend of cable network 14. The TRAC 24 may be located in a different geographic location from the CMTS 12. Content severs, operations servers, administrative servers and maintenance servers used in data-over-cable system 10 (not shown in FIG. 1) may also be in different locations. Access points to the data-over-cable system 10 are connected to one or more CMTS 12, or cable headend access points. Such configurations may be "one-to-one", "one-to-many," or "many-to-many," and may be interconnected to other Local Area Networks ("LANs") or Wide Area Networks ("WANs").

The TRAC 24 is connected to a data network 28 (e.g., the Internet, an intranet or other LAN) by a TRAC-Network System Interface 30 ("TRAC-NSI"). The CMTS 12 is connected to data network 28 by a CMTS-Network System Interface ("CMTS-NSI") 32. The present invention is not limited to data-over-cable system 10 illustrated in FIG. 1, and more or fewer components, connections and interfaces could also be used. The present invention may also be used in a data-over-cable system 10 with or without telephony return.

Network Device Protocol Stack

FIG. 2 is a block diagram illustrating a protocol stack 36 for network devices in data-over-cable system 10. FIG. 2 illustrates the downstream and upstream protocols used, for example, in the CM 16. As is known in the art, the Open System Interconnection ("OSI") model is used to describe computer networks. The OSI model consists of seven layers including from lowest-to-highest, a physical, data-link, network, transport, session, presentation and application layer. The physical layer transmits bits over a communication link. The data link layer transmits error free frames of data. The network layer transmits and routes data packets.

For downstream data transmission, network devices including the CM 16 are connected to cable network 14 in a physical layer 38 via a Radio Frequency ("RF") Interface 40. In a preferred embodiment of the present invention, RF Interface 40 has an operation frequency range of 50 Mega-Hertz ("MHz") to 1 Giga-Hertz ("GHz") and a channel bandwidth of 6 MHz. However, other operation frequencies may also be used and the invention is not limited to these frequencies. The RF interface 40 uses a signal modulation method of Quadrature Amplitude Modulation ("QAM"). As is known in the art, QAM is used as a means of encoding digital information over radio, wire, or fiber optic transmission links. QAM is a combination of amplitude and phase modulation and is an extension of multiphase phase-shift-keying. QAM can have any number of discrete digital levels typically including 4, 16, 64 or 256 levels. In one embodiment of the present invention, QAM-64 is used in the RF interface 40. However, other operating frequencies modulation methods could also be used. For more information on the RF interface 40 see the Institute of Electrical and Electronic Engineers ("IEEE") standard 802.14 for cable modems incorporated herein by reference. IEEE standards can be found on the World Wide Web at the Universal Resource Locator ("URL") "www.ieee.org." However, other RF interfaces 40 could also be used and the present invention is not limited to IEEE 802.14 (e.g., RF interfaces from Multimedia Cable Network Systems ("MCNS") and others could also be used).

Above the RF interface 40 in a data-link layer 42 is a Medium Access Control ("MAC") layer 44. As is known in the art, the MAC layer 44 controls access to a transmission medium via physical layer 38. For more information on the MAC layer protocol 44 see IEEE 802.14 for cable modems. However, other MAC layer protocols 44 could also be used and the present invention is not limited to IEEE 802.14 MAC layer protocols (e.g., MCNS MAC layer protocols and others could also be used).

Above the MAC layer 44 is an optional link security protocol stack 46. The link security protocol stack 46 prevents unauthorized users from making a data connection from cable network 14. The RF interface 40 and the MAC layer 44 can also be used for an upstream connection in a data-over-cable system 10 without telephony return.

For upstream data transmission with telephony return, the CM 16 is connected to the PSTN 22 in physical layer 38 via modem interface 48. The International Telecommunications Union-Telecommunication Standardization Sector ("ITU-T", formerly known as the CCITT) defines standards for communication devices identified by "V.xx" series where "xx" is an identifying number. ITU-T standards can be found on the World Wide Web at the URL "www.itu.ch."

In one embodiment of the present invention, ITU-T V.34 is used as modem interface 48.

As is known in the art, ITU-T V.34 is commonly used in the data link layer for modem communications and currently allows data rates as high as 33,600 bits-per-second ("bps"). For more information see the ITU-T V.34 standard. However, other modem interfaces or other telephony interfaces could also be used. For example, Asymmetric Digital Subscriber Link ("ADSL") or Integrated Services Digital Network ("ISDN") telephony interface could also be used in place of the modem interface 48.

Above modem interface 48 in data link layer 42 is Point-to-Point Protocol ("PPP") layer 50, hereinafter PPP 50. As is known in the art, PPP is used to encapsulate network layer datagrams over a serial communications link. For more information on PPP see Internet Engineering Task Force ("IETF") Request for Comments ("RFC"), RFC-1661, RFC-1662 and RFC-1663, incorporated herein by reference. Information for IETF RFCs can be found on the World Wide Web at URLs "ds.internic.net" or "www.ietf.org."

Above both the downstream and upstream protocol layers in a network layer 52 is an Internet Protocol ("IP") layer 54. IP layer 54, hereinafter IP 54, roughly corresponds to OSI layer 3, the network layer, but is typically not defined as part of the OSI model. As is known in the art, IP 54 is a routing protocol designed to route traffic within a network or between networks. For more information on IP 54 see RFC-791 incorporated herein by reference.

Internet Control Message Protocol ("ICMP") layer 56 is used for network management. The main functions of ICMP layer 56, hereinafter ICMP 56, include error reporting, reachability testing (e.g., "pinging") congestion control, route-change notification, performance, subnet addressing and others. Since IP 54 is an unacknowledged protocol, datagrams may be discarded and ICMP 56 is used for error reporting. For more information on ICMP 56 see, RFC-792, incorporated herein by reference.

Above IP 54 and ICMP 56 is a transport layer 58 with a User Datagram Protocol layer 60 ("UDP"). UDP layer 60, hereinafter UDP 60, roughly corresponds to OSI layer 4, the transport layer, but is typically not defined as part of the OSI model. As is known in the art, UDP 60 provides a connectionless mode of communications with datagrams. For more information on UDP 60 see RFC-768, incorporated herein by reference.

Above the network layer are a Simple Network Management Protocol ("SNMP") layer 62, Trivial File Transfer Protocol ("TFTP") layer 64, Dynamic Host Configuration Protocol ("DHCP") layer 66 and a UDP manager 68. SNMP layer 62 is used to support network management functions. For more information on SNMP layer 62 see RFC-1157, incorporated herein by reference. TFTP layer 64 is a file transfer protocol used to download files and configuration information. For more information on TFTP layer 64 see RFC-1350 incorporated herein by reference. The DHCP layer 66 is a protocol for passing configuration information to hosts on an IP 54 network. For more information on the DHCP layer 66 see RFC-1541 and RFC-2131, incorporated herein by reference. UDP manager 68 distinguishes and routes packets to an appropriate service (e.g., a virtual tunnel). More or few protocol layers could also be used with data-over-cable system 10.

The CM 16 supports transmission and reception of IP 54 datagrams as specified by RFC-791. The CMTS 12 and the TRAC 24 may also perform filtering of IP 54 datagrams. The CM 16 is also configurable for IP 54 datagram filtering to restrict the CM 16 and the CPE 18 to the use of only their assigned IP 54 addresses. The CM 16 is configurable for IP 54 datagram UDP 60 port filtering (i.e., deep filtering).

The CM 16 forwards IP 54 datagrams destined to an IP 54 unicast address across the cable network 14 or the PSTN 22. Some routers have security features intended to filter out invalid users who alter or masquerade packets as if sent from a valid user. Since routing policy is under the control of network operators, such filtering is a vendor specific implementation. For example, dedicated interfaces (i.e., Frame Relay) may exist between the TRAC 24 and/or the CMTS 12 which preclude filtering, or various forms of virtual tunneling and reverse virtual tunneling could be used to virtually source upstream packets from the CM 16. For more information on virtual tunneling, see Level 2 Tunneling Protocol ("L2TP") or Point-to-Point Tunneling Protocol ("PPTP") in IETF draft documents incorporated herein by reference by Kory Hamzeh, et. al (IETF draft documents are precursors to IETF RFCs and are works in progress).

The CM 16 also forwards IP 54 datagrams destined to an IP 54 multicast address across the cable network 14 or the PSTN 22. The CM 16 is configurable to keep IP 54 multicast routing tables and to use group membership protocols. The CM 16 is also capable of IP 54 tunneling upstream through the telephony path. A CM 16 that wants to send a multicast packet across a virtual tunnel will prepend another IP 54 header, set the destination address in the new header to be the unicast address of the CMTS 12 at the other end of the tunnel, and set the IP 54 protocol field to be four, which means the next protocol is IP 54.

The CMTS 12 at the other end of the virtual tunnel receives the packet, strips off the encapsulating IP 54 header, and forwards the packet as appropriate. A broadcast IP 54 capability is dependent upon the configuration of the direct linkage, if any, between the TRAC 24 and the CMTS 12. The CMTS 12, the CM 16, and the TRAC 24 are capable of routing IP 54 datagrams destined to an IP 54 broadcast address which is across the cable network 14 or the PSTN 22 if so configured. The CM 16 is configurable for IP 54 broadcast datagram filtering.

An operating environment for devices of the present invention includes a processing system with at least one high speed Central Processing Unit ("CPU") and a memory system. In accordance with the practices of persons skilled in the art of computer programming, the present invention is described below with reference to acts and symbolic representations of operations or instructions that are performed by the processing system, unless indicated otherwise. Such acts and operations or instructions are sometimes referred to as being "computer-executed", or "CPU executed."

It will be appreciated that the acts and symbolically represented operations include the manipulation of electrical signals by the CPU. An electrical system with data bits causes a resulting transformation or reduction of the electrical signal representation, and the maintenance of data bits at memory locations in the memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic disks, and any other volatile or non-volatile mass storage system readable by the CPU. The computer readable medium includes cooperating or interconnected computer readable media, which exist exclusively on the processing system or is distributed among multiple interconnected processing systems that may be local or remote to the processing system.

Initialization of a Cable Modem with Telephony Return

When the CM 16 is initially powered on, if telephony return is being used, the CM 16 will receive a Telephony Channel Descriptor ("TCD") from the CMTS 12 that is used to provide dialing and access instructions on downstream channels via cable network 14. Information in the TCD is used by the CM 16 to connect to the TRAC 24. The TCD is transmitted as a MAC management message with a management type value of TRI_TCD at a periodic interval (e.g., every 2 seconds). To provide for flexibility, the TCD message parameters are encoded in a Type/Length/Value ("TLV") form. However, other encoding techniques could also be used. FIG. 3 is a block diagram illustrating a TCD message structure 70 with MAC 44 management header 72 and Service Provider Descriptor(s) ("SPD") 74 encoded in TLV format. SPDs 74 are compound TLV encodings that define telephony physical-layer characteristics that are used by CM 16 to initiate a telephone call. The SPD 74 is a TLV-encoded data structure that contains sets of dialing and access parameters for CM 16 with telephony return. The SPD 74 is contained within TCD message 70. There may be multiple SPD 74 encodings within a single TCD message 70. There is at least one SPD 74 in TCD message 70. The SPD 74 parameters are encoded as SPD-TLV tuples. The SPD 74 contains the parameters shown in Table 1 and may contain optional vendor specific parameters. However, more or fewer parameters could also be used in the SPD 74.

TABLE 1

| SPD 74 Parameter | Description |
| --- | --- |
| Factory Default Flag | Boolean value, if TRUE (1), indicates a SPD which should be used by the CM 16. |
| Service Provider Name | This parameter includes the name of a service provider. Format is standard ASCII string composed of numbers and letters. |
| Telephone Numbers | These parameters contain telephone numbers that the CM 16 uses to initiate a telephony modem link during a login process. Connections are attempted in ascending numeric order (i.e., Phone Number 1, Phone Number 2 . . .). The SPD contains a valid telephony dial string as the primary dial string (Phone Number 1), secondary dial-strings are optional. Format is ASCII string(s) composed of: any sequence of numbers, pound "#" and star "*" keys and comma character "," used to indicate a two second pause in dialing. |
| Connection Threshold | The number of sequential connection failures before indicating connection failure. A dial attempt that does not result in an answer and connection after no more than ten rings is considered a failure. The default value is one. |
| Login User Name | This contains a user name the CM 16 will use an authentication protocol over the telephone link during the initialization procedure. Format is a monolithic sequence of alphanumeric characters in an ASCII string composed of numbers and letters. |
| Login Password | This contains a password that CM 16 will use during authentication over a telephone link during the initialization procedure. Format is a monolithic sequence of alphanumeric characters in an ASCII string composed of numbers and letters. |
| DHCP Authenticate | Boolean value, reserved to indicate that the CM 16 uses a specific indicated DHCP 66 Server (see next parameter) for a DHCP 66 Client and BOOTP Relay Process when TRUE (one). The default is FALSE (zero) which allows any DHCP 66 Server. |
| DHCP Server | IP 54 address value of a DHCP 66 Server the CM 16 uses for DHCP 66 Client and BOOTP Relay Process. If this attribute is present and DHCP 66 Authenticate attribute is TRUE (1). The default value is integer zero. |
| RADIUS Realm | The realm name is a string that defines a Remote Authentication Dial In User Service ("RADIUS") server domain. Format is a monolithic sequence of alphanumeric characters in an ASCII string composed of numbers and letters. |
| PPP Authentication | This parameter instructs the telephone modem which authentication procedure to perform over the telephone link. |
| Demand Dial Timer | This parameter indicates time (in seconds) of inactive networking time that will be allowed to elapse before hanging up a telephone connection at CM 16. If this optional parameter is not present, or |

TABLE 1-continued

| SPD 74 Parameter | Description |
|---|---|
|  | set to zero, then the demand dial feature is not activated. The default value is zero. |
| Vendor Specific Extensions | Optional vendor specific extensions. |

A Termination System Information ("TSI") message is transmitted by the CMTS 12 at periodic intervals (e.g., every 2 seconds) to report the CMTS 12 information to the CM 16 5 whether or not telephony return is used. The TSI message is transmitted as a MAC 44 management message. The TSI provides a CMTS 12 boot record in a downstream channel to the CM 16 via cable network 14. Information in the TSI is used by the CM 16 to obtain information about the status of the CMTS 12. The TSI message has a MAC 44 management type value of TRI_TSI.

FIG. 4 is a block diagram of a TSI message structure 76. TSI message structure 76 includes a MAC 44 management header 78, a downstream channel IP address 80, a registration IP address 82, a CMTS 12 boot time 84, a downstream channel identifier 86, an epoch time 88 and vendor specific TLV encoded data 90.

A description of the fields of TSI message 76 are shown in Table 2. However, more or fewer fields could also be used in TSI message 76.

TABLE 2

| TSI 76 Parameter | Description |
|---|---|
| Downstream Channel IP Address 80 | This field contains an IP 54 address of the CMTS 12 available on the downstream channel this message arrived on. |
| Registration IP Address 82 | This field contains an IP 54 address the CM 16 sends its registration request messages to. This address MAY be the same as the Downstream Channel IP 54 address. |
| CMTS Boot Time 84 | Specifies an absolute-time of a CMTS 12 recorded epoch. The clock setting for this epoch uses the current clock time with an unspecified accuracy. Time is represented as a 32 bit binary number. |
| Downstream Channel ID 86 | A downstream channel on which this message has been transmitted. This identifier is arbitrarily chosen by CMTS 12 and is unique within the MAC 44 layer. |
| Epoch 88 | An integer value that is incremented each time the CMTS 12 is either re-initialized or performs address or routing table flush. |
| Vendor Specific Extensions 90 | Optional vendor extensions may be added as TLV encoded data. |

If telephony returns are being used, after receiving TCD 70 message and TSI message 76, CM 16 continues to establish access to data network 28 (and resources on the network) by first dialing into the TRAC 24 and establishing a telephony PPP 50 session. Upon the completion of a successful PPP 50 connection, the CM 16 performs PPP 50 Link Control Protocol ("LCP") negotiation with the TRAC 24. Once LCP negotiation is complete, the CM 16 requests Internet Protocol Control Protocol ("IPCP") address negotiation. For more information on IPCP see RFC-1332 incorporated herein by reference. During IPCP negotiation, the CM 16 negotiates an IP 54 address with the TRAC 24 for sending IP 54 data packet responses back to data network 28 via the TRAC 24, via PPP 50.

When the CM 16 has established an IP 54 link to TRAC 24, it begins "upstream" communications to the CMTS 12 via the DHCP layer 66 to complete a virtual data connection by attempting to discover network host interfaces available on the CMTS 12 (e.g., IP 54 host interfaces for a virtual IP 54 connection). The virtual data connection allows the CM 16 to receive data from data network 28 via the CMTS 12 and cable network 14, and send return data to data network 28 via TRAC 24 and PSTN 22. The CM 16 first determines an address of a host interface (e.g., an IP 54 interface) associated with on the CMTS 12 that can be used by data network 28 to send data to the CM 16. However, the CM 16 has only a downstream connection from the CMTS 12 and has to obtain a connection address to the data network 28 using an upstream connection to the TRAC 24.

Addressing Network Host Interfaces in the Data-over-cable System Via the Cable Modem FIG. 5 is a flow diagram illustrating a method 92 for addressing network host interfaces in a data-over-cable system with telephony return via a cable modem. Method 92 allows a cable modem to establish a virtual data connection to a data network. In method 92, multiple network devices are connected to a first network with a downstream connection of a first connection type, and connected to a second network with an upstream connection of a second connection type. The first and second networks are connected to a third network with a third connection type.

At Step 94, a selection input is received on a first network device from the first network over the downstream connection. The selection input includes a first connection address allowing the first network device to communicate with the first network via upstream connection to the second network. At Step 96, a first message of a first type for a first protocol is created on the first network device having the first connection address from the selection input in a first message field. The first message is used to request a network host interface address on the first network. The first connection address allows the first network device to have the first message with the first message type forwarded to network host interfaces available on the first network via the upstream connection to the second network.

At Step 98, the first network device sends the first message over the upstream connection to the second network. The second network uses the first address field in the first message to forward the first message to one or more network host interfaces available on first network at Step 100. Network host interfaces available on the first network that can provide the services requested in first message send a second message with a second message type with a second connection address in a second message field to the first network at Step 102. The second connection address allows the first network device to receive data packets from the third network via a network host interface available on the first network. The first network forwards one or more second messages on the downstream connection to the first network device at Step 104.

The first network device selects a second connection address from one of the second messages from one of the one or more network host interfaces available on the first network at Step 106 and establishes a virtual connection from the third network to the first network device using the second connection address for the selected network host interface.

The virtual connection includes receiving data on the first network host interface on the first network from the third network and sending the data over the downstream connection to the first network device. The first network device sends data responses back to the third network over the upstream connection to the second network, which forwards the data to the appropriate destination on the third network.

In one preferred embodiment of the present invention, the data-over-cable system is the data-over-cable system 10, with telephony return. In such an embodiment, the first network device is the CM 16, the first network is the cable network 14, and the downstream connection is a cable television connection. The second network is the PSTN 22, the upstream connection is a telephony connection, the third network is data network 28 (e.g., the Internet or an intranet) and the third type of connection is an IP 54 connection. The first and second connection addresses are IP 54 addresses. However, the present invention is not limited to the network components and addresses described. Method 92 allows the CM 16 to determine an IP 54 network host interface address available on the CMTS 12 to receive IP 54 data packets from data network 28, thereby establishing a virtual IP 54 connection with data network 28.

After addressing network host interfaces using Method 92, an exemplary data path through cable system 10 is illustrated in Table 3. However other data paths could also be used and the present invention is not limited to the data paths shown in Table 3. For example, the CM 16 may send data upstream back through cable network 14 (e.g., the CM 16 to cable network 14 to the CMTS 12) and not use the PSTN 22, the TRAC 24 or the telephony return upstream path.

TABLE 3

1. An IP 54 datagram from data network 28 destined for the CM 16 arrives on the CMTS-NSI 32 and enters the CMTS 12.
2. CMTS 12 encodes the IP 54 datagram in a cable data frame, passes it to MAC 44 and transmits it "downstream" to RF interface 40 on the CM 16 via cable network 14.
3. CM 16 recognizes the encoded IP 54 datagram in MAC layer 44 received via RF interface 40.
4. CM 16 responds to the cable data frame and encapsulates a response IP 54 datagram in a PPP 50 frame and transmits it "upstream" with modem interface 48 via the PSTN 22 to TRAC 24.
5. TRAC 24 decodes the IP 54 datagram and forwards it via TRAC-NSI 30 to a destination on data network 28.

Dynamic Network Host Configuration on Data-over-cable System

As was illustrated in FIG. 2, the CM 16 includes a Dynamic Host Configuration Protocol ("DHCP") layer 66, hereinafter the DHCP 66. The DHCP 66 is used to provide configuration parameters to hosts on a network (e.g., an IP 54 network). The DHCP 66 consists of two components: a protocol for delivering host-specific configuration parameters from a DHCP 66 server to a host and a mechanism for allocation of network host addresses to hosts. The DHCP 66 is built on a client-server model, where designated the DHCP 66 servers allocate network host addresses and deliver configuration parameters to dynamically configured network host clients.

Figure 6:
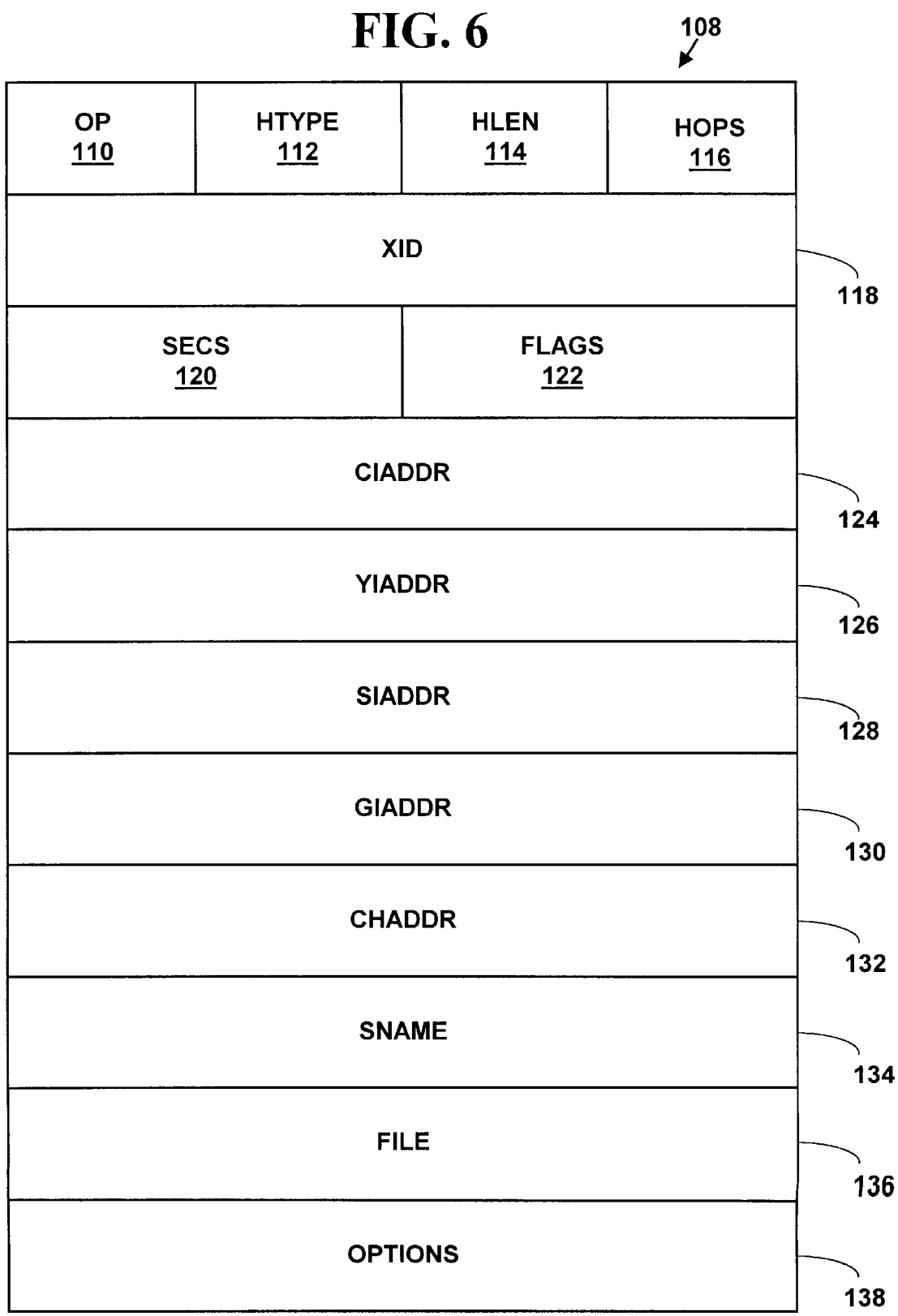
FIG. 6 is a block diagram illustrating a Dynamic Host Configuration Protocol message structure.

FIG. 6 is a block diagram illustrating an exemplary DHCP 66 message structure 108. The format of the DHCP 66 messages is based on the format of BOOTstrap Protocol ("BOOTP") messages described in RFC-951 and RFC-1542, incorporated herein by reference. From a network host client's point of view, the DHCP 66 is an extension of the BOOTP mechanism. This behavior allows existing BOOTP clients to interpret with the DHCP 66 servers without requiring any change to network host the clients' BOOTP initialization software. The DHCP 66 provides persistent storage of network parameters for network host clients.

To capture BOOTP relay agent behavior described as part of the BOOTP specification and to allow interoperability of existing BOOTP clients with the DHCP 66 servers, the DHCP 66 uses a BOOTP message format. Using BOOTP relaying agents eliminates the necessity of having a DHCP 66 server on each physical network segment.

DHCP 66 message structure 108 includes an operation code field 110 ("op"), a hardware address type field 112 ("htype"), a hardware address length field 114 ("hlen"), a number of hops field 116 ("hops"), a transaction identifier field 118 ("xid"), a seconds elapsed time field 120 ("secs"), a flags field 122 ("flags"), a client IP address field 124 ("ciaddr"), a your IP address field 126 ("yiaddr"), a server IP address field 128 ("siaddr"), a gateway/relay agent IP address field 130 ("giaddr"), a client hardware address field 132 ("chaddr"), an optional server name field 134 ("sname"), a boot file name 136 ("file") and an optional parameters field 138 ("options"). Descriptions for an exemplary DHCP 66 message 108 fields are shown in Table 4.

TABLE 4

| DCHP 66 Parameter | Description |
|---|---|
| OP 110 | Message op code/message type. 1 BOOTREQUEST, 2 = BOOTREPLY. |
| HTYPE 112 | Hardware address type (e.g., '1' = 10 Mps Ethernet). |
| HLEN 114 | Hardware address length (e.g. '6' for 10 Mbps Ethernet). |
| HOPS 116 | Client sets to zero, optionally used by relay-agents when booting via a relay-agent. |
| XID 118 | Transaction ID, a random number chosen by the client, used by the client and server to associate messages and responses between a client and a server. |
| SECS 120 | Filled in by client, seconds elapsed since client started trying to boot. |
| FLAGS 122 | Flags including a BROADCAST bit. |
| CIADDR 124 | Client IP address; filled in by client in DHCPREQUEST if verifying previously allocated configuration parameters. |
| YIADDR 126 | 'Your' (client) IP address. |
| SIADDR 128 | IP 54 address of next server to use in bootstrap; returned in DHCPOFFER, DHCPACK and DHCPNAK by server. |
| GIADDR 130 | Gateway relay agent IP 54 address, used in booting via a relay-agent. |
| CHADDR 132 | Client hardware address (e.g., MAC layer 44 address). |
| SNAME 134 | Optional server host name, null terminated string. |
| FILE 136 | Boot file name, terminated by a null string. |
| OPTIONS 138 | Optional parameters. |

The DHCP 66 message structure shown in FIG. 6 is used to discover IP 54 and other network host interfaces in data-over-cable system 10. A network host client (e.g., the CM 16) uses the DHCP 66 to acquire or verify an IP 54 address and network parameters whenever the network parameters may have changed. Table 5 illustrates a typical use of the DHCP 66 protocol to discover a network host interface from a network host client.

TABLE 5

1. A network host client broadcasts a DHCPDISCOVER message on its local physical subnet. The DHCPDISCOVER message may include options that suggest values for a network host interface address. BOOTP relay agents may pass the message on to DHCP 66 servers not on the same physical subnet.

TABLE 5-continued

2. DHCP servers may respond with a DHCPOFFER message that includes an available network address in the 'yiaddr' field (and other configuration parameters in DHCP 66 options) from a network host interface. DHCP 66 servers unicasts the DHCPOFFER message to the network host client (using the DHCP/BOOTP relay agent if necessary) if possible, or may broadcast the message to a broadcast address (preferably 255.255.255.255) on the client's subnet.
3. The network host client receives one or more DHCPOFFER messages from one or more DHCP 66 servers. The network host client may choose to wait for multiple responses.
4. The network host client chooses one DHCP 66 server with an associated network host interface from which to request configuration parameters, based on the configuration parameters offered in the DHCPOFFER messages.

Discovering Network Host Interfaces in the Data-over-cable System

The DHCP 66 discovery process illustrated in table 5 will not work in data-over-cable system 10. In an exemplary preferred embodiment of the present invention with telephony return, the CM 16 discovers network host interfaces via TRAC 24 and the PSTN 22 on an upstream connection. In another exemplary preferred embodiment of the present invention without telephony return, the CM 16 discovers network host interfaces via the CMTS 12 or an upstream connection.

The DHCP 66 addressing process shown in Table 5 was not originally intended to discover network host interfaces in data-over-cable system 10. The CMTS 12 has the DHCP 66 servers associated with network host interfaces (e.g., IP interfaces), but in one preferred embodiment of the present invention with telephony return, the CM 16 only has as downstream connection from the CMTS 12. the CM 16 has an upstream connection to TRAC 24, which has a DHCP 66 layer. However, TRAC 24 does not have the DHCP 66 servers, or direct access to network host interfaces (e.g., IP 54 interfaces) on the CMTS 12.

FIGS. 7A and 7B are a flow diagram illustrating a Method 140 for discovering network host interfaces in data-over-cable system 10. When the CM 16 has established an IP 54 link to TRAC 24, via PPP 50, it begins communications with the CMTS 12 via the DHCP 66 to complete a virtual IP 54 connection with data network 28. However, to discover what IP 54 host interfaces might be available on the CMTS 12, the CM 16 has to communicate with the CMTS 12 via the PSTN 22 and TRAC 24 since the CM 16 only has a "downstream" cable channel from the CMTS 12 in a data-over-cable system with telephony return.

At Step 142 in FIG. 7A, after receiving a TSI message 76 from the CMTS 12 on a downstream connection, the CM 16 generates a DHCP discover ("DHCPDISCOVER") message and sends it upstream via the PSTN 22 to TRAC 22 to discover what IP 54 interfaces are available on the CMTS 12. The fields of the DHCP 66 discover message are set as illustrated in Table 6. However, other field settings may also be used.

TABLE 6

| DHCP 66 Parameter | Description |
|---|---|
| OP 110 | Set to BOOTREQUEST. |
| HTYPE 112 | Set to network type (e.g., one for 10 Mbps Ethernet). |
| HLEN 114 | Set to network length (e.g., six for 10 Mbps Ethernet) |

TABLE 6-continued

| DHCP 66 Parameter | Description |
|---|---|
| HOPS 116 | Set to zero. |
| FLAGS 122 | Set BROADCAST bit to zero. |
| CIADDR 124 | If the CM 16 has previously been assigned an IP 54 address, the IP 54 address is placed in this field. If the CM 16 has previously been assigned an IP 54 address by the DHCP 66, and also has been assigned an address via IPCP, the CM 16 places the DHCP 66 IP 54 address in this field. |
| GIADDR 130 | CM 16 places the Downstream Channel IP 54 address 80 of the CMTS 12 obtained in TSI message 76 on a cable downstream channel in this field. |
| CHADDR 132 | CM 16 places its 48-bit MAC 44 LAN address in this field. |

The DHCPDISCOVER message is used to "discover" the existence of one or more IP 54 host interfaces available on the CMTS 12. The DHCP 66 giaddr-field 130 (FIG. 6) includes the downstream channel IP address 80 of the CMTS 12 obtained in TSI message 76 (e.g., the first message field from Step 96 of Method 92). Using the downstream channel IP address 80 of the CMTS 12 obtained in TSI message 76 allows the DHCPDISCOVER message to be forwarded by TRAC 24 to the DHCP 66 servers (i.e., protocol servers) associated with network host interfaces available on the CMTS 12. If the DHCP 66 giaddr-field 130 (FIG. 6) in a DHCP message from a DHCP 66 client is non-zero, the DHCP 66 server sends any return messages to a DHCP 66 server port on a DHCP 66 relaying agent (e.g., the CMTS 12) whose address appears in the DHCP 66 giaddr-field 130.

In a typical DHCP 66 discovery process, the DHCP 66 giaddr-field 130 is set to zero. However, in one preferred embodiment of the present invention, the DHCP 66 giaddr-field 130 contains the IP address 80 of the CMTS 12. If the DHCP 66 giaddr-field 130 is zero, the DHCP 66 client is on the same subnet as the DHCP 66 server, and the DHCP 66 server sends any return messages to either the DHCP 66 client's network address, if that address was supplied in the DHCP 66 ciaddr-field 124 (FIG. 6), or to a client's hardware address (e.g., MAC address 44) specified in the DHCP 66 chaddr-field 132 (FIG. 6) or to a local subnet broadcast address (e.g., 255.255.255.255).

At Step 144, a DHCP 66 layer on TRAC 24 broadcasts the DHCPDISCOVER message on its local network leaving the DHCP 66 giaddr-field 130 intact since it already contains a non-zero value. TRAC's 24 local network includes connections to one or more DHCP 66 proxies (i.e., network host interface proxies). The DHCP 66 proxies accept the DHCP 66 messages originally from the CM 16 destined for DHCP 66 servers connected to network host interfaces available on the CMTS 12 since TRAC 24 has no direct access to DCHP 66 servers associated with network host interfaces available on the CMTS 12. The DHCP 66 proxies are not used in a typical the DHCP 66 discovery process known on the art.

One or more DHCP 66 proxies on TRAC's 24 local network recognizes the DHCPDISCOVER message and forwards it to one or more DHCP 66 servers associated with network host interfaces (e.g., IP 54 interfaces) available on the CMTS 12 at Step 146. Since the DHCP 66 giaddr-field 130 (FIG. 6) in the DHCPDISCOVER message sent by the CM 16 is already non-zero (i.e., contains the downstream IP address of the CMTS 12), the DHCP 66 proxies also leave the DHCP 66 giaddr-field 130 intact.

One or more DHCP 66 servers for network host interfaces (e.g., IP 54 interfaces) available on the CMTS 12 receive the DHCPDISCOVER message and generate a DHCP 66 offer message ("DHCPOFFER") at Step 148. The DHCP 66 offer message is an offer of configuration parameters sent from network host interfaces to the DHCP 66 servers and back to a network host client (e.g., the CM 16) in response to a DHCPDISCOVER message. The DHCP 66 offer message is sent with the message fields set as illustrated in Table 7. However, other field settings can also be used. The DHCP 66 yiaddr-field 126 (e.g., second message field from Step 102 of Method 92) contains an IP 54 address for a network host interface available on the CMTS 12 and used for receiving data packets from data network 28.

TABLE 7

| DHCP 66 Parameter | Description |
| --- | --- |
| FLAGS 122 | BROADCAST bit set to zero. |
| YIADDR 126 | IP 54 address from a network host interface to allow the CM 16 to receive data from data network 28 via a network host interface available on the CMTS 12. |
| SIADDR 128 | An IP 54 address for a TFTP 64 server to download configuration information for an interface host. |
| CHADDR 132 | MAC 44 address of the CM 16. |
| SNAME 134 | Optional DHCP 66 server identifier with an interface host. |
| FILE 136 | A TFTP 64 configuration file name for the CM 16. |

DHCP 66 servers send the DHCPOFFER message to the address specified in the DHCP 66 giaddr-field 130 (i.e., the CMTS 12) from the DHCPDISCOVER message if associated network host interfaces (e.g., IP 54 interfaces) can offer the requested service (e.g., IP 54 service) to the CM 16. The DHCPDISOVER message DHCP 66 giaddr-field 130 contains a downstream channel IP address 80 of the CMTS 12 that was received by the CM 16 in TSI message 76. This allows the CMTS 12 to receive the DHCPOFFER messages from the DHCP 66 servers and send them to the CM 16 via a downstream channel on cable network 14.

At Step 150 in FIG. 7B, the CMTS 12 receives one or more DHCPOFFER messages from one or more DHCP 66 servers associated with the network host interfaces (e.g., IP 54 interfaces). THE CMTS 12 examines the DHCP 66 yiaddr-field 126 and DHCP 66 chaddr-field 132 in the DHCPOFFER messages and sends the DHCPOFFER messages to the CM 16 via cable network 14. The DHCP 66 yiaddr-field 126 contains an IP 54 address for a network host IP 54 interface available on the CMTS 12 and used for receiving IP 54 data packets from data network 28. The DHCP 66 chaddr-field 132 contains the MAC 44 layer address for the CM 16 on a downstream cable channel from the CMTS 12 via cable network 14. The CMTS 12 knows the location of the CM 16 since it sent the CM 16 a MAC 44 layer address in one or more initialization messages (e.g., TSI message 76).

If a BROADCAST bit in flags-field 124 is set to one, the CMTS 12 sends the DHCPOFFER messages to a broadcast IP 54 address (e.g., 255.255.255.255) instead of the address specified in the DHCP 66 yiaddr-field 126. The DHCP 66 chaddr-field 132 is still used to determine that MAC 44 layer address. If the BROADCAST bit in the DHCP 66 flags-field 122 is set, the CMTS 12 does not update internal address or routing tables based upon the DHCP 66 yiaddr-field 126 and the DHCP 66 chaddr-field 132 pair when a broadcast message is sent.

At Step 152, the CM 16 receives one or more DHCPOFFER messages from the CMTS 12 via cable network 14 on a downstream connection. At Step 154, the CM 16 selects an offer for IP 54 service from one of the network host interfaces (e.g., an IP interfaces 54) available on the CMTS 12 that responded to the DHCPDISOVER message sent at Step 142 in FIG. 7A and establishes a virtual IP 54 connection. The selected DHCPOFFER message contains a network host interface address (e.g., IP 54 address) in the DHCP 66 yiaddr-field 126 (FIG. 6). A CM 16 acknowledges the selected network host interface with DHCP 66 message sequence explained below.

After selecting and acknowledging a network host interface, the CM 16 has discovered an IP 54 interface address available on the CMTS 12 for completing a virtual IP 54 connection with data network 28. Acknowledging a network host interface is explained below. The virtual IP 54 connection allows IP 54 data from data network 28 to be sent to the CMTS 12 which forwards the IP 54 packets to the CM 16 on a downstream channel via cable network 14. The CM 16 sends response IP 54 packets back to data network 28 via the PSTN 22 and TRAC 24 if telephony return is used. The CM sends response IP packets back to the data network 28 via the CMTS 12 is a two-way cable network is used.

Figure 8:
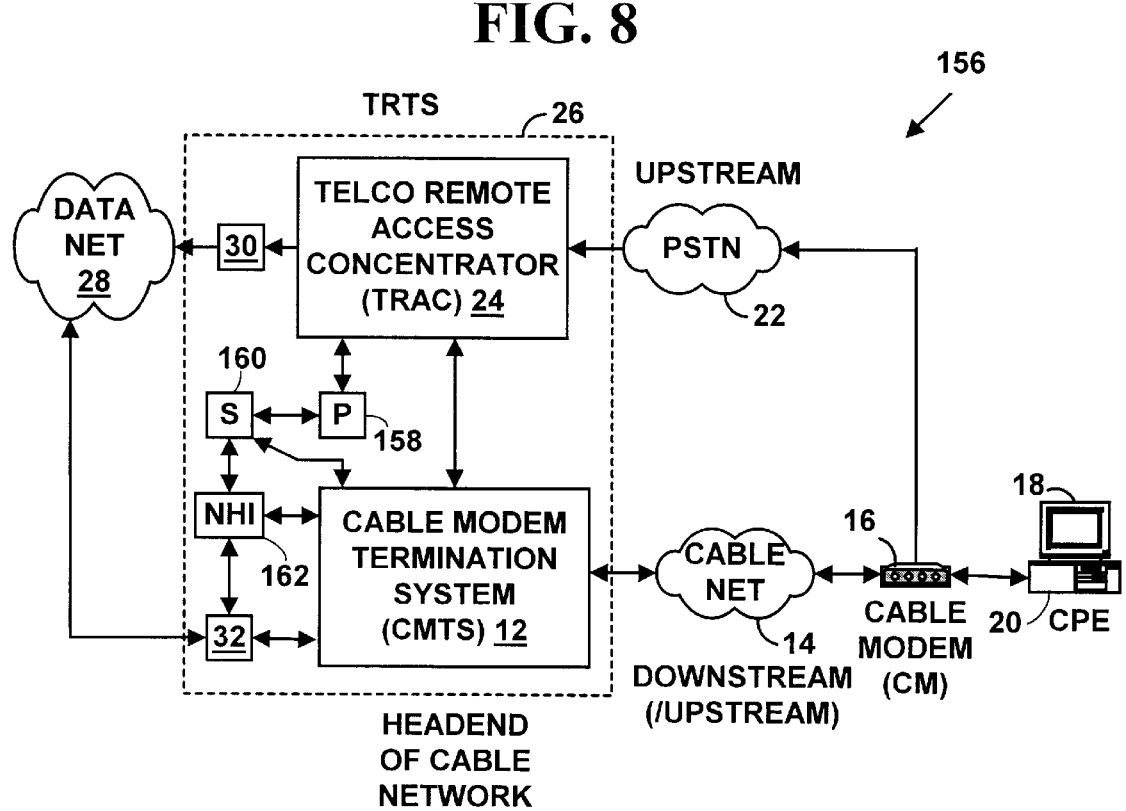
FIG. 8 is a block diagram illustrating a data-over-cable system for the method illustrated in FIGS. 7A and 7B.

FIG. 8 is a block diagram illustrating an exemplary data-over-cable system 156 for the method illustrated in FIGS. 7A and 7B. Data-over-cable system 156 includes the DHCP 66 proxies ("P") 158, the DHCP 66 servers 160 and associated Network Host Interfaces ("NHI") 162 available on the CMTS 12. Multiple DHCP 66 proxies 158, the DHCP 66 servers ("S") 160 and network host interfaces 162 are illustrated as single boxes in FIG. 8. FIG. 8 also illustrates the DHCP 66 proxies 158 separate from TRAC 24. In one embodiment of the present invention, TRAC 24 includes integral DHCP 66 proxy functionality and no separate DHCP 66 proxies 158 are used. In such an embodiment, TRAC 24 forwards the DHCP 66 messages using the DHCP 66 giaddr-field 130 to the DHCP 66 servers 160 available on the CMTS 12.

FIG. 9 is a block diagram illustrating a message flow 162 of Method 140 (FIGS. 7A and 7B).

Message flow 162 includes the DHCP proxies 158 and the DHCP servers 160 illustrated in FIG. 8 Steps 142, 144, 146, 148, 150 and 154 of Method 140 (FIGS. 7A and 7B) are illustrated in FIG. 9. In one embodiment of the present invention, the DHCP proxies 158 are not separate entities, but are included in TRAC 24. In such an embodiment, the DHCP proxy services are provided directly by TRAC 24.

Resolving Addresses for Network Host Interfaces

Figure 10B:
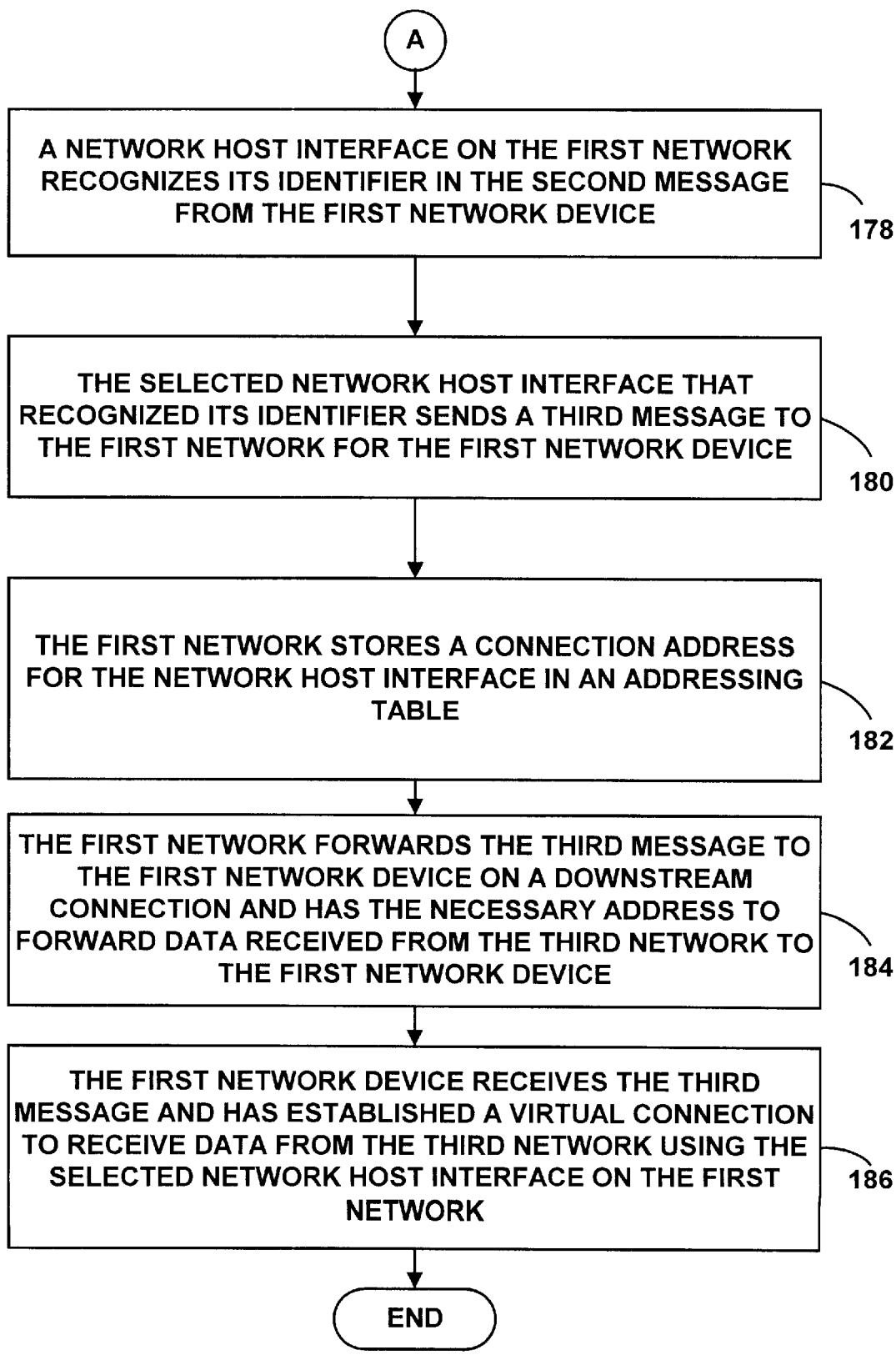

Since the CM 16 receives multiple the DHCPOFFER messages (Step 152 FIG. 7B) the CM 16 resolves and acknowledges one offer from a selected network host interface. FIGS. 10A and 10B are a flow diagram illustrating a Method 166 for resolving and acknowledging host addresses in a data-over-cable system. Method 166 includes a first network device that is connected to a first network with a downstream connection of a first connection type, and connected to a second network with an upstream connection of a second connection type. The first and second networks are connected to a third network with a third connection type. In one embodiment of the present invention, the first network device is the CM 16, the first network is cable network 14, the second network is the PSTN 22 and the third network is data network 28 (e.g., the Internet). The downstream connection is a cable television connection, the upstream connection is a telephony connection, and the third connection is an IP connection. However, the upstream connection and the data stream connection can both be cable television connections.

Turning to FIG. 10A, one or more first messages are received on the first network device from the first network on the downstream connection at Step 168. The one or more first messages are offers from one or more network host interfaces available on the first network to provide the first network device a connection to the third network. The first network device selects one of the network host interfaces using message fields in one of the one or more first messages at Step 170. The first network device creates a second message with a second message type to accept the offered services from a selected network host interface at Step 172. The second message includes a connection address for the first network in a first message field and an identifier to identify the selected network host interface in a second message field.

The first network device sends the second message over the upstream connection to the second network at Step 174. The second network uses the first message field in the second message to forward the second message to the one or more network host interfaces available on first network at Step 176.

A network host interface available on the first network identified in second message field in the second message from the first network device recognizes an identifier for the network host interface at Step 178 in FIG. 10B. The selected network host interface sends a third message with a third message type to the first network at Step 180. The third message is an acknowledgment for the first network device that the selected network host interface received the second message from the first network device. The first network stores a connection address for the selected network interface in one or more tables on the first network at Step 182. The first network will forward data from the third network to the first network device when it is received on the selected network host interface using the connection address in the one or more routing tables. The first network forwards the third message to the first network device on the downstream connection at Step 184. The first network device receives the third message at Step 186. The first network and the first network device have the necessary addresses for a virtual connection that allows data to be sent from the third network to a network host interface on the first network, and from the first network over the downstream connection to the first network device. Method 166 accomplishes resolving network interface hosts addresses from a cable modem in a data-over-cable with or without telephony return.

Method 166 of the present invention is used in data-over-cable system 10 with telephony return. However, the present invention is not limited to data-over-cable system 10 with telephony return and can be used in data-over-cable system 10 without telephony return by using an upstream cable channel instead of an upstream telephony channel.

FIGS. 11A and 11B are a flow diagram illustrating a Method 188 for resolving discovered host addresses in data-over-cable system 10 with telephony return. At Step 190 in FIG. 11A, the CM 16 receives one or more DHCPOFFER messages from one or more DHCP 66 servers 160 associated with one or more network host interfaces 162 (e.g., at Step 168 in Method 166). The one or more DHCPOFFER messages include the DHCP 66 fields set as illustrated in Table 7 above. However, other field settings could also be used. At Step 192, the CM 16 selects one of the DHCPOFFER messages (see also, Step 170 in Method 166). At Step 194, the CM 16 creates a DHCP 66 request message ("DHCPREQUEST") message to request the services offered by a network host interface 168 selected at Step 192. The fields of the DHCP request message are set as illustrated in Table 8. However, other field settings may also be used.

TABLE 8

| DHCP 66 Parameter | Description |
| --- | --- |
| OP 110 | Set to BOOTREQUEST. |
| HTYPE 112 | Set to network type (e.g., one for 10 Mbps Ethernet). |
| HLEN 114 | Set to network length (e.g., six for 10 Mbps Ethernet) |
| HOPS 116 | Set to zero. |
| FLAGS 122 | Set BROADCAST bit to zero. |
| CIADDR 124 | If the CM 16 has previously been assigned an IP address, the IP address is placed in this field. If the CM 16 has previously been assigned an IP address by the DHCP 66, and also has been assigned an address via IPCP, the CM 16 places the DHCP 66 IP 54 address in this field. |
| YIADDR 126 | IP 54 address sent from the selected network interface host in DCHPOFFER message |
| GIADDR 130 | CM 16 places the Downstream Channel IP 54 address 80 the CMTS 12 obtained in TSI message 76 on a cable downstream channel in this field. |
| CHADDR 132 | CM 16 places its 48-bit MAC 44 LAN address in this field. |
| SNAME 134 | DHCP 66 server identifier for the selected network interface host |

The DHCPREQUEST message is used to "request" services from the selected IP 54 host interface 162 available on the CMTS 12 using a DHCP 66 server 160 associated with the selected network host interface 162. The DHCP 66 giaddr-field 130 (FIG. 6) includes the downstream channel IP address 80 for the CMTS 12 obtained in TSI message 76 (e.g., the first message-field from Step 172 of Method 166). Putting the downstream channel IP address 80 obtained in TSI message 76 allows the DHCPREQUEST message to be forwarded by TRAC 24 to DCHP 66 servers 160 associated with network host interfaces 162 available on the CMTS 12. The DHCP 66 giaddr-field 126 contains an identifier (e.g., second message field, Step 172 in Method 166) the DHCP 66 sname-field 134 contains a DHCP 66 server identifier 160 associated with the selected network host interface.

If the DHCP 66 giaddr-field 130 in a DHCP 66 message from a DHCP 66 client is non-zero, a DHCP 66 server 160 sends any return messages to a DHCP 66 server port on a DHCP 66 relaying agent (e.g., the CMTS 12) whose address appears in DHCP 66 giaddr-field 130. If DHCP 66 giaddr-field 130 is zero, the DHCP 66 client is on the same subnet as the DHCP 66 server, and the DHCP 66 server sends any return messages to either the DHCP 66 client's network address, if that address was supplied in the DHCP 66 ciaddr-field 124, or to the client's hardware address specified in the DHCP 66 chaddr-field 132 or to the local subnet broadcast address.

Returning to FIG. 11A at Step 196, the CM 16 sends the DHCPREQUEST message on the upstream connection to TRAC 24 via the PSTN 22. At Step 198, a DHCP 66 layer on TRAC 24 broadcasts the DHCPREQUEST message on its local network leaving DHCP 66 giaddr-field 130 intact since it already contains a non-zero value. TRAC's 24 local network includes connections to one or more DHCP 66 proxies 158. The DHCP 66 proxies 158 accept DHCP 66 messages originally from the CM 16 destined for the DHCP 66 servers 160 associated with network host interfaces 168 available on the CMTS 12. In another embodiment of the present invention, TRAC 24 provides the DHCP 66 proxy functionality, and no separate DHCP 66 proxies are used.

The one or more DHCP 66 proxies 158 on TRAC's 24 local network message forwards the DHCPOFFER to one or more of the DHCP 66 servers 160 associated with network host interfaces 162 (e.g., IP 54 interfaces) available on the CMTS 12 at Step 200 in FIG. 11B. Since DHCP 66 giaddr-field 130 in the DHCPDISCOVER message sent by the CM 16 is already non-zero (i.e., contains the downstream IP address of the CMTS 12), the DHCP 66 proxies leave 158 the DHCP 66 giaddr-field 130 intact.

One or more DHCP 66 servers 160 for the selected network host interfaces 162 (e.g., IP 54 interface) available on the CMTS 12 receives the DHCPOFFER message at Step 202. A selected the DHCP 66 server 160 recognizes a DHCP 66 server identifier in the DHCP 66 sname-field 134 or the IP 54 address that was sent in the DCHPOFFER message in the DHCP 66 yiaddr-field 126 from the DHCPREQUST message as being for the selected DHCP 66 server 160.

The selected DHCP 66 server 160 associated with network host interface 162 selected by the CM 16 in the DHCPREQUEST message creates and sends a DCHP 66 acknowledgment message ("DHCPACK") to the CMTS 12 at Step 204. The DHCPACK message is sent with the message fields set as illustrated in Table 9. However, other field settings can also be used. The DHCP 66 yiaddr-field again contains the IP 54 address for the selected network host interface available on the CMTS 12 for receiving data packets from data network 28.

TABLE 9

| DHCP 66 Parameter | Description |
| --- | --- |
| FLAGS 122 | Set a BROADCAST bit to zero. |
| YIADDR 126 | IP 54 address for the selected network host interface to allow the CM 16 to receive data from data network 28. |
| SIADDR 128 | An IP 54 address for a TFTP 64 server to download configuration information for an interface host. |
| CHADDR 132 | MAC 44 address of the CM 16. |
| SNAME 134 | DHCP 66 server identifier associated with the selected network host interface. |
| FILE 136 | A configuration file name for an network interface host. |

The selected DHCP 66 server 160 sends the DHCACK message to the address specified in the DHCP 66 giaddr-field 130 from the DHCPREQUEST message to the CM 16 to verify the selected network host interface (e.g., IP 54 interface) will offer the requested service (e.g., IP 54 service).

At Step 206, the CMTS 12 receives the DHCPACK message from the selected DHCP 66 server 160 associated with the selected network host interface 162 IP 54 address (e.g., IP 54 interface). The CMTS 12 examines the DHCP 66 yiaddr-field 126 and the DHCP 66 chaddr-field 132 in the DHCPACK message. The DHCP 66 yiaddr-field 126 contains an IP 54 address for a network host IP 54 interface available on the CMTS 12 and used for receiving IP 54 data packets from data network 28 for the CM 16. The DHCP 66 chaddr-field 132 contains the MAC 44 layer address for the CM 16 on a downstream cable channel from the CMTS 12 via cable network 14.

CMTS 12 updates an Address Resolution Protocol ("ARP") table and other routing tables on the CMTS 12 to reflect the addresses in the DHCP 66 yiaddr-field 126 and the DHCP 66 chaddr-field 132 at Step 208. As is known in the art, ARP allows a gateway such as the CMTS 12 to forward any datagrams from a data network such as data network 28 it receives for hosts such as the CM 16. (For more information on ARP, see RFC-826, incorporated herein by reference).

CMTS 12 stores a pair of network address values in the ARP table, the IP 54 address of the selected network host interface from the DHCP 66 yiaddr-field 126 and a Network Point of Attachment ("NPA") address. In a preferred embodiment of the present invention, The NPA address is a MAC 44 layer address for the CM 16 via a downstream cable channel. The IP/NPA address pair are stored in local routing tables with the IP/NPA addresses of hosts (e.g., the CMs 16) that are attached to cable network 14.

At Step 210, the CMTS 12 sends the DHCPACK message to the CM 16 via cable network 14. At Step 212, the CM 16 receives the DHCPACK message, and along with the CMTS 12 has addresses for a "virtual connection" between data network 28 and the CM 16. When data packets arrive on the IP 54 address for the selected CM 16 they are sent to the CMTS 12 and the CMTS 12 forwards them using a NPA (i.e., a MAC 44 address) from the routing tables on a downstream channel via cable network 14 to the CM 16.

If a BROADCAST bit in flags field 124 is set to one in the DHCPACK, the CMTS 12 sends the DHCPACK messages to a broadcast IP 54 address (e.g., 255.255.255.255). The DHCP 66 chaddr-field 132 is still used to determine a MAC 44 layer address. If the BROADCAST bit in flags field 122 is set, the CMTS 12 does not update the ARP table or offer routing tables based upon the DHCP 66 yiaddr-field 126 and the DHCP 66 chaddr-field 132 pair when a broadcast message is sent.

Figure 12:
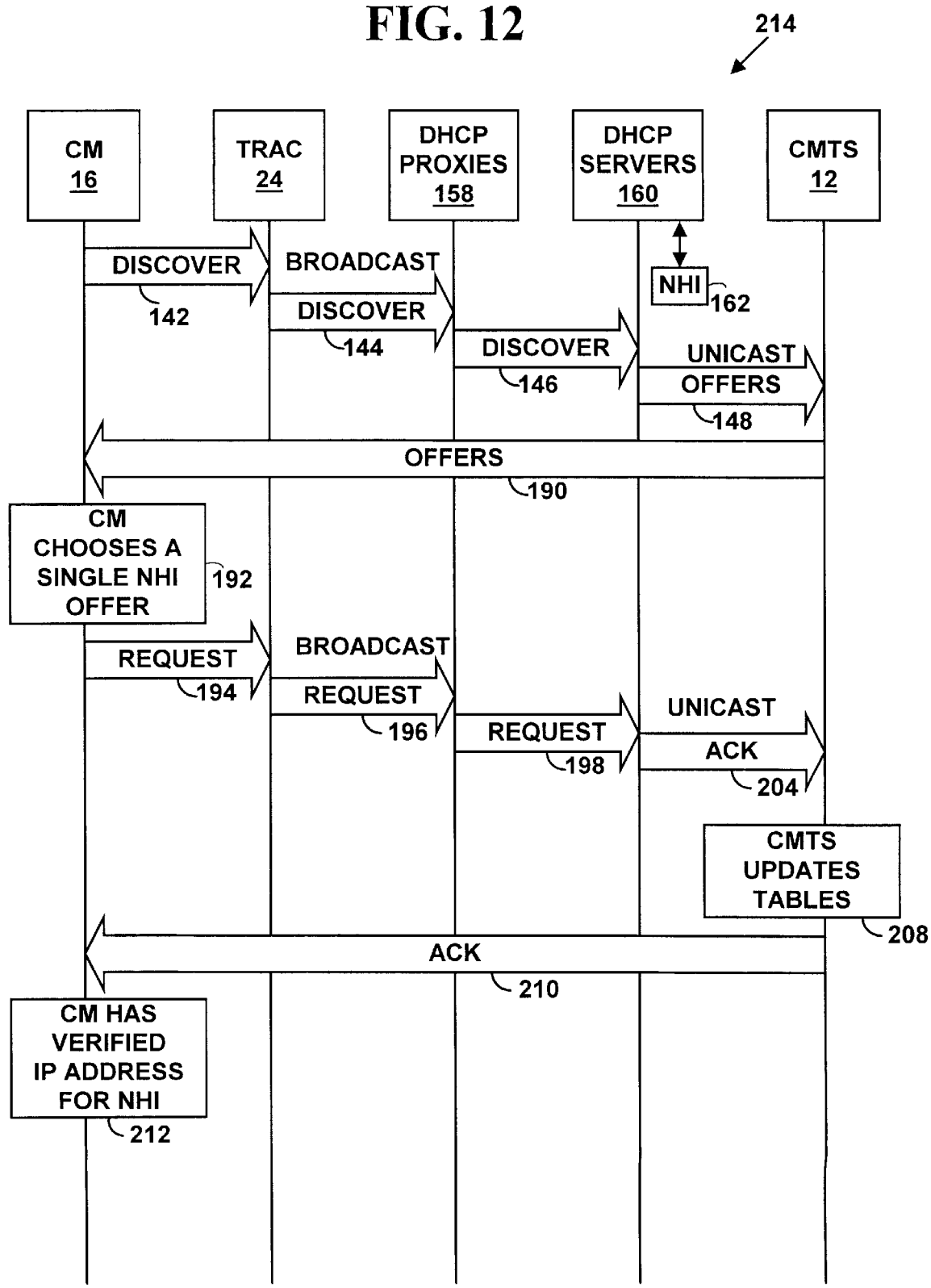
FIG. 12 is a block diagram illustrating the message flow of the method illustrated in FIG. 10.

FIG. 12 is a block diagram illustrating the message flow 214 of the Method 188 illustrated in FIGS. 11A and 11B. Message flow 214 includes the DHCP proxies 158 and the DHCP servers 160 illustrated in FIG. 8. Method Steps 194, 196, 198, 204, 208, 210 and 212 of Method 188 (FIGS. 11A and 11B) are illustrated in FIG. 12. In one embodiment of the present invention, the DHCP proxies 158 are not separate entities, but are included in TRAC 24. In such an embodiment, the DHCP proxy services are provided directly by TRAC 24.

After Method 188, the CMTS 12 has a valid IP/MAC address pair in one or more address routing tables including an ARP table to forward IP 54 data packets from data network 28 to the CM 16, thereby creating a virtual IP 54 data path to/from the CM 16 as was illustrated in Method 92 (FIG. 5) and Table 3. the CM 16 has necessary parameters to proceed to the next phase of initialization, a downloading of a configuration file via TFTP 64. Once the CM 16 has received the configuration file and has been initialized, it registers with the CMTS 12 with a registration message and is ready to receive data from data network 14. Use of the registration message will be explained below.

In the event that the CM 16 is not compatible with the configuration of the network host interface 162 received in the DHCPACK message, the CM 16 may generate a DHCP 66 decline message ("DHCPDECLINE") and transmit it to TRAC 24 via the PSTN 22. A DHCP 66 layer in TRAC 24 forwards the DHCPDECLINE message to the CMTS 12. Upon seeing a DHCPDECLINE message, the CMTS 12 flushes its ARP tables and routing tables to remove the now invalid IP/MAC pairing. The CM 16 may also send the DHCPDECLINE message to the CMTS 12 on an upstream cable channel. The CMTS 12 will then forward the DHCPDECLINE message to the appropriate DHCP 66 server 160. If an IP 54 address for a network host interface is returned in a DHCPACK that is different from the IP 54 address sent by the CM 16 in the DCHCPREQUEST message, the CM 16 uses the IP 54 address it receives in the DHCPACK message as the IP 54 address of the selected network host interface for receiving data from data network 28.

One preferred embodiment of the present invention is described with respect to, but is not limited to a data-over-cable-system with telephony return. Method 188 can also be used with a cable modem that has a two-way connection (i.e., upstream and downstream) to cable network 14 and the CMTS 12. In a data-over-cable-system without telephony return, the CM 16 would broadcast the DHCPREQUEST message to one or more DHCP 66 servers 160 associated with one or more network host interfaces 162 associated with the CMTS 12 using an upstream cable connection on the data network 14 including the IP 54 address of the CMTS 12 in the DHCP 66 giaddr-field 130. Method 188 accomplishes resolving addresses for network interface hosts from a cable modem in a data-over-cable with or without telephony return, and without extensions to the existing DHCP protocol.

CPE Initialization in a Data-over-cable System

The CPE 18 also uses the DHCP 66 to generate requests to obtain IP 54 addresses to allow CPE 18 to also receive data from data network 28 via the CM 16. In a preferred embodiment of the present invention, the CM 16 functions as a standard BOOTP relay agent/DHCP Proxy 158 to facilitate CPE's 18 access to the DHCP 66 server 160. FIGS. 13A and 13B are a flow diagram illustrating a Method 216 for obtaining addresses for customer premise equipment such as the CPE 18. The CM 16 and the CMTS 12 use information from Method 214 to construct IP 54 routing and ARP table entries for network host interfaces 162 providing data to the CMCI 20 and to CPE 18.

Method 216 in FIGS. 13A and 13B includes a data-over-cable system with telephony return. A first network device with a second network device is used for connecting the first network device to a first network with a downstream connection of a first connection type, and for connecting to a second network with an upstream connection of a second connection type. The first and second networks are connected to a third network with a third connection type.

In one embodiment of the present invention, data-over-cable system with telephony return is data-over-cable system 10 with the first network device is the CPE 18 and the second network device is the CM 16. The first network is the cable television network 14, the downstream connection is a cable television connection, the second network is the PSTN 22, the upstream connection is a telephony connection, the third network is data network 28 (e.g., the Internet or an intranet) and the third type of connection is an IP 54 connection. However, the present invention is not limited to the network components described and other network components may also be used. A data-over-cable system without telephony return can also be used (e.g., a system with a two-way cable channel. Method 216 allows CPE 18 to determine an IP 54 network host interface address available on the CMTS 12 to receive IP 54 data packets from the data network 54, thereby establishing a virtual IP 54 connection with data network 28 via the CM 16.

Returning to FIG. 13A at Step 218, a first message of a first type (e.g., a DHCP 66 discover message) with a first message field for a first connection is created on the first network device. The first message is used to discover a network host interface address on the first network to allow a virtual connection to the third network.

At Step 220, the first network device sends the first message to the second network device. The second network device checks the first message field at Step 222. If the first message field is zero, the second network device puts its own network connection address into the first message field at Step 224. The second network device connection address allows the messages from network host interfaces on the first network to return messages to the second network device attached to the first network device. If the first message field is non-zero, the second network device does not alter the first message field since there could be a relay agent attached to the first network device that may set the first connection address field.

At Step 226, the second network device forwards the first message to a connection address over the upstream connection to the second network. In one embodiment of the present invention, the connection address is an IP broadcast address (e.g., 255.255.255.255). However, other connection addresses can also be used.

The second network uses the first connection address in the first message field in the first message to forward the first message to one or more network host interfaces (e.g., IP 54 network host interfaces 162) available on first network at Step 228. One or more network host interfaces available on the first network that can provide the services requested in first message send a second message with a second message type with a second connection address in a second message field to the first network at Step 230 in FIG. 13B. The second connection address allows the first network device to receive data packets from the third network via a network host interface on the first network. The first network forwards the one or more second messages on the downstream connection to the second network device at Step 232. The second network device forwards the one or more second messages to the first network device at Step 234. The first network device selects one of the one or more network host interfaces on the first network using the one or more second messages at Step 236. This allows a virtual connection to be established between the third network and the first network device via the selected network host interface on the first network and the second network device.

Figure 14A:
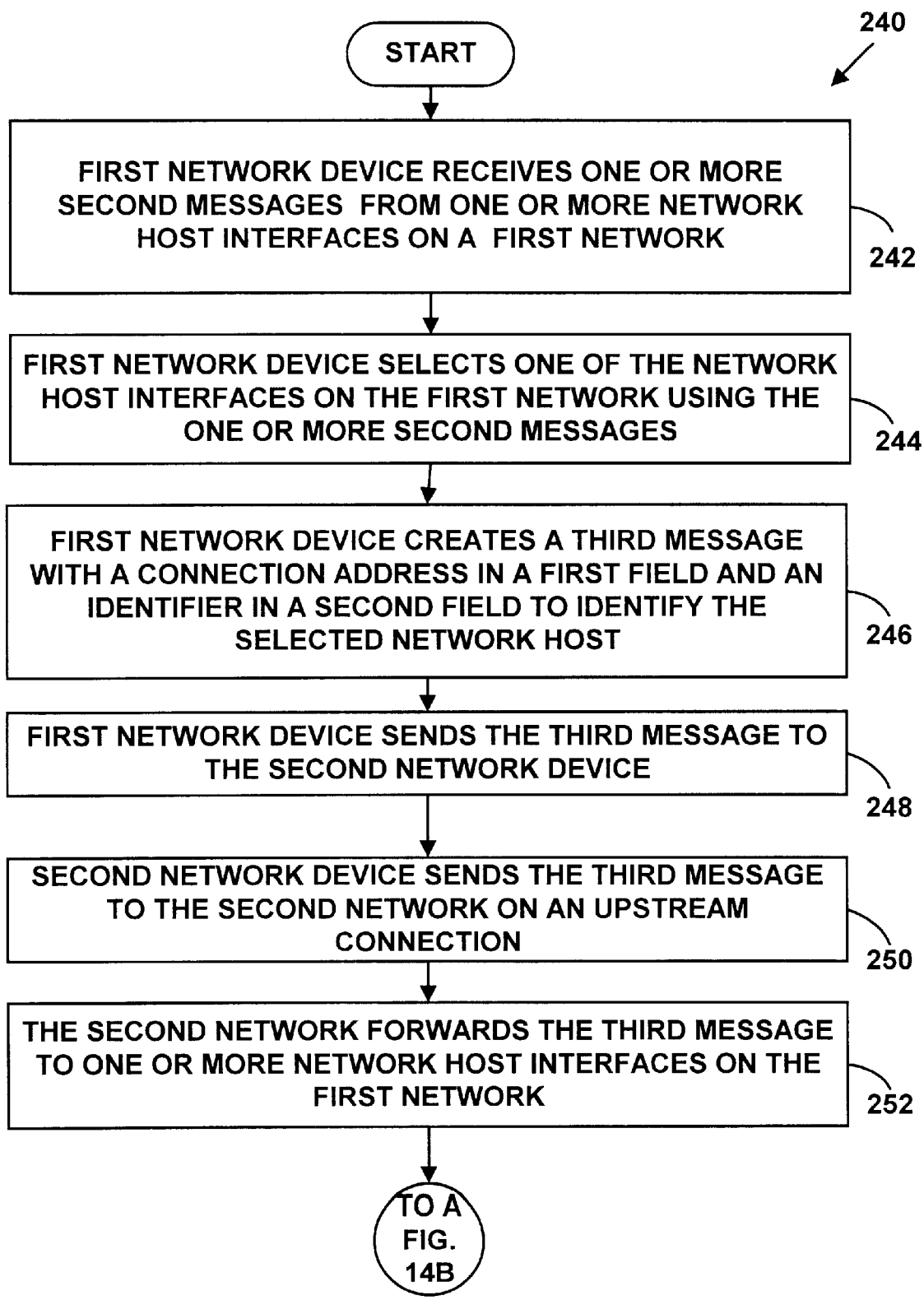

FIGS. 14A and 14B are a flow diagram illustrating a Method 240 for resolving addresses for the network host interface selected by a first network device to create a virtual connection to the third network. Turning to FIG. 14A, at Step 240 one or more second messages are received with a second message type on the first network device from the second network device from the first network on a downstream connection at Step 242. The one or more second messages are offers from one or more protocol servers associated with one or more network host interfaces available on the first network to provide the first network device a connection to the third network. The first network device selects one of the network host interfaces using one of the one or more second messages at Step 244. The first network device creates a third message with a third message type to accept the offered services from the selected network host interface at Step 246. The third message includes a connection address for the first network in a first message field and an identifier to identify the selected network host interface in a second message field. to At Step 248, first network device equipment sends the third message to the second network device.

The second network device sends the third message over the upstream connection to the second network at Step 250. The second network uses the first message field in the third message to forward the third message to the one or more network host interfaces available on first network at Step 252.

A network host interface available on the first network identified in second message field in the third message from the first network device recognizes an identifier for the selected network host interface at Step 254 in FIG. 14B. The selected network host interface sends a fourth message with a fourth message type to the first network at Step 256. The fourth message is an acknowledgment for the first network device that the selected network host interface received the third message. The fourth message includes a second connection address in a third message field. The second connection address is a connection address for the selected network host interface. The first network stores the connection address for the selected network interface from the third message in one or more routing tables (e.g., an ARP table) on the first network at Step 258. The first network will forward data from the third network to the first network device via the second network device when it is received on the selected network host interface using the connection address from the third message field. The first network forwards the fourth message to the second network device on the downstream connection at Step 260. The second network device receives the fourth message and stores the connection address from the third message field for the selected network interface in one or more routing tables on the second network device at Step 262. The connection address for the selected network interface allows the second network device to forward data from the third network sent by the selected network interface to the customer premise equipment. At Step 264, the second network device forward the fourth message to the first network device. At Step 266, the first network device establishes a virtual connection between the third network and the first network device.

After Step 266, the first network, the second network device and the first network device have the necessary connection addresses for a virtual connection that allows data to be sent from the third network to a network host interface on the first network, and from the first network over the downstream connection to the second network and then to the first network device. In one embodiment of the present invention, Method 240 accomplishes resolving network interface hosts addresses from customer premise equipment with a cable modem in a data-over-cable with telephony return without extensions to the existing DHCP protocol.

Methods 216 and 240 of the present invention are used in data-over-cable system 10 with telephony return with the CM 16 and CPE 18. However, the present invention is not limited to data-over-cable system 10 with telephony return and can be used in data-over-cable system 10 without telephony return by using an upstream cable channel instead of an upstream telephony channel.

Figure 15A:
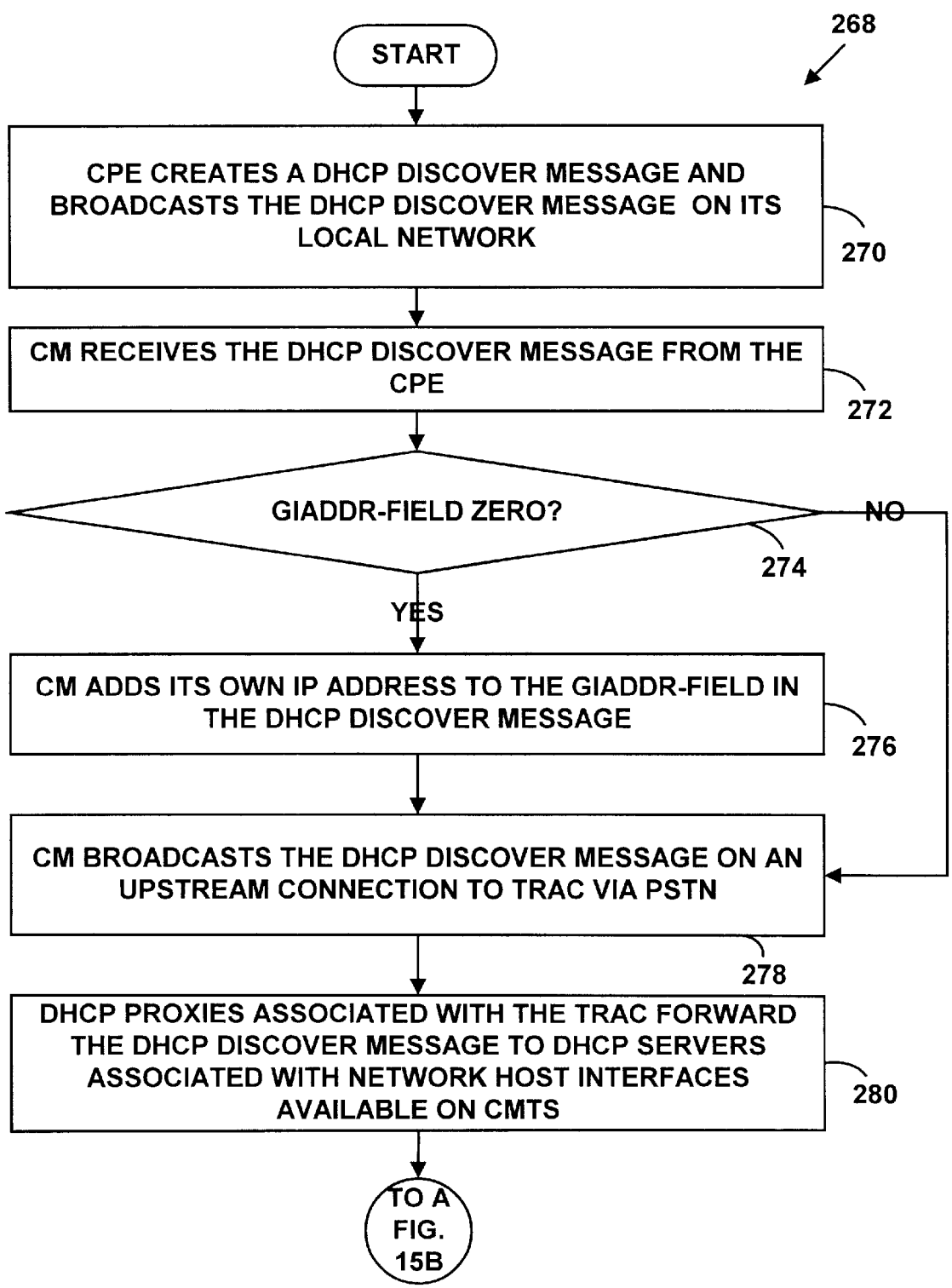

FIGS. 15A and 15B are a flow diagram illustrating a Method 268 for addressing network host interfaces 162 from CPE 18. At Step 270 in FIG. 15A, the CPE 18 generates a DHCPDISCOVER message broadcasts the DHCPDISCOVER message on its local network with the fields set as illustrated in Table 6 above with addresses for CPE 18 instead of the CM 16. However, more or fewer field could also be set in the DHCPDISCOVER message. he CM 16 receives the DHCPDISCOVER as a standard BOOTP relay agent at Step 272. The DHCPDISCOVER message has a MAC 44 layer address for CPE 18 in the DHCP 66 chaddr-field 132, which the CM 16 stores in one or more routing tables. As a BOOTP relay agent, the CM 16 checks the DHCP 66 giaddr-field 130 (FIG. 6) at Step 274. If the DHCP 66 giaddr-field 130 is set to zero, the CM 16 put its own IP 54 address into the DHCP 66 giaddr-field 130 at Step 276.

If the DHCP 66 giaddr-field 130 is non-zero, the CM 16 does not alter the DHCP 66 giaddr-field 130 since there could be another BOOTP relay agent attached to CPE 18 which may have already set the DHCP 66 giaddr-field 130. Any BOOTP relay agent attached to CPE 18 would have also have acquired its IP 54 address using a DCHP 66 discovery process (e.g., FIG. 12).

Returning to FIG. 15A, at Step 278, the CM 16 broadcasts the DHCPDISCOVER message to a broadcast address via the PSTN 22 to the TRAC 24. In one embodiment of the present invention, the broadcast address is an IP 54 broadcast address (e.g., 255.255.255.255). At Step 280, one or more DHCP 66 proxies 158 associated with TRAC 24, recognize the DHCPDISOVER message, and forward it to one or more DHCP 66 servers 160 associated with one or more network host interfaces 162 available on the CMTS 12. Since the DHCP 66 giaddr-field 130 is already non-zero, the DHCP proxies 160 leave the DHCP 66 giaddr-field 130 intact. In another embodiment of the present invention, TRAC 24 includes DCHP 66 proxy 158 functionality and no separate DHCP 66 proxies 158 are used. In yet another embodiment of the present invention, the CM 16 broadcasts the DHCPDISCOVER message to the CMTS 12 on an upstream cable channel.

At Step 282 in FIG. 15B, the one or more DHCP servers 160 receive the DHCPDISCOVER message from one or more DHCP proxies, and generate one or more DHCPOFFER messages to offer connection services for one or more network host interfaces 162 associated with the CMTS 12 with fields set as illustrated in Table 7. The one or more DHCP servers 160 send the one or more DHCPOFFER messages to the address specified in the DHCP 66 giaddr-field 130 (e.g., the CM 16 or a BOOTP relay agent on CPE 18), which is an IP 54 address already contained in an ARP or other routing table in the CMTS 12. Since the CMTS 12 also functions as a relay agent for the one or more DHCP servers 160, the one or more DHCPOFFER messages are received on the CMTS 12 at Step 284.

The CMTS 12 examines the DHCP 66 yiaddr-field 126 and the DHCP 66 giaddr-field 130 in the DHCPOFFER messages, and sends the DHCPOFFER messages down cable network 14 to IP 54 address specified in the giaddr-field 130. The MAC 44 address for the CM 16 is obtained through a look-up of the hardware address associated with the DHCP 66 chaddr-field 130 (e.g., using ARP). If the BROADCAST bit in the DHCP 66 flags-field 122 is set to one, the CMTS 12 sends the DHCPOFFER message to a broadcast IP 54 address (e.g., 255.255.255.255), instead of the address specified in the DHCP 66 yiaddr-field 126. the CMTS 12 does not update its ARP or other routing tables based upon the broadcast DCHP 66 yiaddr-field 126 DHCP 66 chaddr-field 132 address pair.

Returning to FIG. 15B, the CM 16 receives the one or more DHCPOFFER messages and forwards them to CPE 18 at Step 286. the CM 16 uses the MAC 44 address specified determined by the DHCP 66 chaddr-field 132 look-up in its routing tables (e.g., ARP table) to find the address of CPE 18 even if the BROADCAST bit in the DHCP 66 flags-field 122 is set. At Step 290, CPE 18 receives the one or more DHCPOFFER messages from the CM 16. At Step 292, CPE 18 selects one of the DHCPOFFER messages to allow a virtual connection to be established between data network 28 and CPE 18. Method 266 accomplishes addressing network interface hosts from CPE 18 in data-over-cable system 10 without extensions to the existing DHCP protocol.

FIGS. 16A and 16B are a flow diagram illustrating a Method 294 for resolving network host interfaces from CPE 18. At Step 296, CPE 18 receives the one or more DHCPOFFER messages from one or more DHCP 66 servers 160 associated with one or more network host interfaces available on the CMTS 12. At Step 298, CPE 18 chooses one offer of services from a selected network host interface 162. At Step 300, the CPE 18 generates a DHCPREQUEST message with fields set as illustrated in Table 8 above with addresses for CPE 18 instead of the CM 16. However, more or fewer fields could also be set. At Step 302, CPE 18 sends the DHCPREQUEST message to the CM 16. At Step 304, the CM 16 forwards the message to TRAC 24 via the PSTN 22 (or to the CMTS 12 via an upstream cable channel if a two-way cable system is being used).

At Step 306, a DHCP 66 layer on TRAC 24 broadcasts the DHCPREQUEST message on its local network leaving the DHCP 66 giaddr-field 130 intact since it already contains a non-zero value. TRAC's 24 local network includes connections to one or more DHCP 66 proxies. The DHCP 66 proxies 158 accept the DHCP 66 messages originally from the CPE 18 destined for the DHCP 66 servers 160 associated with network host interfaces 162 associated with the CMTS 12. In another embodiment of the present invention, TRAC 24 provides the DHCP 66 proxy functionality, and no separate DHCP 66 proxies 158 are used.

One or more DHCP 66 proxies 158 on TRAC's 24 local network recognize the DHCPOFFER message and forward it to one or more of the DHCP 66 servers 160 associated with network host interfaces 162 (e.g., IP 54 interfaces) associated with the on the CMTS 12 at Step 308 in FIG. 16B. Since the DHCP 66 giaddr-field 130 in the DHCPDISCOVER message sent by CPE 18 is already non-zero, (i.e., set by the CM 16 the DHCP 66 proxies leave the DHCP 66 giaddr-field 130 intact.

One or more DHCP 66 servers 160 for the selected network host interfaces 162 (e.g., IP 54 interface) associated with the CMTS 12 receive the DHCPOFFER message at Step 310. A selected the DHCP 66 server 160 recognizes a DHCP 66 server identifier in the DHCP 66 sname-field 134 or the IP 54 address that was sent in the DCHPOFFER message in the DHCP 66 yiaddr-field 126 from the DHCPREQUST message for the selected the DHCP 66 server 160.

The selected DHCP 66 server 160 associated with network host interface 162 selected by the CPE 18 in the DHCPREQUEST message creates and sends a DCHP acknowledgment message ("DHCPACK") to the CMTS 12 at Step 312 using the DHCP 66 giaddr-field 130. The DHCPACK message is sent with the message fields set as illustrated in Table 9. However, other field settings can also be used. The DHCP 66 yiaddr-field contains the IP 54 address for the selected network host interface 162 available on the CMTS 12 for receiving data packets from data network 28 for CPE 18.

At Step 314, the CMTS 12 receives the DHCPACK message. the CMTS 12 examines the DHCP 66 giaddr-field 130 and looks up that IP 54 address in its ARP table or other routing tables for an associated MAC 44 address. This is a MAC 44 address for the CM 16, which sent the DHCPREQUEST message from CPE 18. the CMTS 12 uses the MAC 44 address associated with the DHCP 66 giaddr-field 130 and the DHCP 66 yiaddr-field 126 to update its routing and ARP tables reflecting this address pairing at Step 316. At Step 318, the CMTS 12 sends the DHCPACK message on a downstream channel on cable network 14 to the IP 54 and MAC 44 addresses, respectively (i.e., to the CM 16). If the BROADCAST bit in the DHCP 66 flags-field 122 is set to one, the CMTS 12 sends the DHCPACK message to a broadcast IP 54 address (e.g., 255.255.255.255), instead of the address specified in the DHCP 66 yiaddr-field 126. the CMTS 12 uses the MAC 44 address associated with the DHCP 66 chaddr-field 130 even if the BROADCAST bit is set.

The CM 16 receives the DHCPACK message. It examines the DHCP 66 yiaddr-field 126 and chaddr-field 132, and updates its routing table and an ARP routing table to reflect the address pairing at Step 320. At Step 322, the CM 16 sends the DHCPACK message to CPE 18 via the CMCI 20 at IP 54 and MAC 44 addresses respectively from its routing tables. If the BROADCAST bit in the DHCP 66 flags-field 122 is set to one, the CM 16 sends the downstream packet to a broadcast IP 54 address (e.g., 255.255.255.255), instead of the address specified in the DHCP 66 yiaddr-field 126. the CM 16 uses the MAC 44 address specified in the DHCP 66 chaddr-field 132 even if the BROADCAST bit is set to located CPE 18. At Step 324, CPE 18 receives the DHCPACK from the CM 16 and has established a virtual connection to data network 28.

In the event that CPE 18 is not compatible with the configuration received in the DHCPACK message, CPE 18 may generate a DHCP 66 decline ("DHCPDECLINE") message and send it to the CM 16. the CM 16 will transmit the DHCPDECLINE message up the PPP 50 link via the PSTN 22 to TRAC 24 or the CMTS 12 via an upstream cable channel. On seeing a DHCPDECLINE message TRAC 24 sends a unicast copy of the message to the CMTS 12. the CM 16 and the CMTS 12 examine the DHCP 66 yiaddr-field 126 and the DHCP 66 giaddr-field 130, and update their routing and ARP tables had routing tables to flush any invalid pairings.

Upon completion of Methods 266 and 292, the CM 16 and the CMTS 12 have valid IP/MAC address pairings in their routing and ARP tables. These tables store the same set of IP 54 addresses, but does not associate them with the same MAC 44 addresses. This is because the CMTS 12 resolves all CPE 18 IP 54 addresses to the MAC 44 address of a corresponding the CM 16. The CMs 16, on other hand, is able to address the respective MAC 44 addresses of their own CPEs 18. This also allows the DHCP 66 clients associated with CPE 18 to function normally since the addressing that is done in the other CM 16 and the CMTS 12 is transparent to CPE 18 hosts.

FIG. 17 is a block diagram illustrating a message flow 326 for Methods 268 and 294 in FIGS. 15A, 15B, and 16A and 16B. Message flow 326 illustrates a message flow for Methods 268 and 294, for a data-over-cable system with and without telephony return. In another embodiment of the present invention, the CM 16 forwards requests from CPE 18 via an upstream connection on cable network 14 to the DHCP 66 servers 160 associated with one or more network host interfaces 162 associated with the DHCP 66 proxies 158 are not used on the CMTS 12. In such an embodiment, the TRAC 24 and the DHCP 66proxies 158 are not used.

Method 268 and 294 accomplishes resolving addresses for network interface hosts from customer premise equipment in a data-over-cable with or without telephony return without extensions to the existing DHCP 66 protocol.

The Methods of the present invention described above are illustrated in part for a data-over-cable system 10 with telephony return. However, the Methods can also be used in a data-over-cable system without telephony return and the present invention is not limited to a data-over-cable system with telephony return 10.

In a data-over-cable system without telephony return, the upstream telephony link via PPP 50, the PSTN 22, the TRAC 24 and the DHCP 66 proxies 158 are not used. Instead, an upstream cable channel from the CM 16, or the CPE 18 via the CM 16, to the CMTS 12 is used for two-way cable communications to accomplish the Methods described above.

Completing Initialization of a Cable Modem or CPE

After obtaining an IP 54 address via DHCP 66, the CM 16 receives a configuration file from a configuration file server. Information about the configuration file is included in the DHCPACK message (e.g., Table 9). For example, in one preferred embodiment of the present invention, a network address (e.g., an IP 54 address) for the server is included in a DHCP 66 siaddr-field 128 (FIG. 6), and a name of the configuration file in a DHCP 66 file-field 136. The configuration file includes multiple configuration parameters used to initialize the CM 16. The TFTP 64 server obtains the requested configuration file and sends it to the CM 16. In one embodiment of the present invention, the configuration file is obtained by the TFTP server from the DHCP server 160. In another embodiment of the present invention, the configuration file is obtained by the TFTP 64 server from the CMTS 12.

Exemplary configuration information from a configuration file is illustrated in Type/Length/Value ("TLV") format in Table 10. However, more or fewer configuration parameters could also be used. In addition, only an exemplary description of the Value in the TLV format is included since the actual numbers used for the Value fields are implementation specific.

TABLE 10

| Type | Length | Value | Notes |
| --- | --- | --- | --- |
| 4x | 6 | Variable | Header Length |
| 41 | 1 | 1 | Class-Of-Service-1 |
| 42 | 4 | 1,500,000 | Maximum downstream data rate of 1.5 Mbps |
| 43 | 4 | 256,000 | Maximum upstream data rate of 256 Kbps |
| 44 | 1 | 5 | Priority is level 5. |
| 45 | 4 | 8,000 | Minimum upstream data rate of 8 Kbps |
| 47 | 1 | 1 | Privacy enabled |
| 171 | 4 | 1 | Authorize timeouts |
| 3 | 1 | 1 | Enable network access |
| 8x | 8 | Variable | Vendor ID |
| 83 | N | Variable | N-bytes of vendor specific data in TLV format |
| 0 | N | N-byte padding | Padding to make message 4-byte aligned |
| 255 | N/A | | End-of-file |

The CPE 18 may also receive a configuration file, if necessary from the CM 16, the CMTS 12, or the DHCP server 160 via the TFTP 64 server. The CPE 18 also receives information on where to find a configuration file, if necessary, in a DCHPACK message. However, the CPE 18 may also receive information on where to find a configuration file with other messages (e.g., MAC 44) from the CM 16 or the CMTS 12.

After receiving a configuration file, the CM 16 sends a registration message to the CMTS 12. The registration message is typically a MAC 44 management message that includes a MAC 44 management header and selected information from the configuration file (e.g., from Table 10) in TLV format. The registration message is sent within a pre-determined time after receiving a DHCPACK to provide a security measure to protect the data-over-cable system 10. If the registration message is not sent to the CMTS 12 within the pre-determined time, the CMTS 12 purges its ARP and routing tables of entries including the IP 54 address obtained by the CM 16 with DHCP 66. This helps prevent a rogue CM 16 from registering with the CMTS 12.

If a data-over-cable system with telephony return is being used, the registration message is sent on an upstream telephony channel with PPP 50 via the PSTN 22 and TRAC 24 to the CMTS 12. If a data-over-cable system without telephony return is being used, the registration message is sent on an upstream cable channel to the CMTS 12.

Upon receiving the registration message from the CM 16, the CMTS 12 updates its routing and ARP tables to reflect the CM 16 IP 54/MAC 44 address pairing in the registration request. The CMTS 12 will generate an SNMP 62 trap if an IP 54 address in the registration message is paired with a different MAC 44 address for the CM 16 in the CMTS 12 tables. As is known in the art, an SNMP 62 trap is used to indicate an error condition in a network. As was discussed above, the CMTS 12 records an IP 54 address obtained by the CM 16 with DHCP 66 before it forwards the DHCPACK to the CM 16. The CMTS 12 sends a registration response back to the CM 16 that also includes all CPE 18 IP 54 addresses in the CMTS 12 routing and ARP tables which are associated with a MAC 44 address for the CM 16, if any. The CPE 18 may not have obtained an IP 54 address with DHCP 66 yet. The registration response message is also typically a MAC 44 management message with a MAC 44 management header and TLV encoded data for the CM 16 (e.g., CMTS 12 data or vendor specific data).

The CM 16 may also proxy ARP for any CPE 18 IP 54 addresses in a registration response message. The CM 16 will use ARP on the CMCI 20 for the hardware addresses of the CPE 18 IP 54 addresses and update routing and ARP tables on the CM 16.

The CPE 18 may also send a registration message to the CMTS 12 via the CM 16, and may also receive a registration response from the CMTS 12 via the CM 16. If the CPE 18 sends a registration message, both the CM 16 and the CMTS 12 update ARP and other routing tables. The CMTS 12 will update its routing and ARP tables to reflect a CPE 18 IP 54 addresses and the CM 16 MAC 44 address pairing in the registration request. As was discussed above, the CMTS 12 records an IP 54 address obtained by the CPE 18 with DHCP 66 before sending a DHCPACK for the CPE 18 to the relay agent, the CM 16. The CMTS 12 will also generate an SNMP 64 trap if a CPE 18 IP 54 address in the registration request is paired with a different MAC 44 address for the CM 16 in the CMTS 12 tables.

If a data-over-cable system without telephony returned is being used, the CM 16 sends messages to the CMTS 12 on an upstream cable channel and receives messages from the CMTS 12 on a downstream cable channel. The CM 16 can also send data packets on an upstream cable channel to the CMTS 12, which forwards the data packets to the data network 28. The CMTS 12 sends response data packets back to the CM 16 on a downstream cable channel.

If a data-over-cable system with telephony return is used, the CM 16 can send messages to the CMTS 12 on an upstream telephony channel via the PSTN 22 to the TRAC 24, which forwards the messages to the CMTS 12. The CM 16 can also send data packets on an upstream telephony channel via the PSTN 22 to the TRAC 24, which forwards the data packets to the data network 28. The CMTS 12 sends response data packets back to the CM 16 on a downstream cable channel.

After completing the registration request and registration response sequence, the CM 16 and/or the CPE 18 have completed initialization and can communicate with the data-over-cable system 10 and the data network 28 (FIG. 1). The CM 16 typically acts as a relay agent for requests and responses for one or more CPEs 18 attached to the CM 16.

Restricting Access to the Data-over-cable System

Since the CMTS 12 typically manages connections to tens of thousands of CMs 16 and CPEs 18, the CMTS 12 provides access to the data-over-cable system 10 as well as access to a data network 28 (e.g., the Internet or an intranet). If the CMTS 12 does not provide security checks, a rogue CM 16, CPE 18, or other network device could comprise the security of the cable plant and/or connections to the data network 28.

FIG. 18 is a flow diagram illustrating a Method 330 for restricting access to subscription services for network devices in a data-over-cable system. At Step 332, a connection request is for a subscription service received from a first network device on a second network device on a data-over cable system. At Step 334, it is determined from the second network device, whether information about the first network device is available on the data-over-cable system. If information is available about the first network device on the data-over-cable system, an unrestricted connection is created between the first network device and the data-over-cable system at Step 335. If information is not available about the first network device, at Step 336 a temporary restricted network address is assigned for a connection to the first network device on the data-over-cable system from pre-determined list of restricted network addresses. The temporary restricted network address from the pre-determined list of restricted network addresses provides restricted access to subscription services on the data-over-cable system. At Step 338, a connection timer is started on the data-over-cable system for a restricted connection to the first network device. The connection timer helps restricts access to subscriptions services on the data-over-cable system over a timed interval. At Step 340, a restricted connection is created between the data-over-cable system and the first network device including the temporary restricted network address and connection timer, thereby providing restricted access to subscription services on the data-over-cable system over a timed interval. A network device for preferred embodiments of the present invention is any device that is capable of interacting with the data-over-cable system 10 based on standards developed by the ITU-T, IEEE, IETF, or one or more of the interfaces and protocols from the protocol stack 36 illustrated in FIG. 2.

In one exemplary preferred embodiment of the present invention, the first network device is a CM 16 and the second network device is a CMTS 12. In another exemplary preferred embodiment of the present invention, the first network device is a CPE 18 and the second network device is a CMTS 12. However, the present invention is not limited to these network devices and other network devices could also be used. In addition, exemplary preferred embodiments are described with respect to the CM 16. However, the exemplary preferred embodiments can also be used with CPE 18 substituted for the CM 16.

In one exemplary preferred embodiment of the present invention using Method 330, at Step 332, a connection request for a subscription service is received from a CM 16 on a CMTS 12 on a data-over cable system 10. The connection request can be received on the CMTS 12 in data-over-cable system with, or without telephony return. The connection request for a subscription service may include for example, a login request, a Class-of-Service ("CoS") request a Type-of-Service request ("ToS"). a Quality-of-Service ("QoS") request, a request for a game or other application, or other subscription services.

At Step 334, it is determined from the CMTS 12, whether information about the CM 16 is available on the data-over-cable system 10. The CMTS 12 checks one or more databases for information about the CM 16 that made the connection request at Step 332. The information may include a subscription account number, a calling party number, a MAC 44 address, or other information. In another exemplary preferred embodiment of the present invention, a DCHP server 160 determines whether information about the CM 16 is available on the data-over-cable system 10 (e.g., by using a MAC 44 address).

In yet another exemplary preferred embodiment of the present invention, a Remote Authentication Dial In User Server ("RADIUS") server is used to determine whether information about the CM 16 is available on the data-over-cable system 10. As is known in the art, RADIUS servers are responsible for receiving user connection requests, authenticating the user, and then returning all configuration information necessary for the client to deliver service to the user. A RADIUS server can act as a proxy client to other RADIUS servers or other kinds of authentication servers (e.g., DHCP server 160 or the CMTS 12). For more information on RADIUS see, RFC-2138, incorporated herein by reference. In such an embodiment, the RADIUS server may be associated with TRAC 24, or may be associated with the CMTS 12. The RADIUS may be used in a data-over-cable system with or without telephony return.

If information about the CM 16 is not available on the data-over-cable system 10, at Step 336, a temporary restricted IP 54 address is assigned for a restricted connection to the CM 16 from the data-over-cable system 10 from pre-determined list of restricted IP 54 addresses. The temporary restricted IP 54 address from the pre-determined list of restricted IP 54 addresses provides restricted access to a subscription service the data-over-cable system 10.

In one exemplary embodiment of the present invention, the temporary restricted IP 54 address is assigned via a DHCP server 160. In such an embodiment, the DHCP server 160 provides a limited access, temporary restricted IP 54 address, from a list of restricted IP 54 addresses from a pre-determined list of restricted IP 54 addresses in a predetermined range. The CMTS 12 recognizes network devices with IP 54 addresses in the pre-determined IP 54 address range as having restricted access subscription services to the data-over-cable system 10. Restricted access allows a network device such as a CM 16 to access less than all of the available subscription services available from the data-over-cable system 10.

At Step 338, a connection timer is started on the data-over-cable system 10 for a restricted connection to the CM 16. In one exemplary preferred embodiment of the present invention, the connection timer is a timer for an IP 54 address "lease." As is know in the art, a DHCP server 160 typically assigned an IP 54 address with a pre-determined lease time (e.g., 30 minutes). The lease time indicates how long an IP 54 address can be used before the lease expires. When the lease expires for the restricted IP 54 address, the connection to the CM 16 is typically terminated. The connection timer helps restricts access to the data-over-cable system 10 over a timed interval. In one preferred embodiment of the present invention, the connection there is to a timer valve that is much shorter than the pre-determined lease time (e.g., 10 minutes).

In another preferred embodiment of the present invention, in a data-over-cable system with telephony return, the TRAC 26 is configured so that hunt-groups of dialed numbers for global unauthenticated access (e.g., 800 or 888 service) on a communications port (e.g., a telephony trunk port) can be used for a timed connection. In such an embodiment, a restricted IP 54 address may be assigned with a "permanent" lease by the DCHP server 160 that would not expire. In yet another embodiment, a restricted IP 54 address with a pre-determined lease time could also be used, so that there would be two timers active. A first timer for the communications link, and a second timer for the restricted IP 54 address.

At Step 340, a restricted connection is created between the data-over-cable system 10 and the CM 16 including the temporary IP 54 address and connection time for the IP 54 address lease time, or connection timer for the communication link, thereby providing restricted access to subscription services on the data-over-cable system 10 over a timed interval.

A network device with a restricted IP 54 address is recognized by the CMTS 12 as an unknown device and is place in an untrusted state. The CMTS 12 can move the network device into a trusted state by collecting additional information. Exemplary preferred embodiments are described with respect to the CM 16. However, the exemplary preferred embodiments can also be used with CPE 18 or other network devices substituted for the CM 16.

FIG. 19 is a flow diagram illustrating a Method 342 for changing access for a network device in a data-over-cable system. At Step 344, a restricted connection is created between a first network device and the data-over-cable system including a temporary restricted network address from a pre-determined list of restricted network addresses providing restricted access to subscription services the data-over-cable system, and a connection timer restricting access to the data-over-cable system over a timed interval. Restricted access to subscription services is thereby provided to the data-over-cable system over a timed interval. At Step 346, information is obtained from the first network device on a second network device to uniquely identify the first network device on the data-over-cable system. At Step 348, the information is saved in a database associated with the second network device. At Step 350, the restricted connection between the first network device and the data-over-cable system is changed to an unrestricted connection between the first network device and the data-over-cable system.

In one exemplary preferred embodiment of the present invention, the first network device is a CM 16 and the second network device is a CMTS 12. In another exemplary preferred embodiment of the present invention, the first network device is a CPE 18 and the second network device is a CMTS 12. However, other network devices can also be used and the present invention is not limited to these network devices and other network devices could also be used.

In one exemplary preferred embodiment of the present invention using Method 342, at Step 344, a restricted connection is created between a CM 16 and the data-over-cable system 10 including a temporary restricted IP 54 from a pre-determined list of restricted network addresses providing restricted access to the data-over-cable system 10, and a connection timer restricting access to the data-over-cable system 10 over a timed interval. Restricted access to subscription services is thereby provided to the data-over-cable system 10 over a timed interval.

At Step 346, information is obtained from the first network device on a second network device to uniquely identify the first network device on the data-over-cable system. For example, the CMTS 12 may collect account verification information, such as a credit card number and corresponding approval/denial information, local connection information, such as area code or other local numbers, a class-of-service or a quality-of-service for connections to the data-over-cable system, device configuration information, a MAC 44 address, and other information.

In one exemplary preferred embodiment of the present invention, an interactive menu of subscriber options and queries is presented to the first network device. The subscriber options and queries are sent and received with SNMP 62 messages to and from the CM 16 or the CPE 18 and the CMTS 12. In one preferred embodiment of the present invention, the subscriber options are set using a SNMP 62 data-over-cable Management Information Base ("MIB") such as the one described in the IETF draft "IPCDN Telephony Return MIB", by S. Adiraju and J. Fijolek, <draft-ietf-ipcdn-tri-mib-00.1.txt>, Mar. 23, 1998, incorporated herein by reference. However, other versions of this MIB, and other data-over-cable MIBs may also be used, and the present invention is not limited to the IPCDN Telephony Return MIB. In addition, other protocols beside SNMP 62 can also be used for the subscriber options and queries. Returning to FIG. 19 at Step 348, the information is saved in a database associated with the CMTS 12. At Step 350, the restricted connection between the CM 16 and the data-over-cable system 10 is changed to an unrestricted connection.

The restricted connection between the CM 16 and the data-over-cable system change at Step 350 can be changed with a number of different methods. FIG. 20 illustrates one method for changing a restricted connection into an unrestricted connection at Step 350 of Method 342. However, other methods can also be used, and the present invention is not limited to the method illustrated in FIG. 20.

FIG. 20 is a flow diagram illustrating a Method 352 for changing access for a network device in a data-over-cable system. At Step 354, a restricted connection between a first network device and a data-over-cable system is terminated by a second network device on the data-over-cable system. At Step 356, the second network device receives a new connection request for a subscription service from the first network device. At Step 358, the second network device validates the first network device with a database associated with the second network device. If the first network device is validated, at Step 360, an unrestricted connection to a subscription service on the data-over-cable system is created by the second network device between the data-over-cable system and the first network device.

In one preferred embodiment of the present invention, the first network device is a CM 16 and the second network device is a CMTS 12. However, the present invention is not limited to CM 16 and CMTS 12 and other network devices can also be used (e.g., CPE 18). In such an embodiment, at Step 354, a restricted connection between the CM 16 and the data-over-cable system 10 is terminated by the CMTS 12. At Step 356, the CMTS 12 receives a new connection request from the CM 16. At Step 358, the CMTS 12 validates the CM 16 received (e.g., at Step 346 of Method 324) with a database associated with the CMTS 12. The validation includes reading a database entry or creating a database entry based on information received from the CM 16 (e.g., at Step 346 of Method 324). The validation is an additional security measure to protect the data-over-cable system 10. If the CM 16 is validated, an unrestricted connection between the CM 16 and the data-over-cable system 10 is created by the CMTS 12 by using any validation information retrieved from the database at Step 360.

The CM 16, CPE 18 or other network device is moved to a trusted, unrestricted state. In a trusted, unrestricted state, the network device is also assigned an IP 54 address from a list of unrestricted IP 54 addresses. In one exemplary preferred embodiment of the present invention, the unrestricted IP 54 address is obtained from a DHCP server 160 as is described above. However, other Methods could also be used to obtain and assign an unrestricted IP 54 address.

The Methods described herein may allow a network device such as a cable modem termination system to provide restricted access to subscription services for new or unknown cable modems, customer premise equipment, or other network devices in a data-over-cable system. The restricted access is provided without a long delay, and limits a new or unknown cable modem to a temporary network address for a limited amount of time. Thus, restricted access to restricted services may be provided without compromising the security of the data-over-cable system or the connections to the data network (e.g., the Internet).

It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, the Steps of the flow diagrams may be taken in sequences other than those described, and more or fewer elements or components may be used in the block diagrams. In addition, the present invention can be practiced with software, hardware, or a combination thereof.

The claims should not be read as limited to the described order or elements unless stated to that effect. Therefore, all embodiments that come within the scope and spirit of the following claims and equivalents thereto are claimed as the invention.

We claim:

1. In a data-over-cable system including a plurality of network devices, a method of restricting access for a network device, comprising the following steps:

receiving a connection request from a first network device on a second network device on the data-over cable system for a subscription service on the data-over-cable system;

determining from the second network device, whether information about the first network device is available on the data-over-cable system, and if not, assigning a temporary restricted network address for a restricted connection to the first network device on the data-over-cable system from pre-determined list of restricted network addresses, wherein the temporary network address from the pre-determined list of restricted network addresses provides restricted access to subscription services on the data-over-cable system;

starting a connection timer on the data-over-cable system for a restricted connection to the first network device, wherein the connection timer restricts access to subscription services on the data-over-cable system over a timed interval; and creating a restricted connection between the data-over-cable system and the first network device including the temporary restricted network address and the connection timer, thereby providing restricted access to subscription services the data-over-cable system.

2. A computer readable medium having stored therein instructions for causing a central processing unit to execute the method of claim 1.

3. The method of claim 1 wherein the first network device is any of a cable modem or customer premise equipment.

4. The method of claim 1 wherein the second network device is a cable modem termination system.

5. The method of claim 1 wherein the second network device is any of a Dynamic Host Configuration Protocol Server or a Remote Authentication Dial In User Service server.

6. The method of claim 1 wherein temporary restricted network address is an Internet Protocol address.

7. The method of claim 1 wherein the step of assigning a temporary restricted network address includes assigning a temporary Internet Protocol address obtained from a Dynamic Host Configuration Protocol server.

8. The method of claim 1 wherein the step of determining from the second network device, whether information about the first network device is available on the data-over-cable system, includes determining with information from a database associated with the second network device, whether information about the first network device is available on the data-over-cable system, wherein the database includes information about network devices that subscribe to services offered on the data-over-cable system.

9. The method of claim 1 wherein the step of determining from the second network device, whether information about the first network device is available on the data-over-cable system, includes determining whether a Medium Access Protocol address for the first network device is available on the data-over-cable system.

10. The method of claim 1 wherein the step of starting a connection timer includes starting a connection timer for a network port for a limited amount of time, wherein the network port is used to connect the first network device to a subscription service on the data-over-cable system on a restricted connection.

11. The method of claim 1, further comprising:

determining from the second network device, whether information about the first network device is available on the data-over-cable system, and if so, assigning an unrestricted network address for an unrestricted connection to the first network device on the data-over-cable system from a list of unrestricted network addresses; and creating an unrestricted connection to a subscription service between the data-over-cable system and the first network device including the unrestricted network address, thereby providing unrestricted access to a subscription service on the data-over-cable system.

12. In a data-over-cable system including a plurality of network devices, a method of changing access for a network device, comprising the following steps:

creating a restricted connection between a first network device and the data-over-cable system including a restricted network address from a pre-determined list of restricted network addresses providing restricted access to a subscription service the data-over-cable system, and a connection timer restricting access to the subscription service on data-over-cable system over a timed interval, thereby providing restricted access to the subscription service to the data-over-cable system over a timed interval;

obtaining information from the first network device on a second network device to uniquely identify the first network device on the data-over-cable system;

saving the information in a database associated with the second network device; and changing the restricted connection to the subscription service between the first network device and the data-over-cable system to an unrestricted connection to the subscription service between the first network device and the data-over-cable system by:

terminating the restricted connection to the subscription service between the first network device and the data-over-cable system from the second network device;

receiving a new connection request from the first network device on the second network device to the subscription service on the data-over cable system;

validating information about the first network device using information from the database associated with the second network device; and creating an unrestricted connection for the subscription service between the first network device and the data-over-cable system using information from the database.

13. A computer readable medium having stored therein instructions for causing processing unit to execute the method of claim 12.

14. The method of claim 12 further comprising changing the restricted network address to an unrestricted network address.

15. The method of claim 12 wherein the step of obtaining information from the first network device includes obtaining information with Simple Network Management Protocol messages.

16. The method of claim 12 wherein the Simple Network Management Protocol messages includes information parameters from a Simple Network Management Protocol management information base for a data-over-cable system.

17. The method of claim 12 wherein the step of changing the restricted connection to the subscription service between the first network device and the data-over-cable system includes applying information saved in the database associated with the second network device to the restricted connection, thereby creating an unrestricted connection to the subscription service between the first network device and the data-over-cable system.

18. In a data-over-cable system including a plurality of network devices, a method of restricting access for a network device, comprising the following steps:

receiving a connection request from a cable modem on a cable modem termination system on the data-over cable system for a subscription service on the data-over-cable system;

determining from the cable modem termination system, whether information about the cable modem is available on the data-over-cable system, and if not, assigning a temporary restricted Internet Protocol address for a connection to the cable modem on the data-over-cable system from pre-determined list of restricted Internet Protocol addresses, wherein the temporary Internet Protocol address from the pre-determined list of restricted Internet Protocol addresses provides restricted access to the subscription service on the data-over-cable system;

starting a connection timer on the data-over-cable system for a restricted connection to the subscription service for the cable modem, wherein the connection timer restricts access to the subscription service on the data-over-cable system over a timed interval; and creating a restricted connection between the data-over-cable system and the cable modem including the temporary restricted Internet Protocol address and the connection timer, thereby providing restricted access to the subscription service on the data-over-cable system over a timed interval.

19. A computer readable medium having stored therein instructions for causing a central processing unit to execute the method of claim 18.

\* \* \* \* \*

UNITED STATES PATENT AND TRADEMARK OFFICE
CERTIFICATE OF CORRECTION

PATENT NO.   : 6,351,773 B1
DATED        : February 26, 2002
INVENTOR(S)  : John G. Fijolek, Levent Gun, Ronald B. Lee and Philip T. Robinson It is certified that error appears in the above-identified patent and that said Letters Patent is hereby corrected as shown below:

<u>Title page,</u>
Item [56], References Cited, insert
U.S. PATENT DOCUMENTS

| | | |
|---|---|---|
| 5,347,304 | 9/1994  | Moura et al. |
| 5,488,412 | 1/1996  | Majeti et al. |
| 5,583,931 | 12/1996 | Schneder et al. |
| 5,586,121 | 12/1996 | Moura et al. |
| 5,600,717 | 2/1997  | Schneider et al. |
| 5,606,606 | 2/1997  | Schneider et al. |
| 5,608,446 | 3/1997  | Carr et al. |
| 5,623,542 | 4/1997  | Schneider et al. |
| 5,636,211 | 6/1997  | Newlin et al. |
| 5,675,732 | 10/1997 | Majeti et al. |

OTHER PUBLICATIONS
"Cable Modem to Customer Premise Equipment Interface Specification (Interim) SP-CMCI-I02-980317", Multimedia Cable Network Systems (MCNS) Holdings, L.P., 1998, pp. ii to 40.
"Operations Support System Interface Specification Baseline Privacy Interface MIB (Interim Specification) SP-OSSI-BPI-I01-980331", MCNS Holdings, L.P., 1998, pp. ii to 33.
"Cable Modem Termination System-Network Side Interface Specification (Interim Specification) SP-CMTS-NSII01-960702", MCNS Holdings, L.P., 1996, pp. ii to 13.
"Removable Security Module Interface Specification (Interim Specification) SP-RSMI-I01-980204", MCNS Holdings, L.P., 1997, pp. ii to 48.
"Baseline Privacy Interface Specification (Interim) SP-BPI-I01-970922", MCNS Holdings, L.P., 1997, pp. ii to 66.
"Operations Support System Interface Specification (Interim) SP-OSSII01-970403", MCNS Holdings, L.P., 1997, pp. 1 to 30.
"Radio Frequency Interface Specification (Interim Specification) SP-RFI-I02-971008", MCNS Holdings, L.P., 1997, pp. ii to 186.

UNITED STATES PATENT AND TRADEMARK OFFICE
CERTIFICATE OF CORRECTION

PATENT NO. : 6,351,773 B1
DATED : February 26, 2002
INVENTOR(S) : John G. Fijolek, Levent Gun, Ronald B. Lee and Philip T. Robinson It is certified that error appears in the above-identified patent and that said Letters Patent is hereby corrected as shown below:

<u>OTHER PUBLICATIONS (cont).</u>
"Cable Modem Telephony Return Interface Specification (Interim) SP-CMTRI-I01-970804", MCNS Holdings, L.P., 1997, pp ii to 74.
"Security System Specification (Interim Specification) SP-SSI-I01-970506", MCNS Holdings, L.P., 1997, pp. ii to 103.
"Internet Engineering Task Force", Request for Comments 2131, Dynamic Host Configuration Protocol (DHCP), March 1997, pp. 1 to 42.
S. Adiraju, J. Fijolek, IPCDN Telephony Return MIB, Internet Engineering Task Force, Internet Draft," <draft-ietf-ipcdn-tri-mib-00.1.txt>", March 23, 1998, pp. 1 to 26.

Signed and Sealed this

Tenth Day of September, 2002

Attest:

Attesting Officer

JAMES E. ROGAN
Director of the United States Patent and Trademark Office